United States Patent
Cole et al.

(10) Patent No.: US 7,162,973 B2
(45) Date of Patent: *Jan. 16, 2007

(54) GRILL MEMBER FOR USE IN A POULTRY FEEDER

(75) Inventors: Theodore J. Cole, Milford, IN (US); Lionel L. Kreger, Warsaw, IN (US); James R. Kraft, New Paris, IN (US); Philip Wilfong, Goshen, IN (US)

(73) Assignee: CTB IP, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/990,269

(22) Filed: Nov. 16, 2004

(65) Prior Publication Data

US 2005/0061254 A1 Mar. 24, 2005

Related U.S. Application Data

(62) Division of application No. 10/455,054, filed on Jun. 5, 2003.

(60) Provisional application No. 60/391,731, filed on Jun. 26, 2002.

(51) Int. Cl.
*A01K 39/01* (2006.01)

(52) U.S. Cl. .................. 119/52.4; 119/61.3

(58) Field of Classification Search ........... 119/52.4, 119/53, 61.3, 56.1, 58, 59, 70, 57.4, 55; D30/124, D30/128, 131

See application file for complete search history.

(56) References Cited

U.S. PATENT DOCUMENTS

| 364,557 A | 6/1887 | Walin |
| 570,569 A | 11/1896 | Smith |

(Continued)

FOREIGN PATENT DOCUMENTS

DE 10164122 12/2001

(Continued)

OTHER PUBLICATIONS

One (1) page Big Dutchman "Tru Pan" Flyer—no date.

(Continued)

*Primary Examiner*—Teri Pham Luu
*Assistant Examiner*—Kimberly S. Smith
(74) *Attorney, Agent, or Firm*—Trexler, Bushnell, Giangiorgi, Blackstone & Marr, Ltd.

(57) ABSTRACT

A grill member for use in a poultry feeder assembly has a generally curved rim member having an outward side surface which varies in radial distance relative to a center of the grill member and a top surface which varies in vertical height relative to a generally planar lower edge of the rim member without the need to adjust the grill member. The grill member also is configured to be rotated relative to a rotationally stable drop tube member in order to change both a position of a brood gate defined in the drop tube member relative to a base portion of a pan member and a height of a feed gate provided between a distal end of the drop tube member and the base portion of the pan member in order to control the flow of feed into the pan member through the brood gate and the feed gate.

21 Claims, 40 Drawing Sheets

U.S. PATENT DOCUMENTS

| | | | |
|---|---|---|---|
| 580,054 A | 4/1897 | Merriman | |
| 905,393 A | 12/1908 | Webb | |
| 984,980 A | 2/1911 | Taylor | |
| 1,069,943 A | 8/1913 | Haffey | |
| 1,131,491 A | 3/1915 | Drake | |
| D47,285 S | 5/1915 | Ebeling | |
| 1,154,073 A | 9/1915 | Stocking | |
| 1,565,117 A | 12/1925 | Stabbert | |
| 1,699,501 A | 1/1929 | McCartney | |
| 1,862,349 A | 6/1932 | Perry | |
| 2,341,136 A * | 2/1944 | Brittingham | 131/242.6 |
| 2,457,432 A | 12/1948 | Ballard | |
| 2,681,639 A | 6/1954 | Littlefield | |
| 2,709,417 A | 5/1955 | Brembeck | |
| 2,789,534 A | 4/1957 | Landgraf | |
| 2,804,844 A | 9/1957 | Gigliotti | |
| 2,875,729 A | 3/1959 | Gibson | |
| 2,884,899 A | 5/1959 | Jackes et al. | |
| 2,933,064 A | 4/1960 | Geerlings | |
| 2,941,506 A | 6/1960 | Fulton | |
| D188,655 S * | 8/1960 | Blough | D30/131 |
| 3,010,383 A * | 11/1961 | Greene | 99/332 |
| 3,085,552 A | 4/1963 | Pilch | |
| 3,102,511 A | 9/1963 | Atcheson | |
| 3,105,463 A | 10/1963 | Pilch | |
| RE25,589 E | 6/1964 | Hostetler et al. | |
| 3,203,397 A | 8/1965 | Henry | |
| 3,211,131 A | 10/1965 | Klein | |
| 3,230,933 A | 1/1966 | Myers et al. | |
| 3,330,255 A | 7/1967 | Scott et al. | |
| 3,388,690 A | 6/1968 | Hostetler | |
| 3,389,689 A | 6/1968 | Van Huls | |
| 3,408,988 A | 11/1968 | Lee | |
| 3,476,087 A | 11/1969 | Scott et al. | |
| 3,485,215 A | 12/1969 | Scott et al. | |
| 3,490,419 A | 1/1970 | Van Huls | |
| 3,511,215 A | 5/1970 | Meyers | |
| 3,547,082 A | 12/1970 | Blessin et al. | |
| 3,566,843 A | 3/1971 | Van Huls | |
| 3,585,970 A | 6/1971 | Scott et al. | |
| 3,628,505 A | 12/1971 | Myers | |
| 3,648,661 A | 3/1972 | Moore | |
| 3,675,627 A | 7/1972 | Myers | |
| 3,742,913 A | 7/1973 | Crippen | |
| 3,807,359 A | 4/1974 | Hostetler | |
| 3,811,412 A | 5/1974 | Murto et al. | |
| 3,908,601 A | 9/1975 | Geary | |
| 3,911,868 A | 10/1975 | Brembeck | |
| D240,355 S | 6/1976 | Chadbourne | |
| 3,971,340 A | 7/1976 | Allen | |
| 4,003,339 A | 1/1977 | Hostetler | |
| 4,070,990 A | 1/1978 | Swartzendruber | |
| 4,348,988 A | 9/1982 | Lawson | |
| 4,442,604 A * | 4/1984 | Altman | 30/302 |
| 4,476,811 A | 10/1984 | Swartzendruber | |
| 4,527,513 A | 7/1985 | Hart et al. | |
| 4,552,095 A | 11/1985 | Segalla | |
| 4,800,844 A | 1/1989 | Van Gilst | |
| 4,834,026 A | 5/1989 | Brembeck et al. | |
| 4,995,343 A | 2/1991 | Cole et al. | |
| 5,007,380 A | 4/1991 | Badia et al. | |
| 5,092,274 A | 3/1992 | Cole et al. | |
| 5,101,766 A | 4/1992 | Runion | |
| 5,113,797 A | 5/1992 | van Daele | |
| D341,449 S | 11/1993 | Conner | |
| 5,275,131 A | 1/1994 | Brake et al. | |
| 5,311,839 A | 5/1994 | Pollock et al. | |
| 5,406,907 A | 4/1995 | Hart | |
| 5,497,730 A | 3/1996 | van Daele et al. | |
| 5,564,363 A | 10/1996 | Soffici | |
| 5,718,187 A | 2/1998 | Pollock et al. | |
| 5,765,503 A | 6/1998 | van Daele | |
| 5,794,562 A | 8/1998 | Hart | |
| 5,884,581 A | 3/1999 | Vandaele | |
| D407,949 S | 4/1999 | Henry | |
| 5,941,193 A | 8/1999 | Cole | |
| 5,957,003 A * | 9/1999 | Drefahl et al. | 74/552 |
| D415,391 S | 10/1999 | Henry | |
| 6,050,220 A | 4/2000 | Kimmel et al. | |
| D425,759 S | 5/2000 | Henry | |
| D426,682 S | 6/2000 | Kreger et al. | |
| 6,170,435 B1 | 1/2001 | Momont et al. | |
| 6,173,676 B1 | 1/2001 | Cole | |
| 6,314,909 B1 | 11/2001 | Horwood | |
| 6,349,672 B1 | 2/2002 | Daffi | |
| D457,777 S | 5/2002 | Bradley | |
| 6,470,826 B1 | 10/2002 | Thuline | |
| 6,474,261 B1 * | 11/2002 | Turner et al. | 119/53 |
| D473,418 S | 4/2003 | Burton et al. | |
| D473,756 S | 4/2003 | Cautereels | |
| 6,779,488 B1 | 8/2004 | Corti et al. | |
| 2001/0047766 A1 | 12/2001 | Thuline | |

FOREIGN PATENT DOCUMENTS

| | | |
|---|---|---|
| DE | 10164100 | 4/2003 |
| JP | 226518 | 7/1994 |
| JP | 342596 | 10/1998 |
| JP | 343434 | 10/1998 |
| WO | WO0106846 | 2/2001 |

OTHER PUBLICATIONS

Two (2) page Big Dutchman "FLUXX Broiler Feeding System" Flyer—no date.

Six (6) page Big Dutchman "AugerMatic & TruPan" Brochure—Aug. 2001.

* cited by examiner

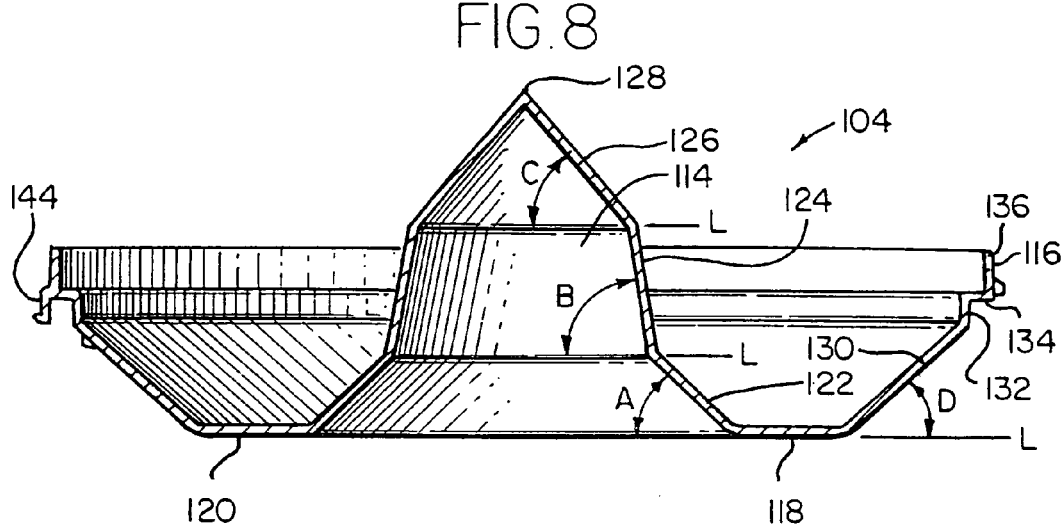
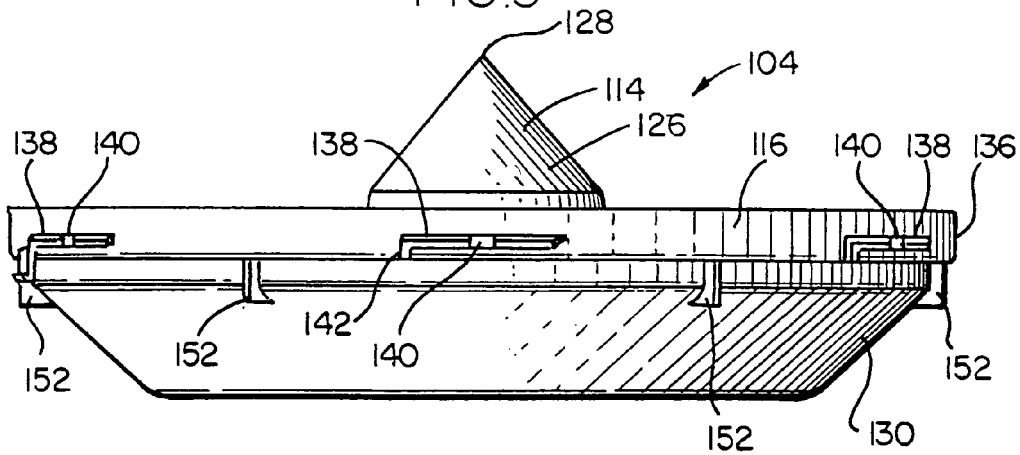
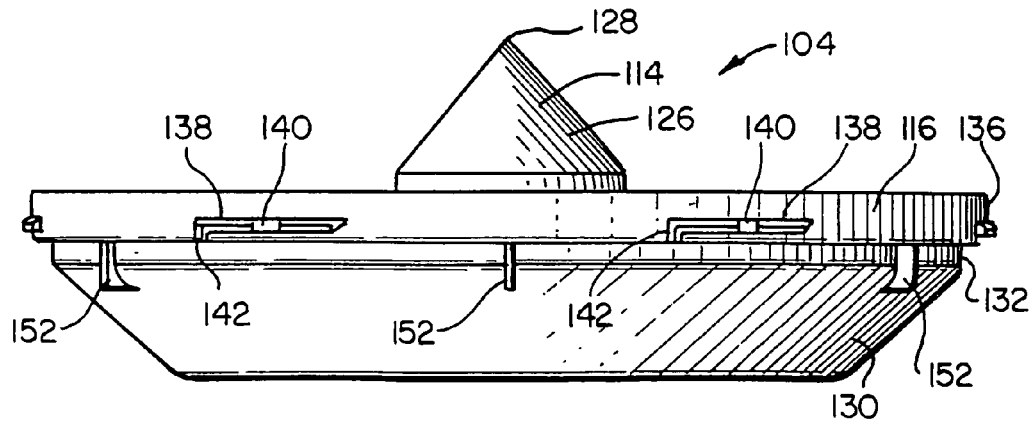

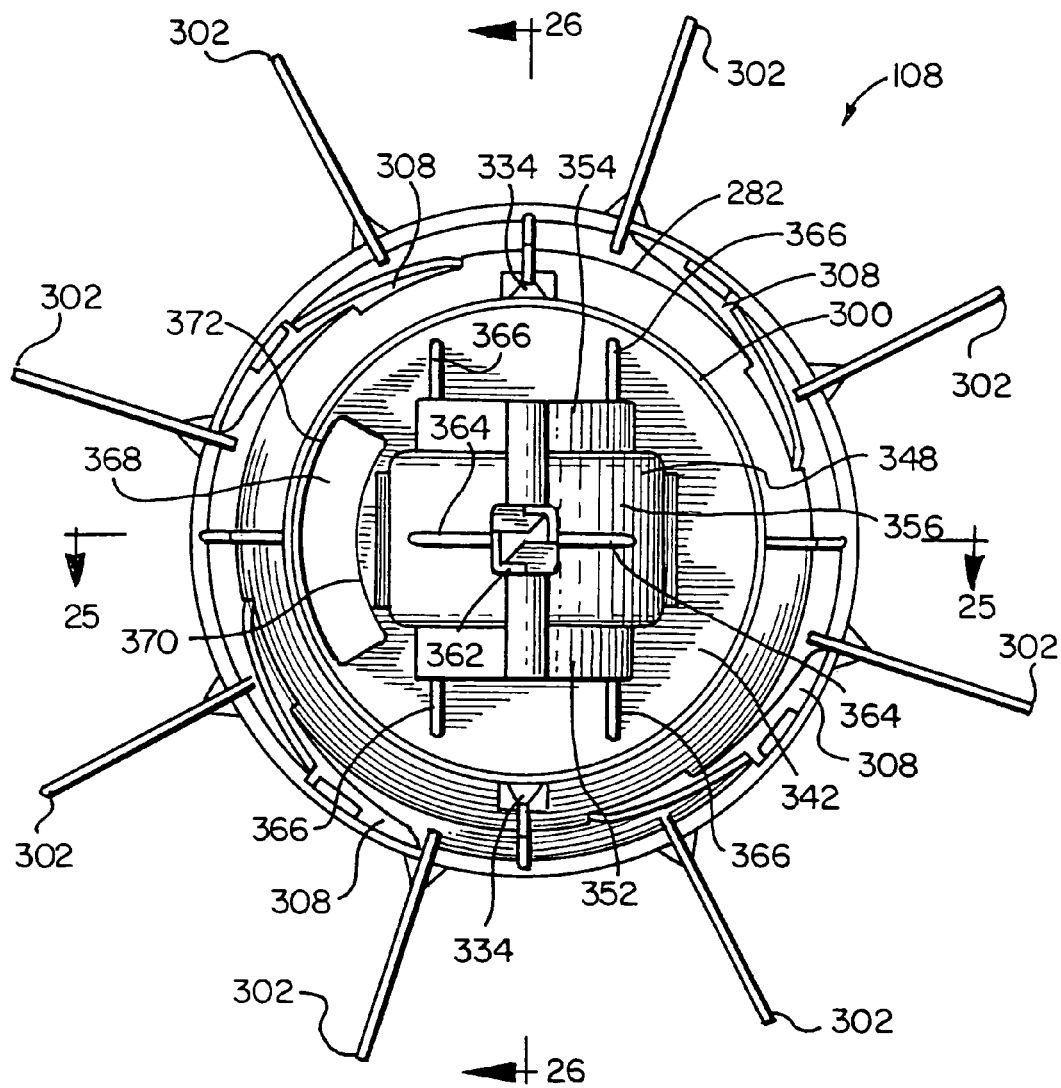
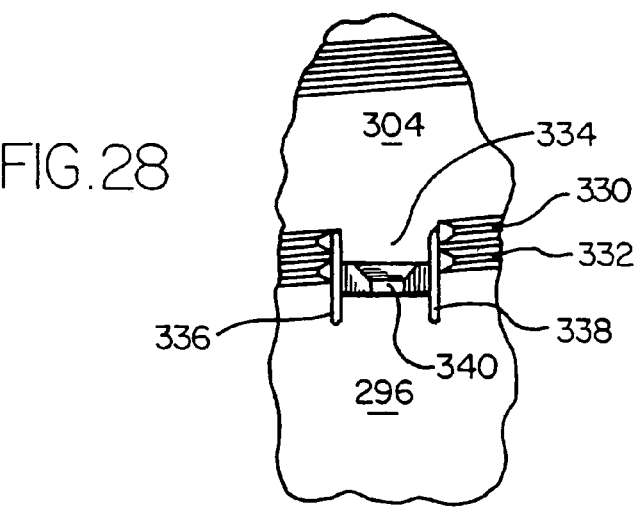

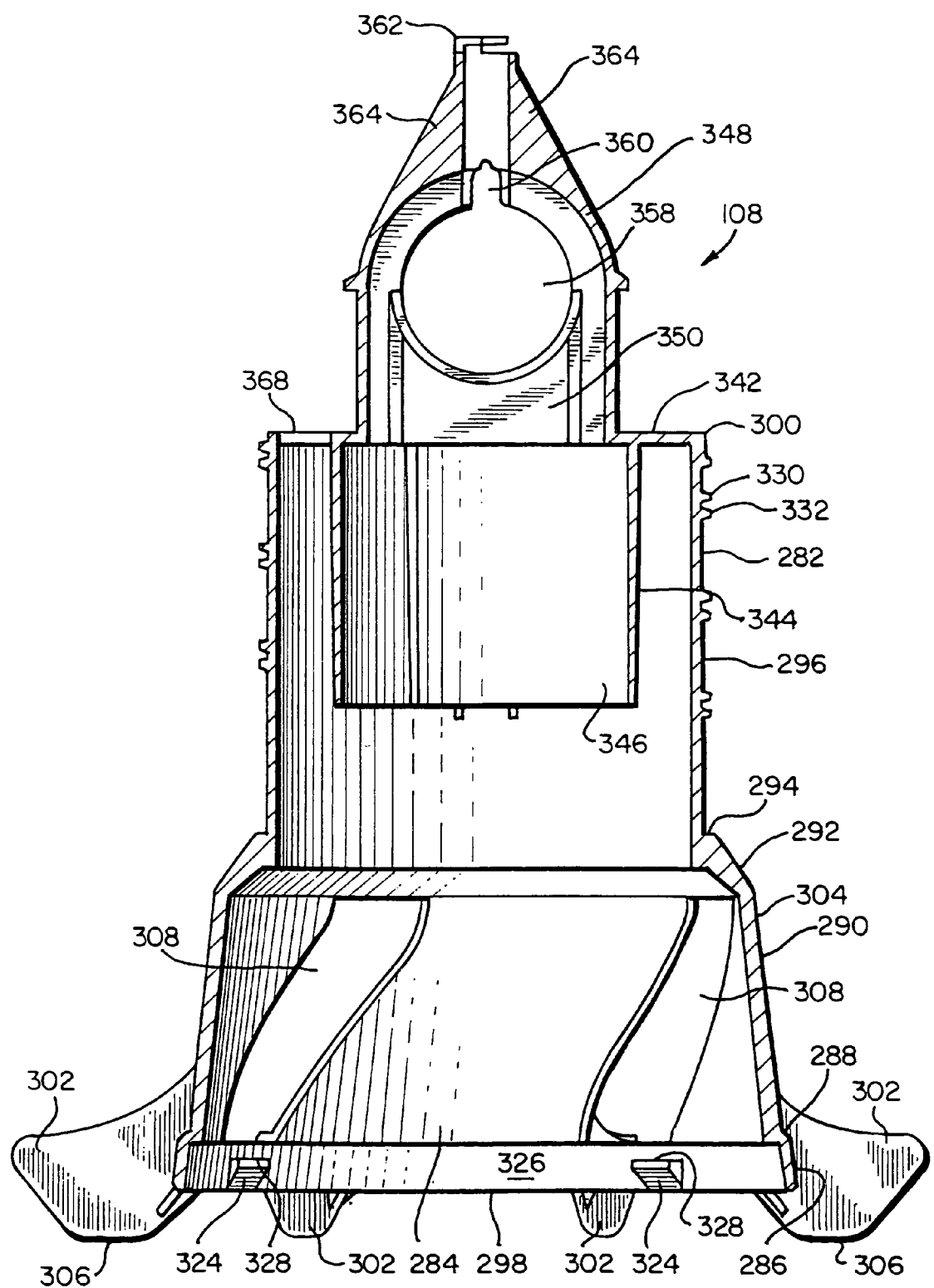

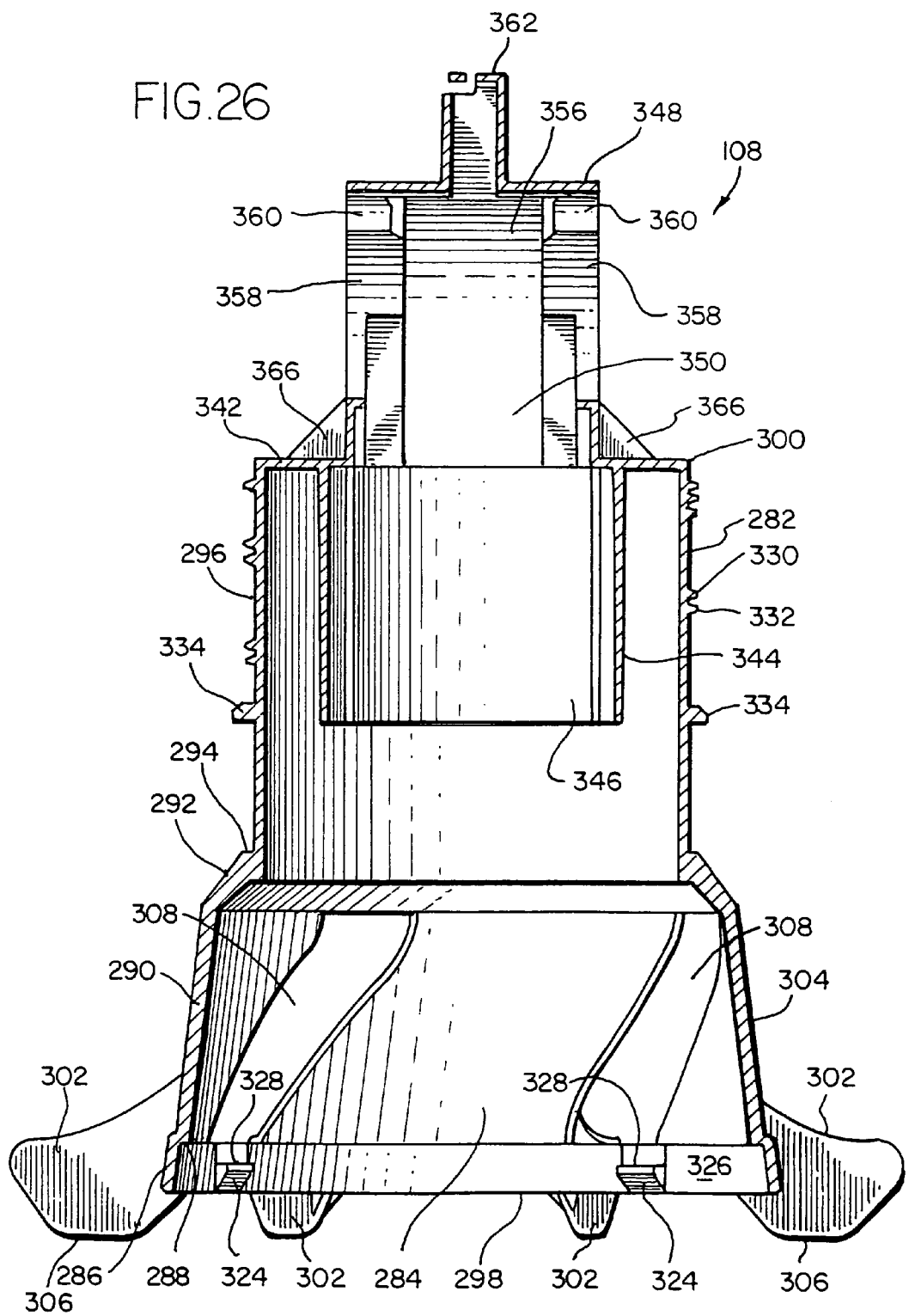

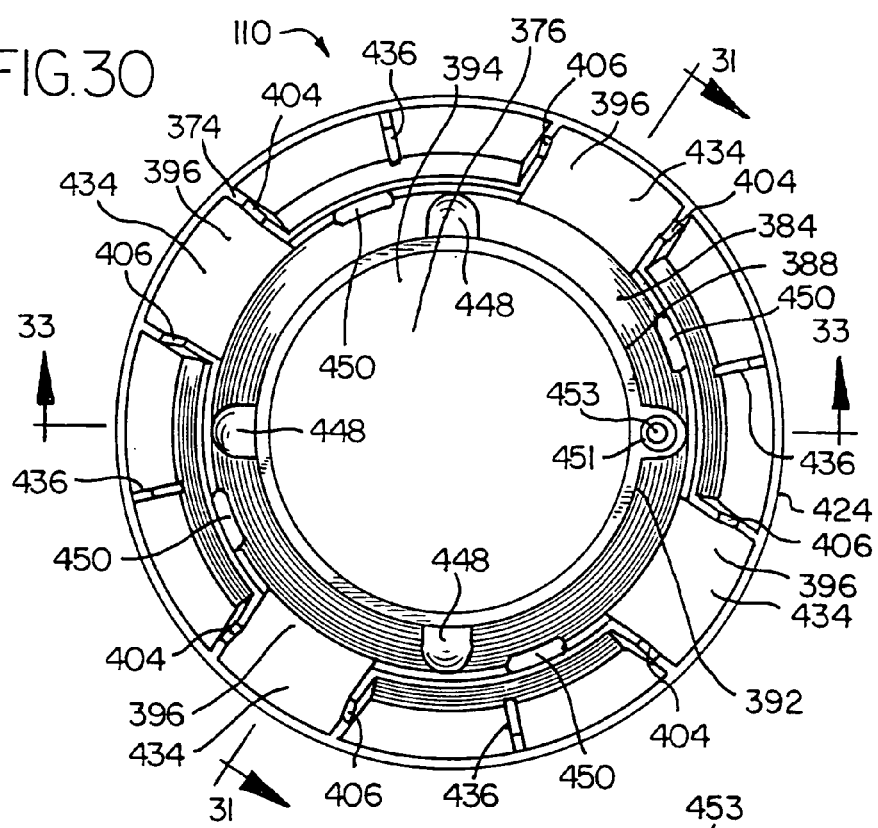
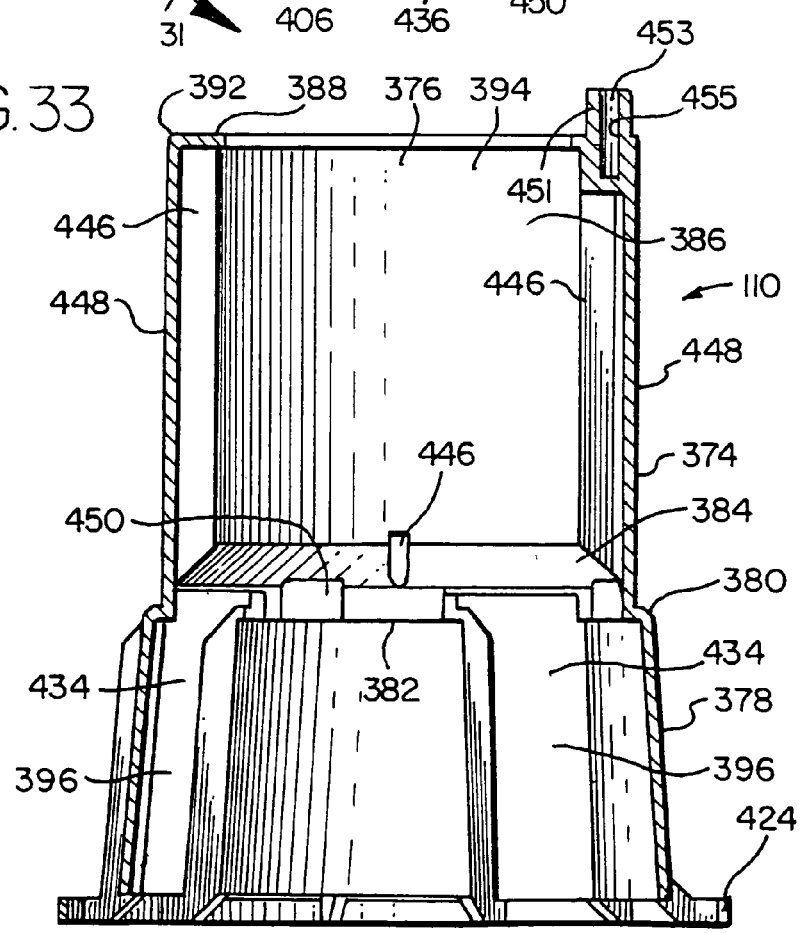

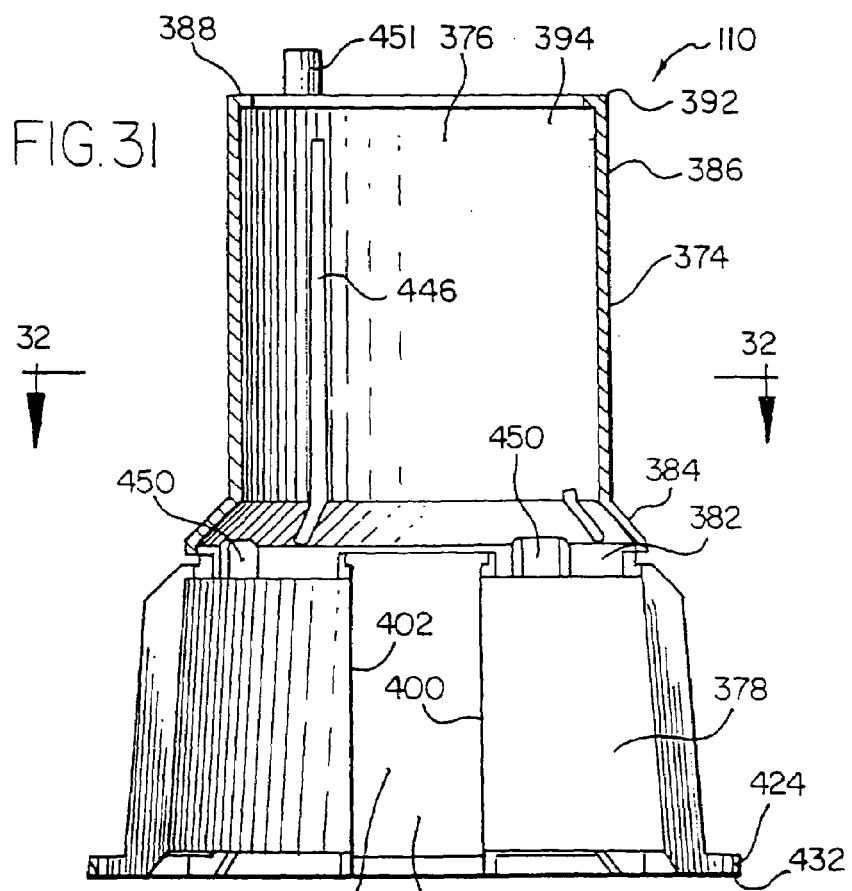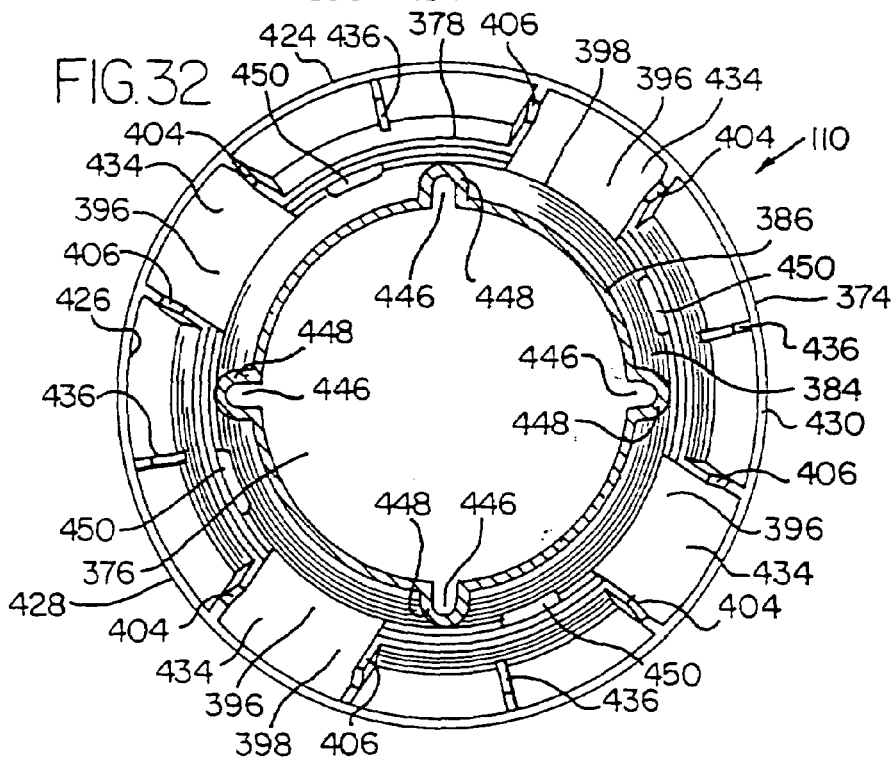

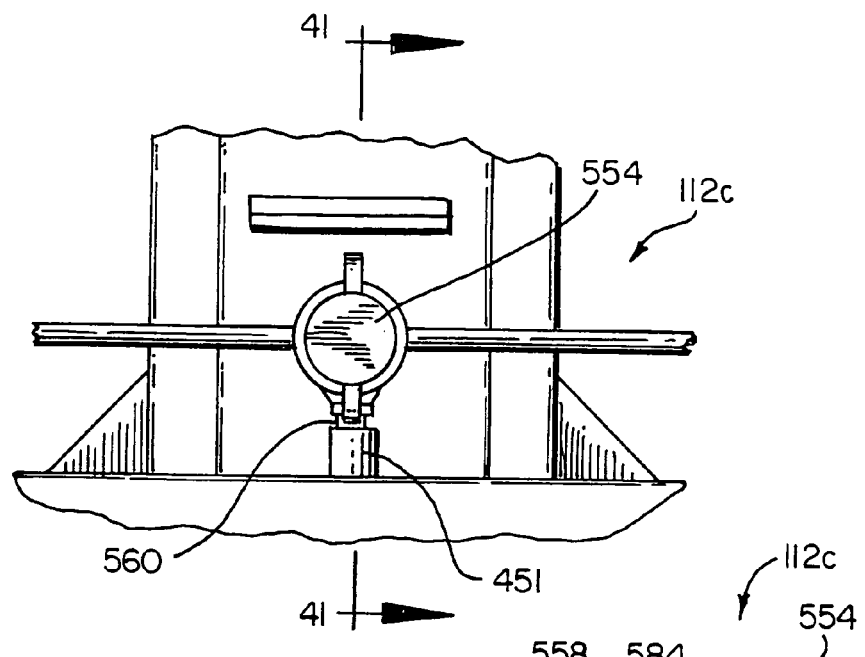
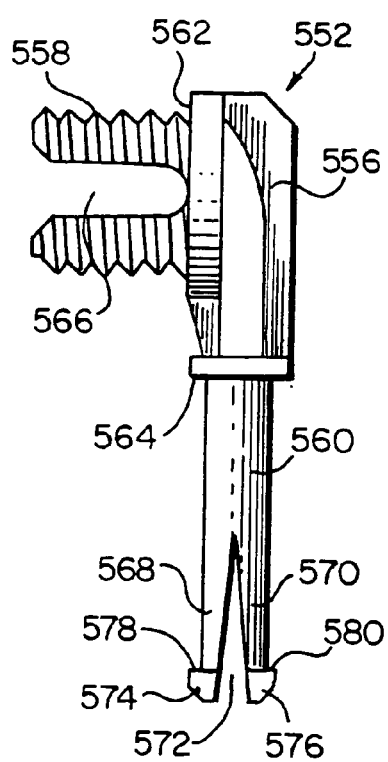
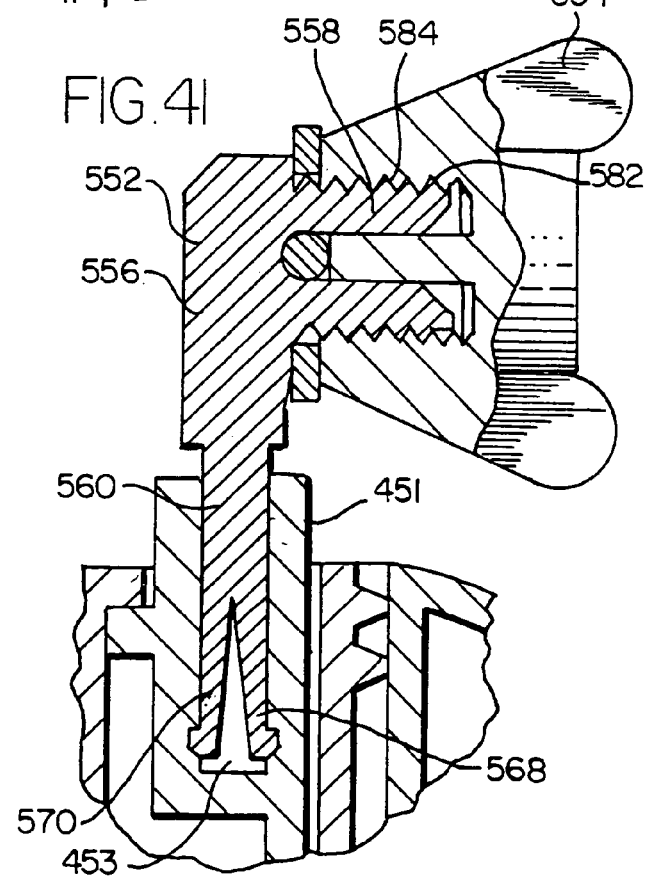
FIG. 40
FIG. 42
FIG. 41

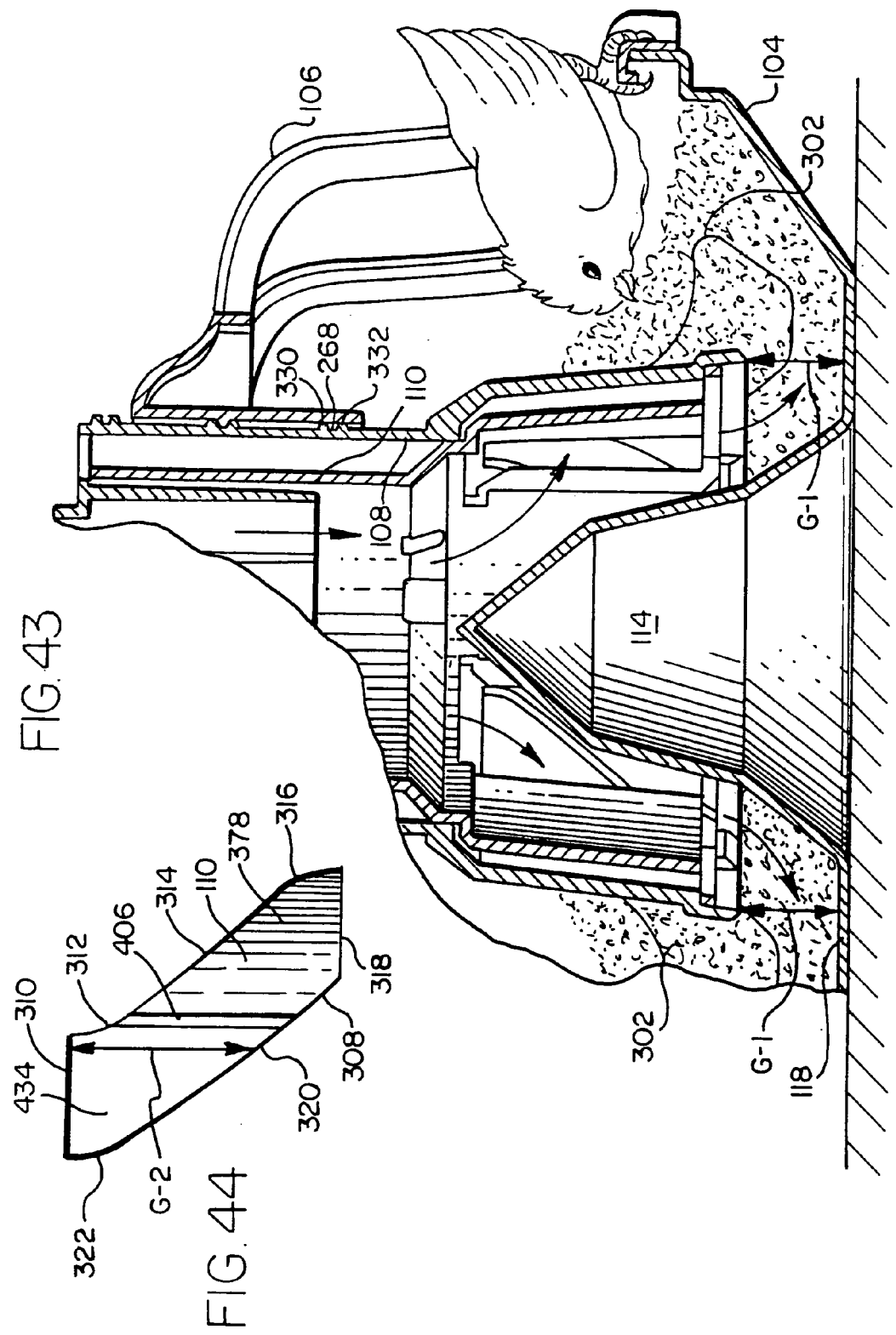

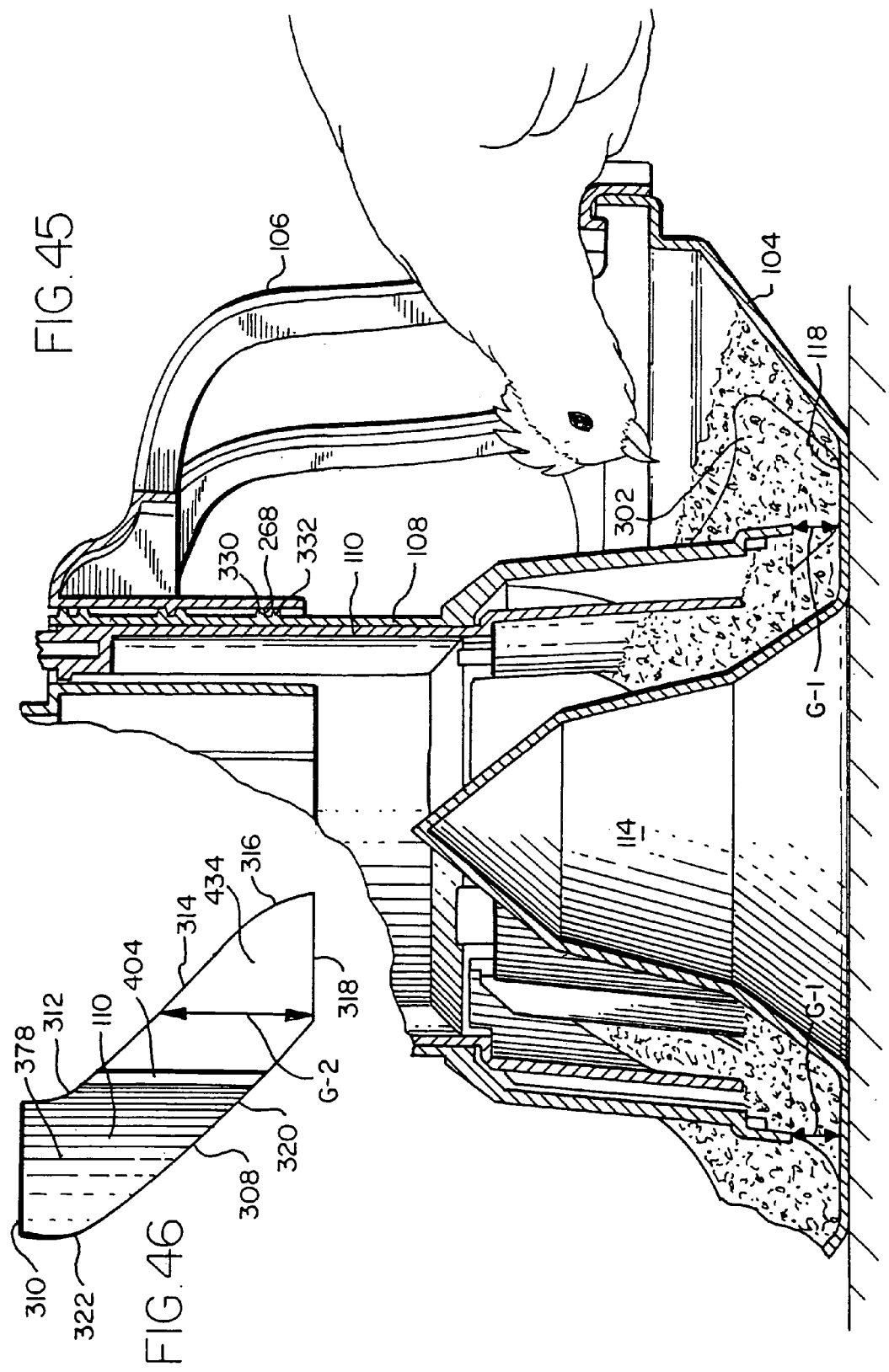

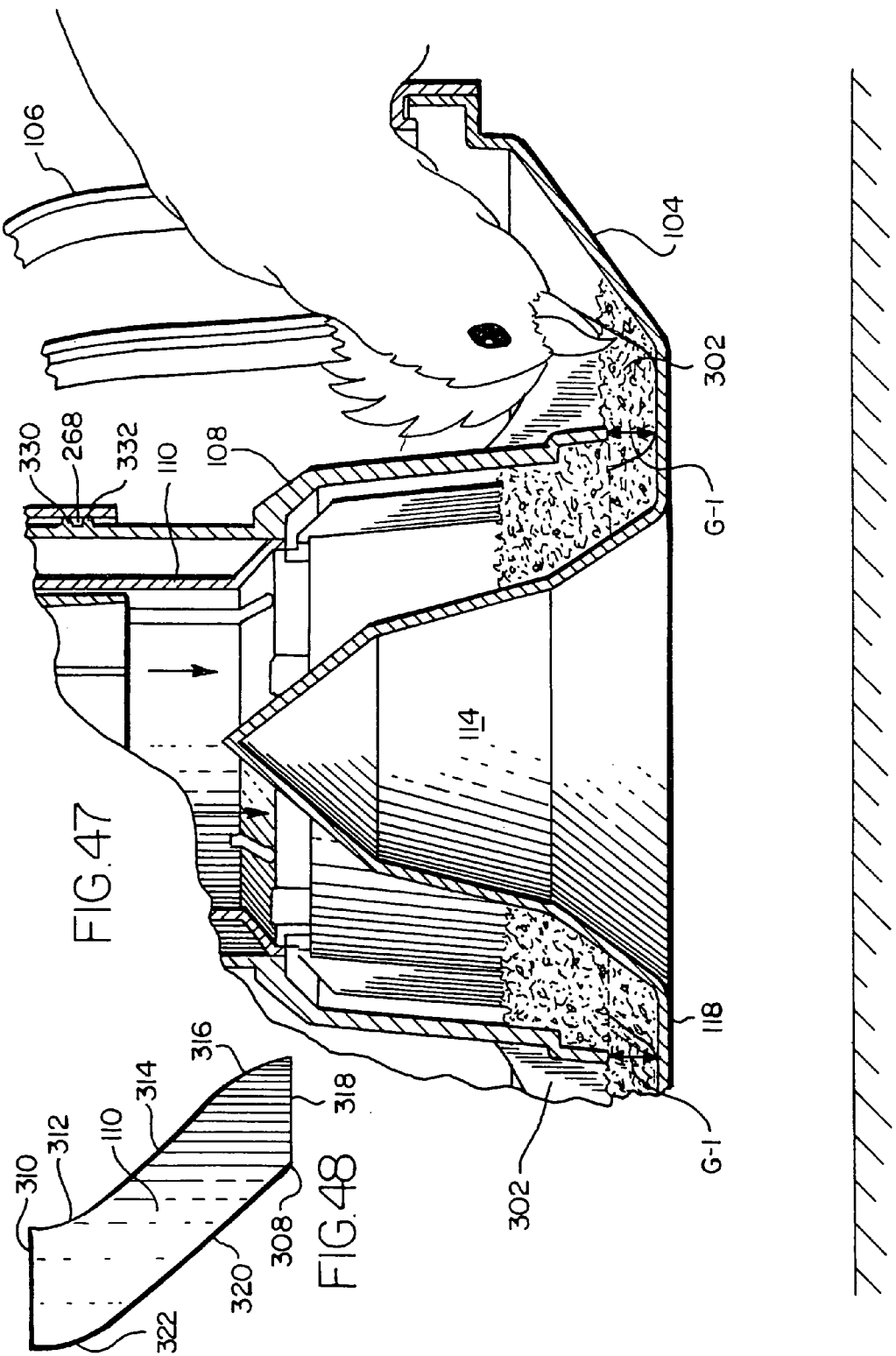

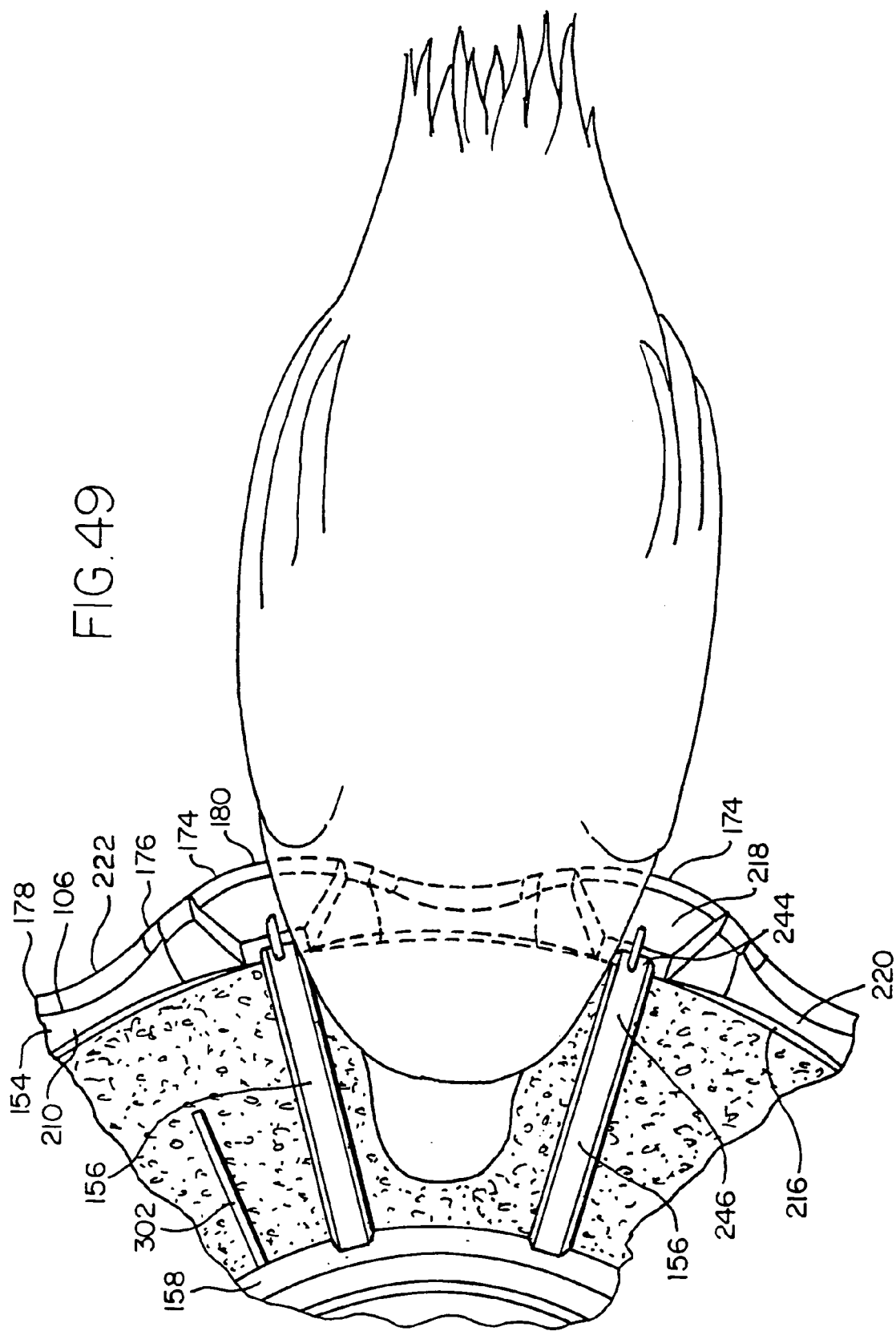

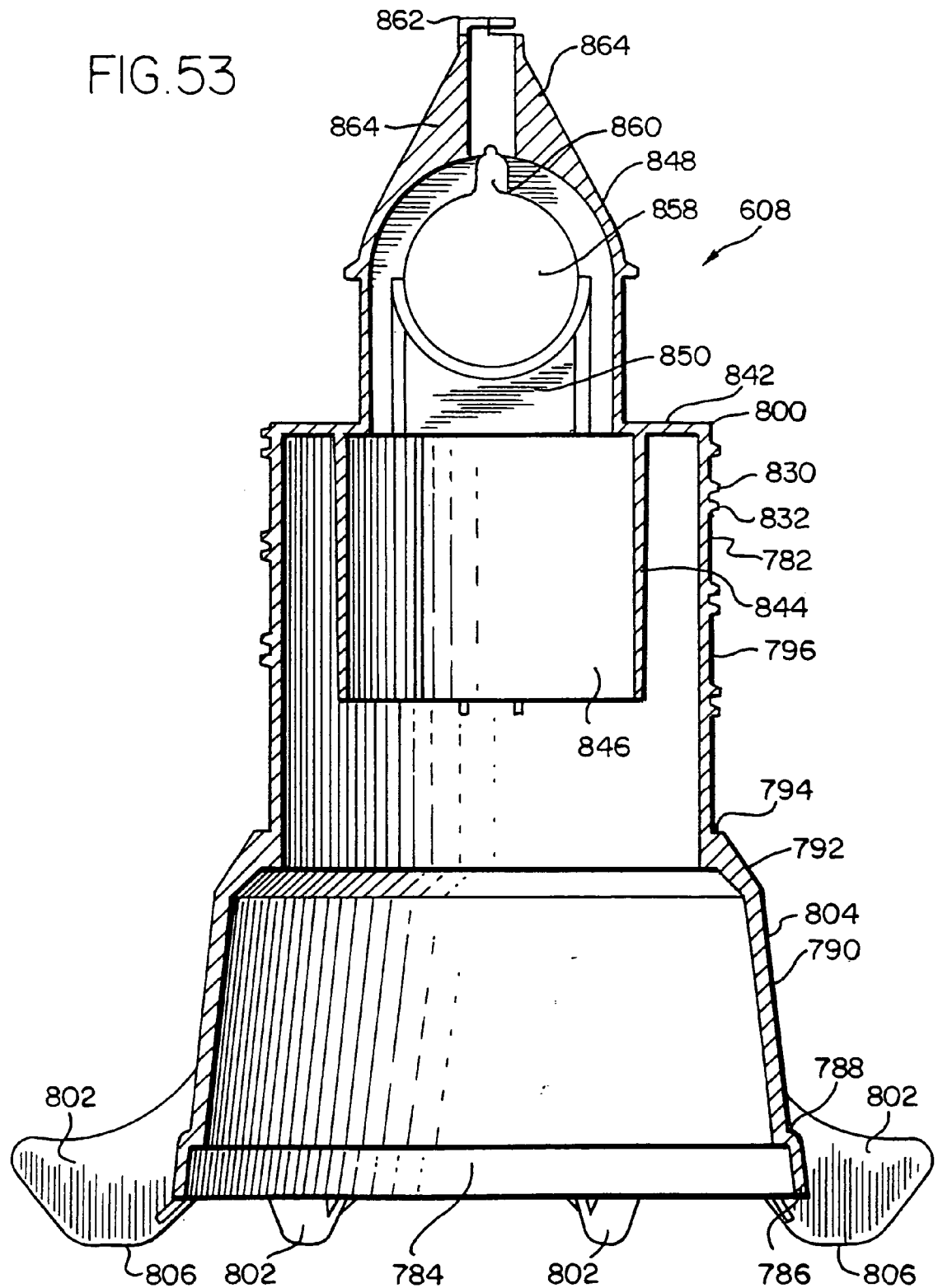

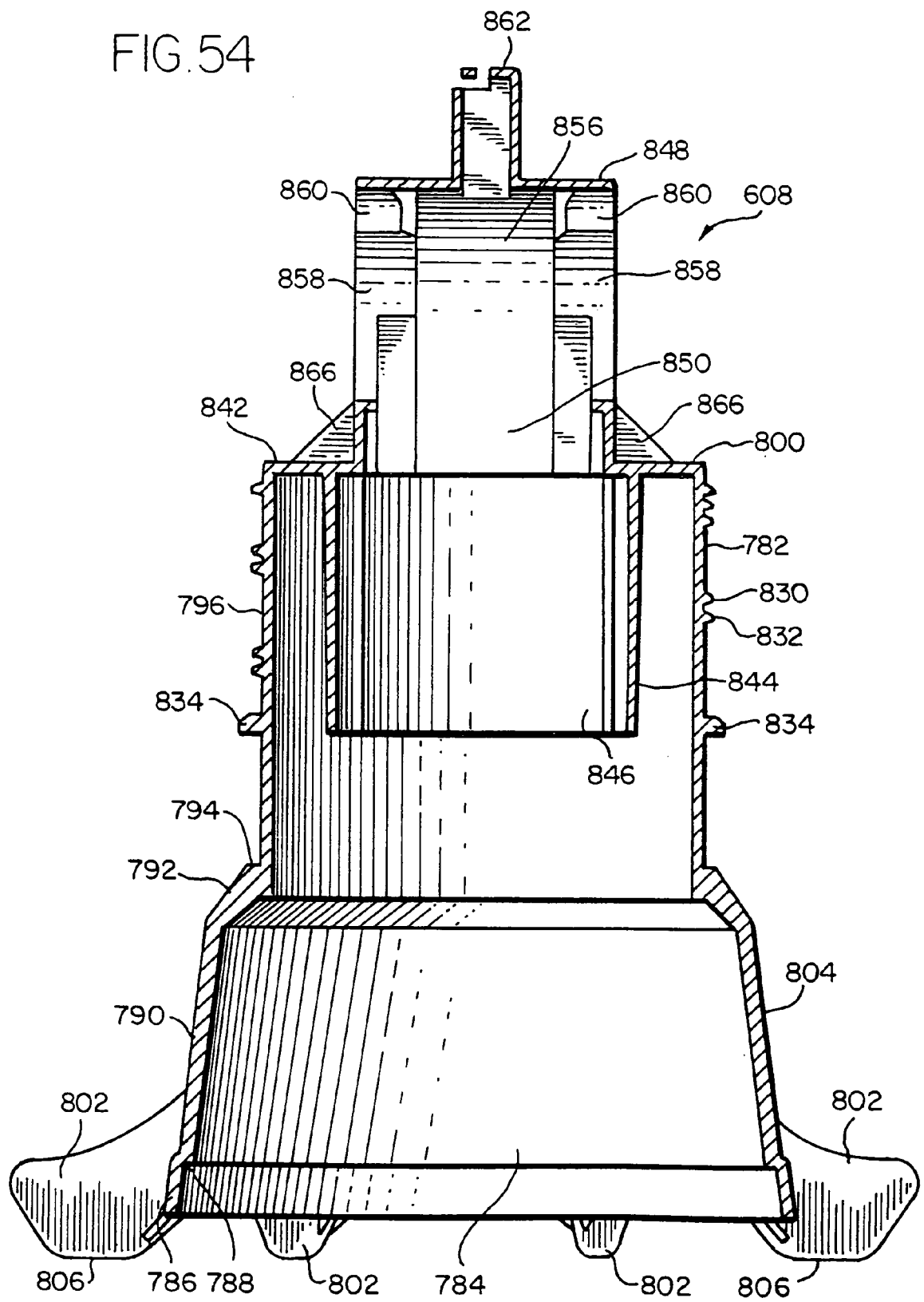

GRILL MEMBER FOR USE IN A POULTRY FEEDER

CROSS-REFERENCE

This patent application is a divisional application of U.S. patent application Ser. No. 10/455,054, filed on Jun. 5, 2003, and entitled "Poultry Feeder" which, in turn, claims the benefit of domestic priority of U.S. Provisional Application Ser. No. 60/391,731, filed Jun. 26, 2002, and entitled "Poultry Feeder".

BACKGROUND OF THE INVENTION

The invention relates to animal feeding systems and, more particularly, relates to feeder assemblies for poultry and the like.

Automated feeding systems for poultry and like domestic animals have proved highly successful in modern animal husbandry operations. These systems can supply feed mixtures to a large poultry flock with minimum effort by the poultry grower. Both the amounts of feed delivered and the proportions of feed ingredients can be regulated, thus permitting the flock to be inexpensively raised from chicks to mature, commercially valuable birds in a relatively short time.

Among the important parts of such automated feeding systems are the feeder assemblies. These assemblies receive feed flow from a feed conveyor, and are located on or near the poultry house floor to afford the birds ready access to the feed. Among the patents disclosing such feeder assemblies are, for example, U.S. Pat. Nos. 3,388,690, 3,511,215, 3,811,412, 3,911,868, 4,070,990, 4,476,811, 4,834,026, 4,995,343, 5,092,274, 5,941,193 and 6,173,676.

Early poultry growers traditionally introduced very young birds into poultry houses and provided supplemental feed to the young birds or chicks on paper, cardboard or the like, which was laid on the poultry house floor. The chicks were not initially introduced to feeding from feeder assemblies for two main reasons. One reason was that chicks were unable to gain access to the feed in the feeder assemblies because the height of the feeder assemblies from where the birds would gain access to the feed was too high for the chicks. Another reason was that the feed which was introduced into the feeder assembly was always provided on the bottom of a pan of the feeder assembly such that even if the young birds could reach over the height of the side of the feeder assembly, the birds could not then reach down to eat the feed at the bottom of the feeder assembly. Thus, the poultry grower provided supplemental feed to the chicks either by providing the supplemental feed to the chicks outside of the feeder assemblies or by hand filling the supplemental feed into the feeder assemblies to provide a high feed level.

Problems, however, arose with such practice. Among these problems, obviously, was that such a practice required more time and labor by the poultry grower which could be better utilized elsewhere. Also, the feed provided on the floor of the poultry house came into contact with waste, dirt, etc., which the birds would also then eat, potentially causing health problems for the birds. Further, the birds raked the feed with their feet such that the feed became spread out over the poultry house floor, such that a fair amount of the feed placed on the floor by the poultry grower was wasted.

Thus, many prior art feeders were designed to help combat these problems. For instance, the feeder assemblies disclosed in U.S. Pat. Nos. 5,311,839, 5,462,017 and 5,718,187 attempted to solve the problem of the height of the feeder assemblies being too high such that smaller birds could not gain access to or see the feed presented in the feeder assembly to eat it, thus requiring the poultry growers to either utilize the supplemental feed, as discussed above or provide separate feeder assemblies in which the smaller birds would be able to feed from. These feeder assemblies utilized a lost motion connection between the grill and the pan to provide both a shallow pan depth for younger, smaller birds and a deep pan depth for older, larger birds. The problem with the lost motion connection for the poultry grower is that in order to utilize the lost motion connection, the feeder assemblies had to be raised off of or lowered onto the poultry house floor. For instance, the feeder assemblies could not be lowered from the deep pan depth to the shallow pan depth without a bottom of the pan resting on the poultry house floor. As the floors of poultry houses are often uneven, the feeder assemblies could not all be consistently configured in the same manner when the feeder assemblies were positioned on the floor of the poultry house.

Other designs like the feeder assemblies disclosed in U.S. Pat. Nos. 4,476,811 and 5,092,274 also attempted to solve the problem of the feed being presented to younger, smaller birds at too low of a level within the feeder assemblies. The feeder assemblies provided both an upper or "brood" feed gate to provide high feed levels for younger, smaller birds and a lower feed gate to provide lower feed levels for older, larger birds. The upper feed gate was provided as a window in the feed drop tube of the feeder assembly, which, when open, would allow feed to flow therethrough to create a high feed level in the feeder assembly for the young birds to easily see and eat. When the birds grew older and larger, the poultry grower could close the upper feed gate and allow the feed to flow through the bottom of the feed drop tube, i.e., the lower feed gate, to provide a lower feed level.

These feeder assemblies, while highly successful in industry, do, however, have some disadvantages to them. For example, in these inventions, the upper and lower feed gates are typically not both able to be open if the poultry grower should so desire them to be. Also, the feed gates are typically only opened and closed by moving the feeder assemblies on and off of the ground. Finally, these feeder assemblies did not provide for a smooth transition from a high feed level to a low feed level; as a practical matter the poultry grower could only provide a high feed level or a low feed level, but nothing in between.

Feeder assemblies of the prior art have also caused other problems for the poultry grower. For example, when birds grow larger, the birds typically like to eat from the feeder assemblies by resting a front side of their bodies on or against the feeder assembly in some manner. As feeder assemblies of the prior art have not typically been designed with the comfort and health of the birds in mind, the birds tend to eat from the feeder assemblies while being uncomfortable. In many prior art feeder assemblies, when birds rest on or against the feeder assemblies, detrimental physical effects, such as bruising, blistering, irritation, etc., to the front sides of the bird's bodies, such as their breasts, may occur. Such detrimental physical effects can cause two major problems. One is that since the front sides of the birds' bodies will become detrimentally physically effected, the birds will not be comfortable resting on or against the feeder assemblies, such that the birds may not eat as much food from the feeder assemblies as it is too uncomfortable for them to do so. Thus, the birds either do not become as large and are not as commercially valuable as they could have been, or the rate at which the birds grow is reduced, thus taking longer for them to reach their optimal size and weight. Secondly, once the birds are defeathered and graded, if the front sides of bird's bodies are detrimentally physically effected, the birds will receive a lower grade, thus making them less commercially valuable.

Therefore, an improved feeder assembly is needed which will overcome the problems and disadvantages of prior art feeder assemblies. The present invention provides such a feeder assembly. Features and advantages of the present invention will become apparent upon a reading of the attached specification, in combination with a study of the drawings.

OBJECTS AND SUMMARY OF THE INVENTION

A primary object of the invention is to provide a feeder assembly which has both a lower and an upper feed gate for providing feed into a pan member of the feeder assembly.

Another primary object of the invention is to provide a feeder assembly which has an upper feed gate which is adjustable or variable such that the feeder assembly can provide feed at a relatively high level to a relatively low level in a smooth transition.

Yet another primary object of the invention is to provide a feeder assembly which allows the upper feed gate to be opened or closed without requiring the feeder assembly to be raised off of the ground or be set on the ground.

Another primary object of the invention is to provide a feeder assembly with an upper feed gate which can be manually or automatically adjusted to provide different levels of feed in the pan of the feeder assembly.

Still another primary object of the invention is to provide a feeder assembly which acts as a shallow depth feeder for smaller birds and as a deep depth feeder for larger birds.

Another primary object of the invention is to provide a feeder assembly which is configured to lend itself to the welfare of birds which feed from the feeder assembly.

Another object of the invention is to provide a feeder assembly which has a lower feed gate which can be raised or lowered by rotation of a grill member relative to a drop tube member of the feeder assembly.

An object of the invention is to provide a lower feed gate which is always at least partially open to allow some feed to flow therethrough.

Another object of the invention is to provide a feeder assembly which provides for a reduction in detrimental physical effects caused to the birds when the birds feed from the feeder assembly.

Yet another object of the invention is to provide a feeder assembly which is designed for bird comfort such that birds will tend to eat longer when positioned against the feeder assembly.

Another object of the invention is to provide a feeder assembly which will reduce bird condemnation when the birds are visually inspected and graded.

Still another object of the invention is to provide a feeder assembly which discourages the birds feeding therefrom from raking the feed provided within the feeder assembly.

Another object of the invention is to provide a feeder assembly which has indicators thereon to allow for the easy determination of the height of the lower feed gate.

Yet another object of the invention is to provide a feeder assembly which positively selectively locks the height of the lower feed gate into place Still another object of the invention is to provide a feeder assembly having a high cone on the feed pan to promote high feed levels out of the upper feed gate of the feeder assembly.

Another object of the invention is to provide a feeder assembly having a wide eating area on the feed pan to provide smaller birds with more room to eat and to provide a visually larger feed area which encourages birds to eat.

Still another object of the invention is to provide a feeder assembly having a wide feeding area which is positioned radially further away from the center of the feeder assembly than feeding areas of prior art feeders, thus providing birds easier access to the feed.

Yet another object of the invention is to provide a feeder assembly having structure thereon to make cleaning of the feeder assembly relatively easy.

Still another object of the invention is to provide a feeder assembly which allows for the easy connection of the pan member to the grill member.

Still another object of the invention is to provide a feeder assembly which can be utilized to feed all different types of birds, including chickens, turkeys and ducks, from a time when the birds are very young until the birds are fully grown.

Briefly, and in accordance with the foregoing, the invention provides a feeder assembly which is adapted to be attached to a feed supply conduit of a feeder system. Three embodiments of the feeder assembly are provided.

The first embodiment of the feeder assembly generally includes a pan member, a grill member, an outer drop tube member, an inner drop tube member, and an inner drop tube actuator.

The outer drop tube member hangs from the feed supply conduit of the feeder system by a member which wraps around the feed supply conduit. The inner drop tube member is positioned within and supported by the outer drop tube member. Both the inner and outer drop tube members have windows or apertures therethrough. An extension of the inner drop tube member extends through an opening at a top of the outer drop tube member such that it can be connected to the inner drop tube actuator. When the inner drop tube actuator is moved, the inner drop tube member is rotated within the outer drop tube member such that an upper feed gate can be opened, by alignment of the windows, or closed, by disalignment of the windows.

The grill member is rotatably connected to the outer drop tube member by helical threads on both the grill member and the outer drop tube member, which allow a lower feed gate of the feeder assembly to be raised or lowered relative to the pan member.

A rim member of the grill member is connected to an upstanding outer portion of the pan member with an upstanding inner portion of the pan member extending within the inner drop tube member. The pan member has a base portion between the upstanding outer and inner portions for presenting feed. The upstanding inner portion of the pan member helps promote high feed levels out of the upper feed gate.

The outer drop tube member has wing portions extending from a bottom thereof which can be positioned above the base portion of the pan member to ensure that the lower feed gate of the feeder assembly is always partially open such that some feed can flow therethrough.

The grill member is configured such that birds which lean on or against the rim and spoke members of the grill member to eat feed presented in the pan member will not be detrimentally physically effected, or the detrimental physical effects will, at a minimum, be decreased. The birds will also be comfortable leaning against the rim and spoke members such that feeding is promoted.

The rim member of the grill member also is configured such that a shallow pan depth is provided for smaller birds while a deep pan depth is provided for larger birds. The shallow and deep pan depths are provided without the need to adjust any portion of the feeder assembly.

The second embodiment of the feeder assembly removes the inner drop tube member and the inner drop tube actuator, and removes the windows from the outer drop tube member such that feed supplied to the feeder assembly is forced to flow through only the lower feed gate.

The third embodiment of the feeder assembly removes the grill member such that only the pan member is provided, with the pan member being configured similar to the rim member of the grill member in the first and second embodiments of the feeder assembly, such that when birds which lean on or against the pan member to eat feed presented therein will not be detrimentally physically effected.

BRIEF DESCRIPTION OF THE DRAWINGS

The features of the present invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIG. 8 is a cross-sectional side view of the pan member of FIG. 6 taken along line 8—8;

FIG. 9 is a side-elevational view of the pan member of the first embodiment of the feeder assembly of the invention;

FIG. 10 is a side-elevational view of the pan member of the first embodiment of the feeder assembly of the invention which is rotated 30 degrees in relation to FIG. 9;

FIG. 24 is a top plan view of the outer drop tube member of the first embodiment of the feeder assembly of the invention;

FIG. 25 is a cross-sectional side elevational view of the outer drop tube member of FIG. 24 taken along line 25—25;

FIG. 26 is a cross-sectional side elevational view of the outer drop tube member of FIG. 24 taken along line 26—26;

FIG. 28 is a side elevational view of a portion of the outer drop tube member of the first embodiment of the feeder assembly of the invention;

FIG. 30 is a top plan view of the inner drop tube member of the first embodiment of the feeder assembly of the invention;

FIG. 31 is a cross-sectional side elevational view of the inner drop tube member of FIG. 30 taken along line 31—31;

FIG. 32 is a cross-sectional top plan view of the inner drop tube member of FIG. 31 taken along line 32—32;

FIG. 33 is a cross-sectional side elevational view of the inner drop tube member of FIG. 30 taken along line 33—33;

FIG. 40 is a side elevational view of a portion of the first embodiment of the feeder assembly of the invention illustrating a third inner drop tube member actuator secured to the inner drop tube member;

FIG. 41 is a cross-sectional side-elevational view of the third inner drop tube member actuator of FIG. 40 taken along line 41—41;

FIG. 42 is a side elevational view of the third inner drop tube member actuator of the first embodiment of the feeder assembly of the invention;

FIG. 43 is a partial cross-sectional side elevational view of the first embodiment of the feeder assembly of the invention with a chick feeding therefrom and feed flowing through both a lower feed gate and an upper feed gate in a first position;

FIG. 44 is a side-elevational view of a portion of the feeder assembly of FIG. 43 illustrating the alignment of the windows of the inner and outer drop tube members relative to one another to define the upper feed gate in the first position;

FIG. 45 is a partial cross-sectional side elevational view of the first embodiment of the feeder assembly of the invention with a bird feeding therefrom and feed flowing through both a lower feed gate and an upper feed gate in a second position;

FIG. 46 is a side-elevational view of a portion of the feeder assembly of FIG. 45 illustrating the alignment of the windows of the inner and outer drop tube members relative to one another to define the upper feed gate in the second position;

FIG. 47 is a partial cross-sectional side elevational view of the first embodiment of the feeder assembly of the invention with a bird feeding therefrom and feed flowing through only a lower feed gate;

FIG. 48 is a side-elevational view of a portion of the feeder assembly of FIG. 47 illustrating the misalignment of the windows of the inner and outer drop tube members relative to one another;

FIG. 49 is a partial top plan view of the first embodiment of the feeder assembly of the invention with a bird feeding therefrom such that a front portion of the bird's body conforms to the rim member of the grill member of the feeder assembly;

FIG. 53 is a cross-sectional side elevational view of the drop tube member of FIG. 52 taken along line 53—53;

FIG. 54 is a cross-sectional side elevational view of the drop tube member of FIG. 52 taken along line 54—54;

DETAILED DESCRIPTION OF THE PREFERRED EMBODIMENTS

Figure 1:
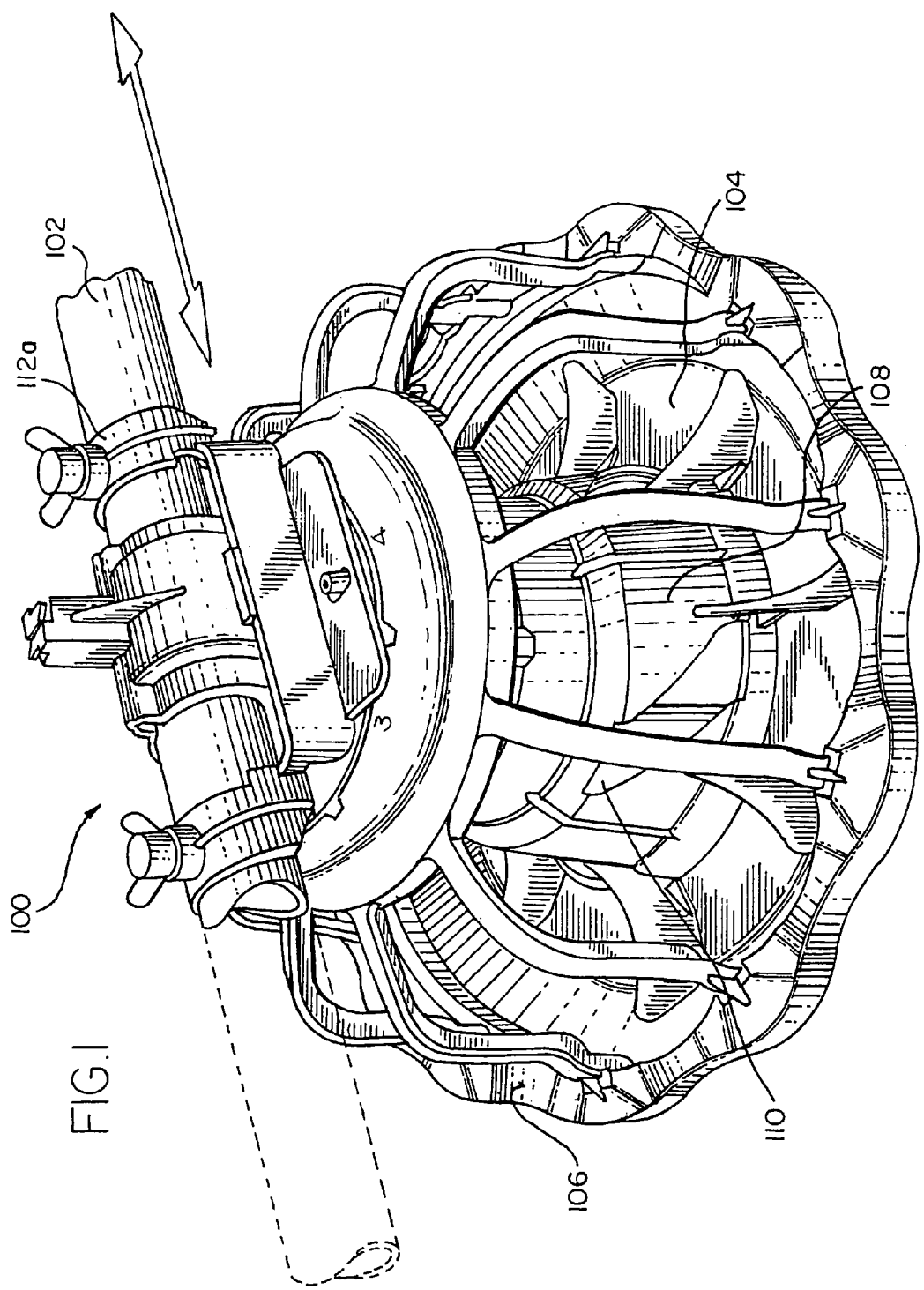
FIG. 1 is a perspective view of a first embodiment of a feeder assembly of the invention having a first inner drop tube actuator.
Figure 2:
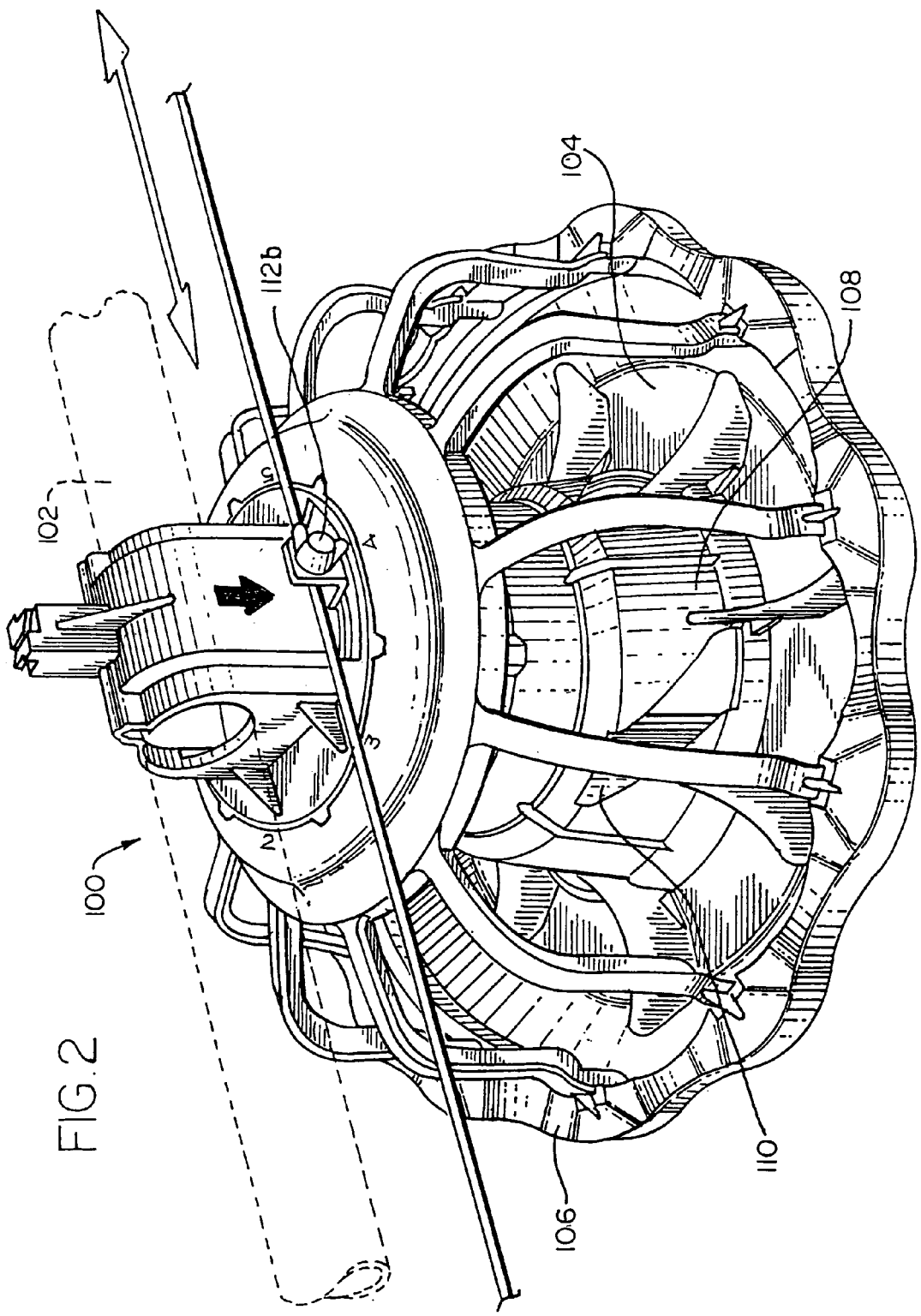
FIG. 2 is a perspective view of the first embodiment of the feeder assembly of the invention having a second inner drop tube actuator.
Figure 3:
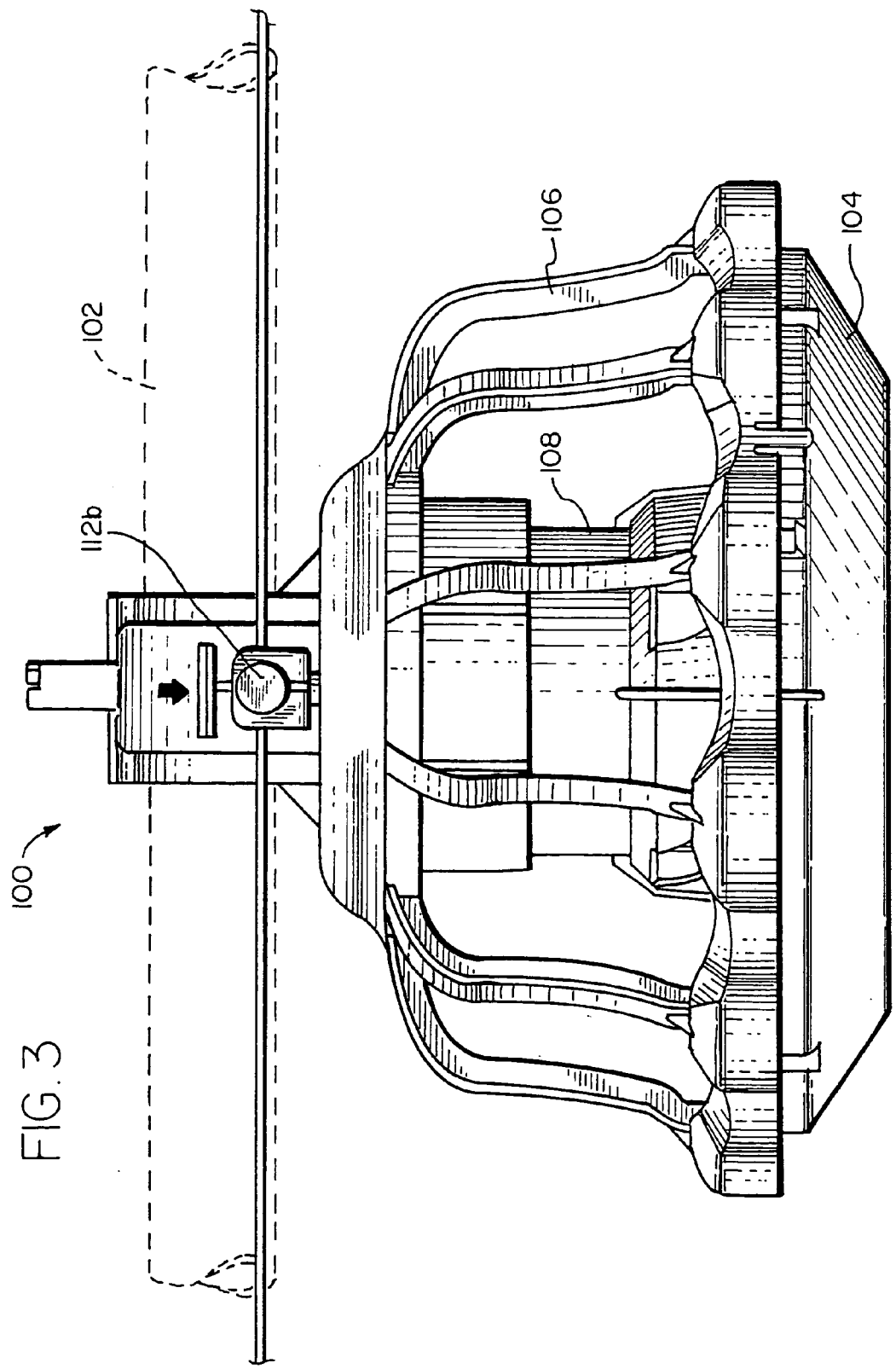
FIG. 3 is a side elevational view of the first embodiment of the feeder assembly illustrated in FIG. 2.
Figure 4:
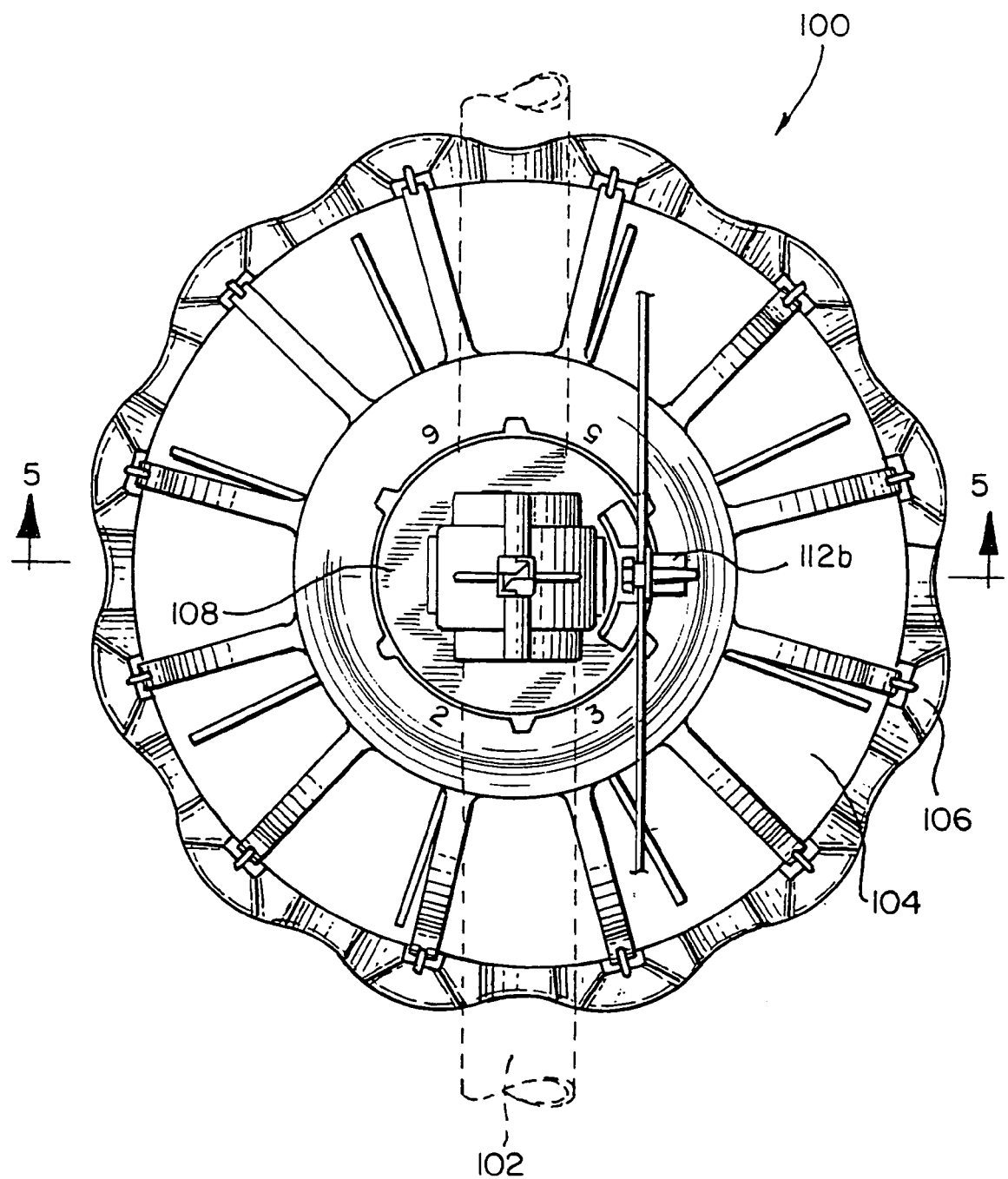
FIG. 4 is a top plan view of the first embodiment of the feeder assembly illustrated in FIG. 2.
Figure 5:
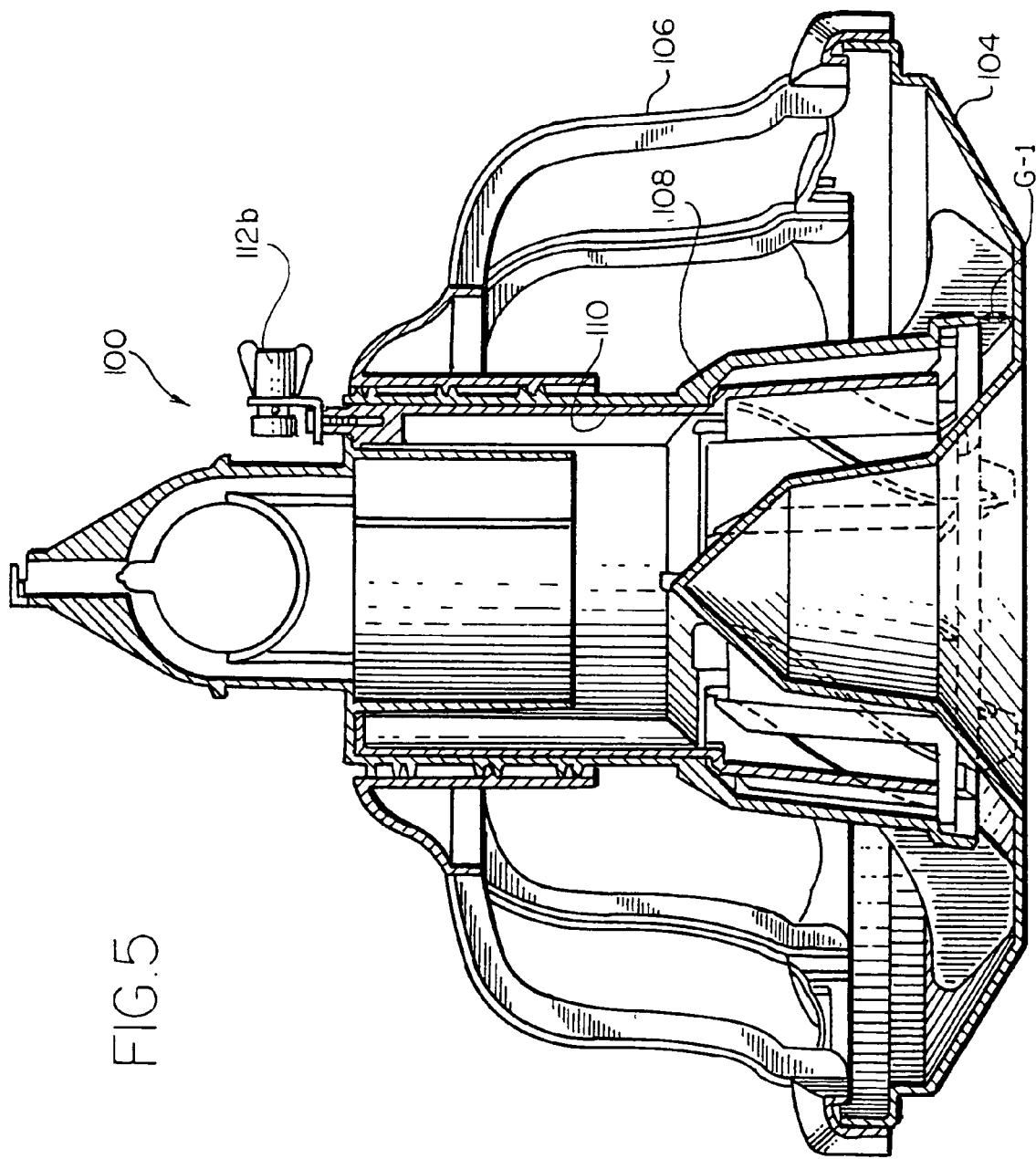
FIG. 5 is a cross-sectional side elevational view of the first embodiment of the feeder assembly of FIG. 4, taken along line 5—5, with the second inner drop tube actuator being shown in side elevational view.
Figure 6:
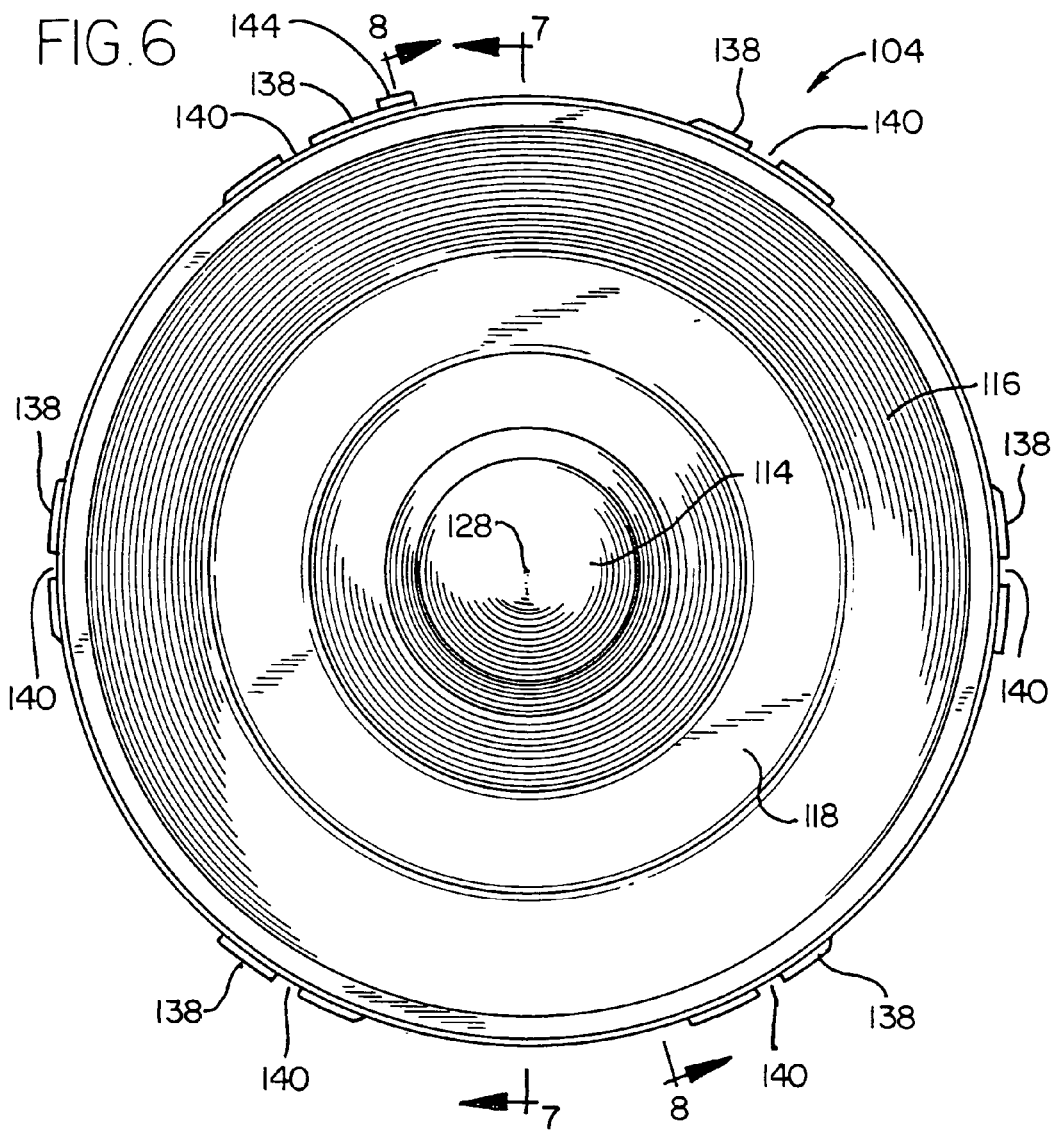
FIG. 6 is a top plan view of a pan member of the first embodiment of the feeder assembly of the invention.
Figure 7:
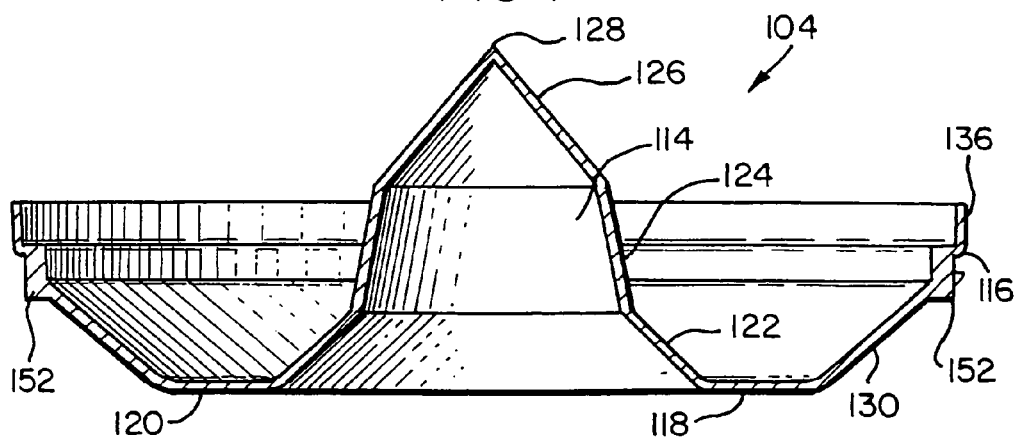
FIG. 7 is a cross-sectional side view of the pan member of FIG. 6 taken along line 7—7.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated and described herein.

Figure 58:
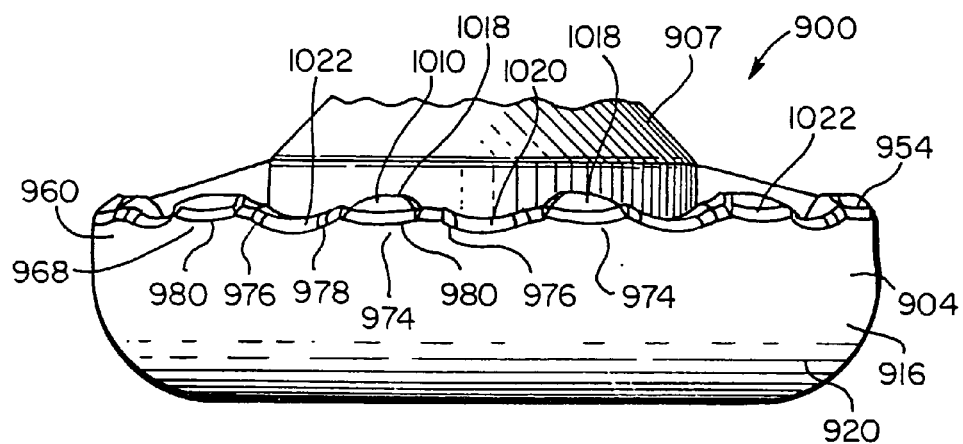
FIG. 58 is a side elevational view of a third embodiment of the feeder assembly of the invention.
Figure 59:
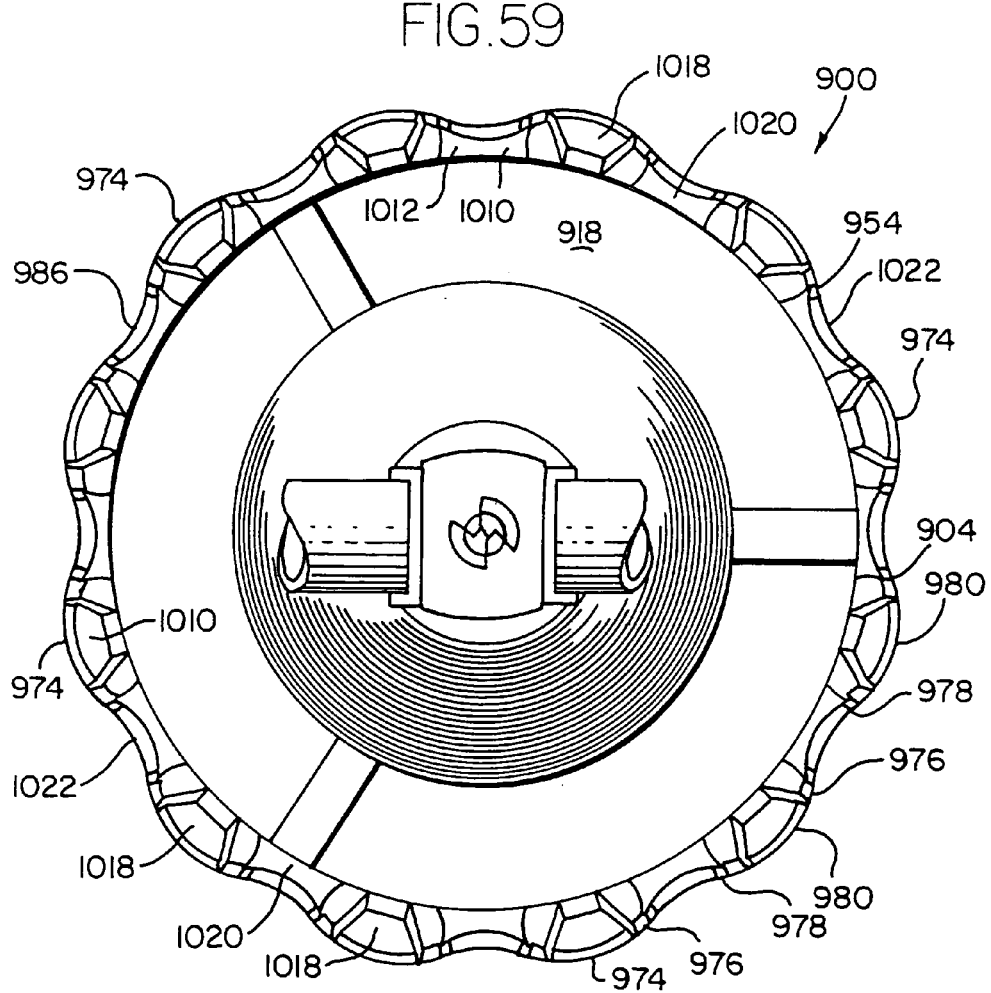
FIG. 59 is a top plan view of the third embodiment of the feeder assembly of the invention.
Figure 60:
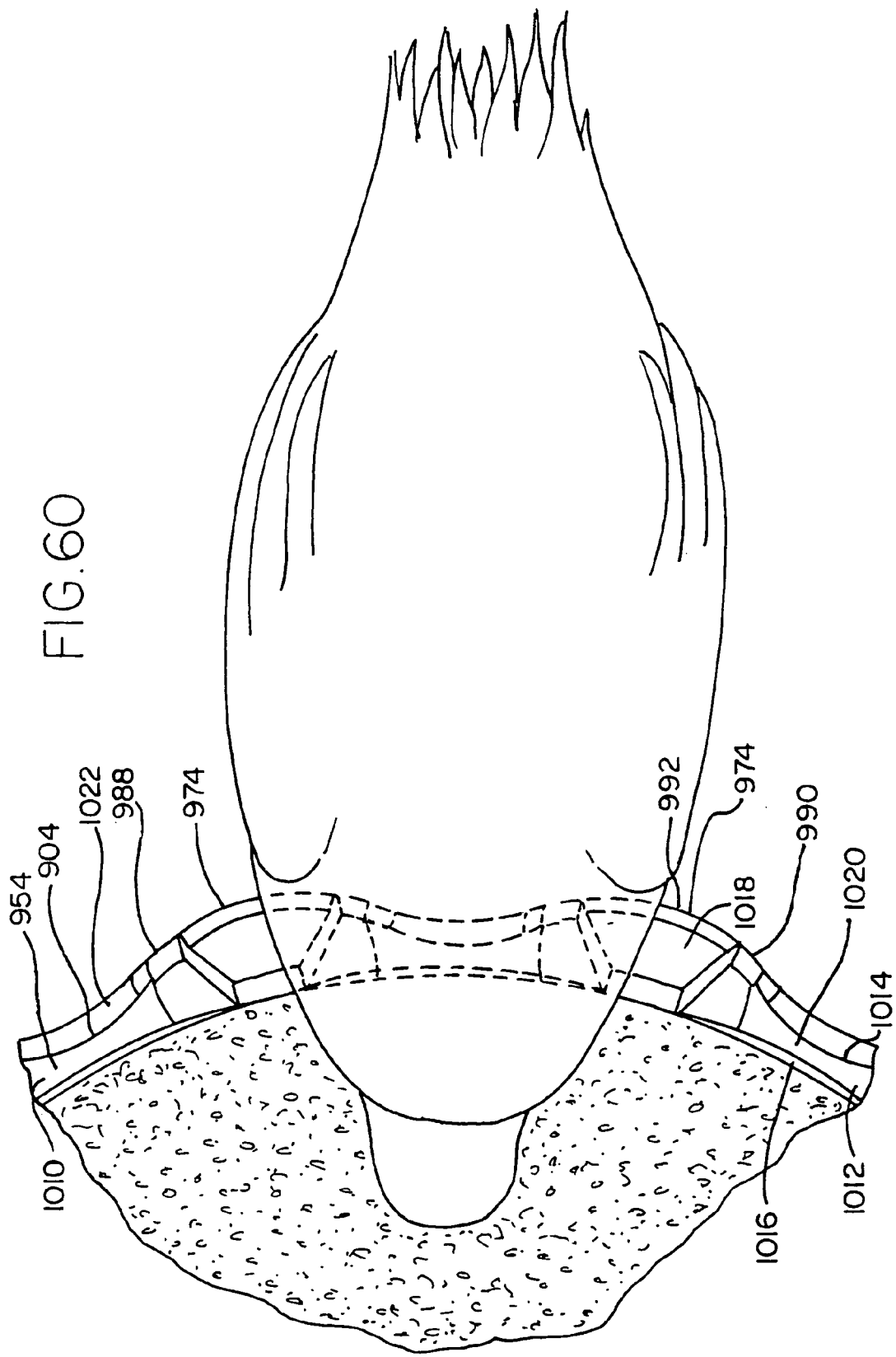
FIG. 60 is a partial top plan view of the third embodiment of the feeder assembly of the invention with a bird feeding therefrom such that a front portion of the bird's body conforms to the rim member of the pan member of the feeder assembly.

A first embodiment of the feeder assembly 100 which incorporates features of the invention is shown in FIGS. 1–49 with reference numerals being in the one, two, three, four and five hundreds. A second embodiment of the feeder assembly 600 which incorporates features of the invention is shown in FIGS. 50–57 with reference numerals being in the six, seven and eight hundreds. A third embodiment of the feeder assembly 900 which incorporates features of the invention is shown in FIGS. 58–60 with reference numerals being in the nine and ten hundreds.

Structure of the Feeder Assembly 100

Attention is invited to the first embodiment of the feeder assembly 100 which is illustrated in FIGS. 1–49. The illustrated feeder assembly 100 desirably is adapted to be used in connection with a poultry feeder system that includes a feed supply conduit 102. Desirably, the poultry feeder system includes a plurality of feeder assemblies 100, which can be vertically adjusted to either rest on the ground or be suspended above the ground by raising or lowering the feed supply conduit 102 or by other suitable means. The feeder assemblies 100 are preferably utilized to feed all different types of birds including chickens, turkeys and ducks, from a time when the birds are very young until the birds are fully grown. It should be noted that other types of animals could also be fed with the feeder assemblies 100 of the invention.

The illustrated feeder assembly 100 generally includes a pan member 104, a grill member 106, an outer drop tube member 108, an inner drop tube member 110, and an inner drop tube actuator 112.

Pan Member 104

Attention is now directed to the pan member 104, which is best illustrated in FIGS. 6–14.

The pan member 104, in a preferred embodiment, is generally circular and includes an upstanding inner portion 114, an upstanding outer portion 116, and a base portion 118 which extends from a bottom end of the upstanding inner portion 114 to a bottom end of the upstanding outer portion 116. The upstanding inner portion 114, the upstanding outer portion 116 and the base portion 118 are preferably integrally formed and, working together, support and present feed that is supplied to the feeder assembly 100 by the feed supply conduit 102. It should be noted that the configuration of the pan member 104 could be formed in a manner other than circular in order to achieve the objects of the invention. The bottom or outer surface 120 of the base portion 118 is capable of resting on a feeding surface of a poultry house, such as a floor or the ground.

The upstanding inner portion 114 is generally formed of a first portion 122, a second portion 124 and a third portion 126. In a preferred embodiment, the first portion 122 extends downwardly and outwardly to an inner end of the base portion 118 at an angle A relative to a horizontal line L. The second portion 124 extends downwardly and outwardly to an end of the first portion 122 at an angle B relative to the horizontal line L. The third portion 126 extends downwardly and outwardly from a point 128 to an end of the second portion 124 at an angle C relative to the horizontal line L. The upstanding inner portion 114 is representative of a cone extending upwardly from the base portion 118. Angle A is preferably smaller than angles B and C and angle C is preferably smaller than angle B. In a preferred embodiment, angle A is forty-five (45) degrees, angle B is eighty (80) degrees and angle C is fifty (50) degrees.

The upstanding outer portion 116 is generally formed of a first portion 130, a second portion 132, a third portion 134, and a fourth portion 136. In a preferred embodiment, the first portion 130 extends downwardly and inwardly to an outer end of the base portion 118 at an angle D relative to the horizontal line L. The second portion 132 extends vertically downwardly to an end of the first portion 130. The third portion 134 extends horizontally inwardly to an end of the second portion 132. The fourth portion 136 extends vertically downwardly to an end of the third portion 134. Angle D is preferably equivalent to angle A and, therefore, in the preferred embodiment, angle D is forty-five (45) degrees. In a preferred embodiment, the fourth portion 136 extends to a height that is less than a height to which the upper end of the second portion 124 of the upstanding inner portion 114 extends to and, therefore, the fourth portion 136 is positioned below the third portion 126 of the upstanding inner portion 114.

As best illustrated in FIGS. 6, 9–10 and 13–14, the pan member 104 preferably further includes a plurality of elongated extensions 138 protruding from the outer surface 120 of the fourth portion 136 of the upstanding outer portion 116 thereof and extending lengthwise therealong. The extensions 138 are preferably integrally formed with the pan member 104. In a preferred embodiment, the plurality of extensions 138 number six and are separated from their centers by sixty (60) degrees. Each extension 138 has a recess 140 provided therein which is capable of receiving a portion of the grill member 106, as will be discussed hereinbelow, for locking the grill member 106 to the pan member 104. Each extension 138 also has a downward vertical portion 142 at one end thereof which provides a stop to prevent excess rotation during the locking of the grill member 106 to the pan member 104.

Figure 11:
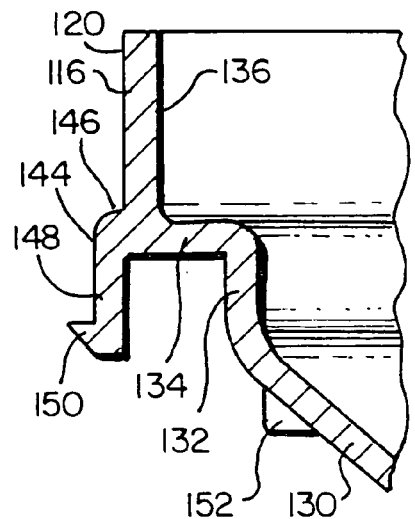
FIG. 11 is a cross-sectional side view of a portion of the pan member of FIG. 8.
Figure 12:
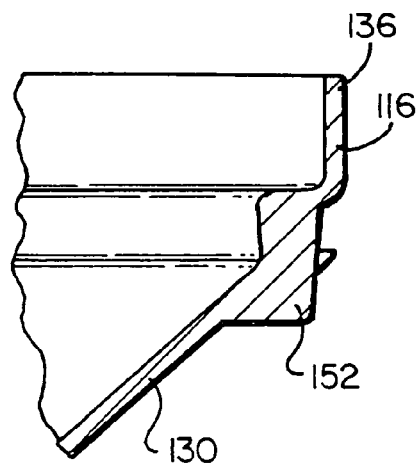
FIG. 12 is a cross-sectional side view of a portion of the pan member of FIG. 7.
Figure 13:
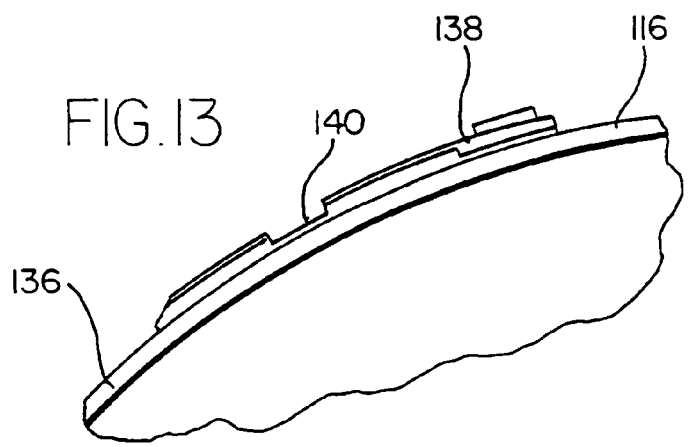
FIG. 13 is a top plan view of a portion of the pan member of FIG. 6.
Figure 14:
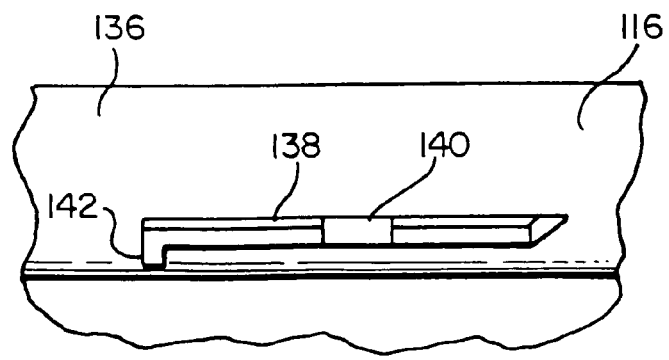
FIG. 14 is a side-elevational view of a portion of the pan member of FIG. 9.

As best illustrated in FIGS. 8 and 11, the pan member 104 also preferably includes a hook member 144 which is typically S-shaped. A first portion 146 of the hook member 144 extends horizontally outwardly from the outer surface 120 of the fourth portion 136 of the upstanding outer portion 116. The first portion 146 is positioned proximate to and below the end of one of the extensions 138. A second portion 148 of the hook member 144 extends vertically downwardly from an end of the first portion 146 of the hook member 144 to approximately the same position as where the first portion 130 and the second portion 132 of the upstanding outer portion 116 meet. A third portion 150 of the hook member 144 extends horizontally outwardly from an end of the second portion 148 of the hook member 144. The hook member 144 helps to suspend the pan member 104 from the grill member 106 for cleaning the feeder assembly 100, as will be described in more detail hereinbelow.

As best illustrated in FIGS. 7, 9–10 and 12, the pan member 104 also preferably includes a plurality of tab members 152 protruding from the outer surface 120 of the upstanding outer portion 116. The tab members 152 are preferably integrally formed with the pan member 104. The tab members 152 protrude from the outer surface 120 of the first, second and third portions 130, 132, 134 of the upstanding outer portion 116. In a preferred embodiment, the plurality of tab members 152 number six and are separated from their centers by sixty (60) degrees. Each tab member 152 is also preferably positioned equidistant from the centers of two of the extensions 138. The tab members 152 assist in the packing of a plurality of the pan members 104.

Grill Member 106

Attention is now directed to the grill member 106, which is best illustrated in FIGS. 15–22.

The grill member 106 includes a rim member 154, a plurality of spaced apart spoke members 156 and a collar member 158. Each spoke member 156 is connected at one end thereof to the rim member 154 and at an opposite end thereof to the collar member 158. The rim member 154, the spoke members 156 and the collar member 158 are all preferably integrally formed.

The rim member 154, in a preferred embodiment, is generally circular, although the configuration of the rim member 154 could be formed in a manner other than circular in order to achieve the objects of the invention. A side rim portion 160 of the rim member 154 has an outer wall 162 and an inner wall 164.

The inner wall 164 has an inner surface 166 and an outer surface 168. The inner wall 164 is preferably circular in configuration, but is commensurate in shape to the configuration of the rim member 154. The inner wall 164 extends upwardly from a bottom surface 170 of the side rim portion 160 to a top rim portion 210 of the rim member 154, which will be described herein. The bottom surface 170 of the side rim portion 160 is preferably planar. The inner surface 166 of the inner wall 164, the top rim portion 210, and a reinforcing member 240, which will be discussed further herein, form a pocket 172 therebetween which is capable of accepting the fourth portion 136 of the upstanding outer portion 116 of the pan member 104 for connection of the pan member 104 to the grill member 106, as will be discussed further herein.

The outer wall 162 of the side rim portion 160 is formed from a plurality of projections 174. In a preferred embodiment, and preferably for use with smaller birds, the plurality of projections 174 number twelve (12) and are spaced equidistantly apart from one another with a thirty (30) degree angle between the centers of the projections 174. In another preferred embodiment, and preferably for use with larger birds, the plurality of projections 174 number eight (not shown) and are spaced equidistantly apart from one another with a forty-five (45) degree angle between the centers of the projections 174.

In a preferred embodiment, and as best illustrated in FIGS. 15–17 and 20, each projection 174 has a first concave portion 176 at one end thereof, a second concave portion 178 at an opposite end thereof, and a convex portion 180 between the first and second concave portions 176, 178. On adjacent projections 174, an end of the first concave portion 176 of one of the adjacent projections 174 preferably, but not necessarily, meets an end of the second concave portion 178 of the other one of the adjacent projections 174, and also meet at the outer surface 168 of the inner wall 164 such that pockets 182 are formed between each projection 174 and the outer surface 168 of the inner wall 164. Thus, the outer wall 162 of the side rim portion 160 is provided at varying radial distances from a center of the feeder assembly 100.

Figure 17:
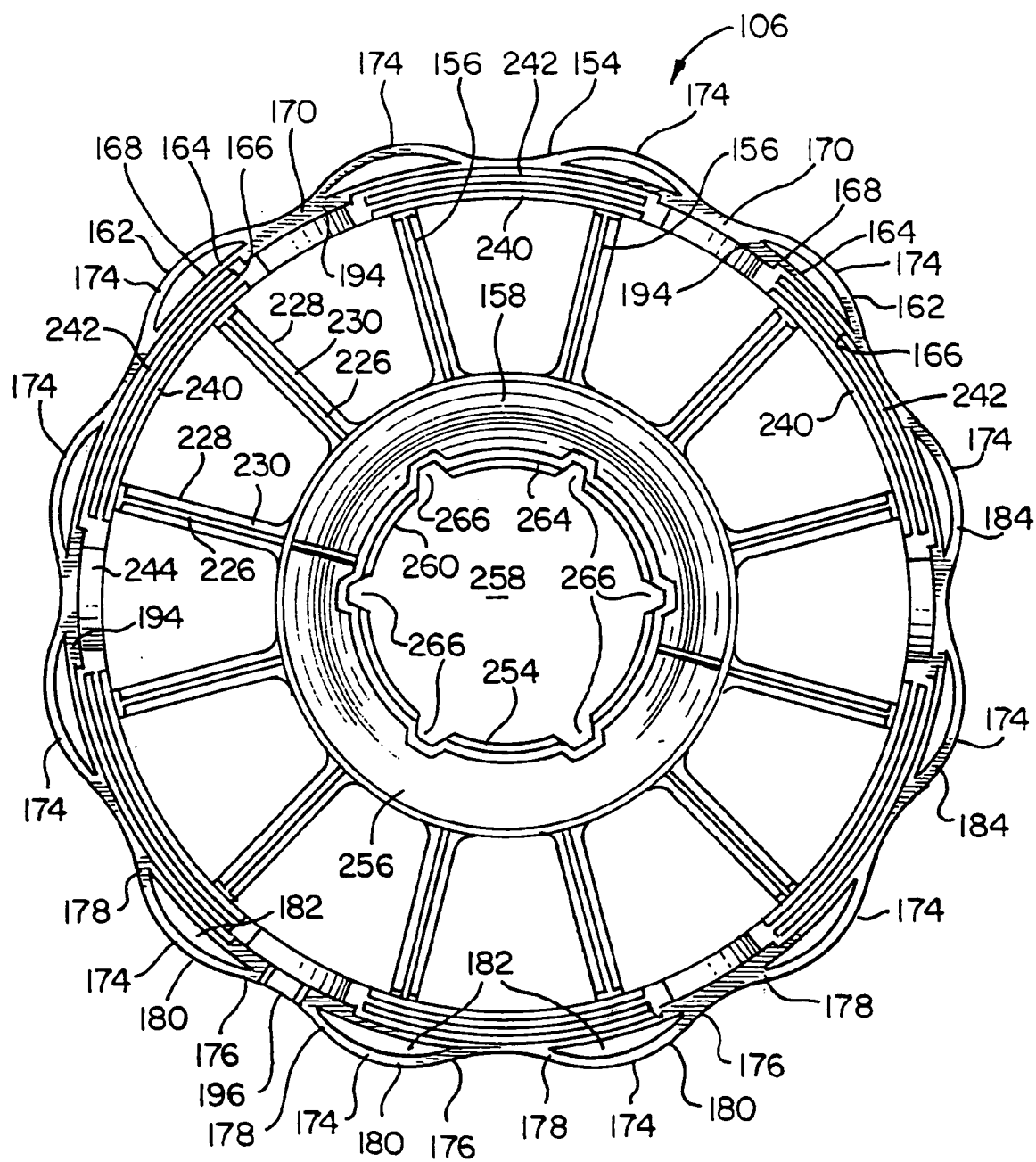
FIG. 17 is a bottom plan view of the grill member of the first embodiment of the feeder assembly of the invention.
Figure 18:
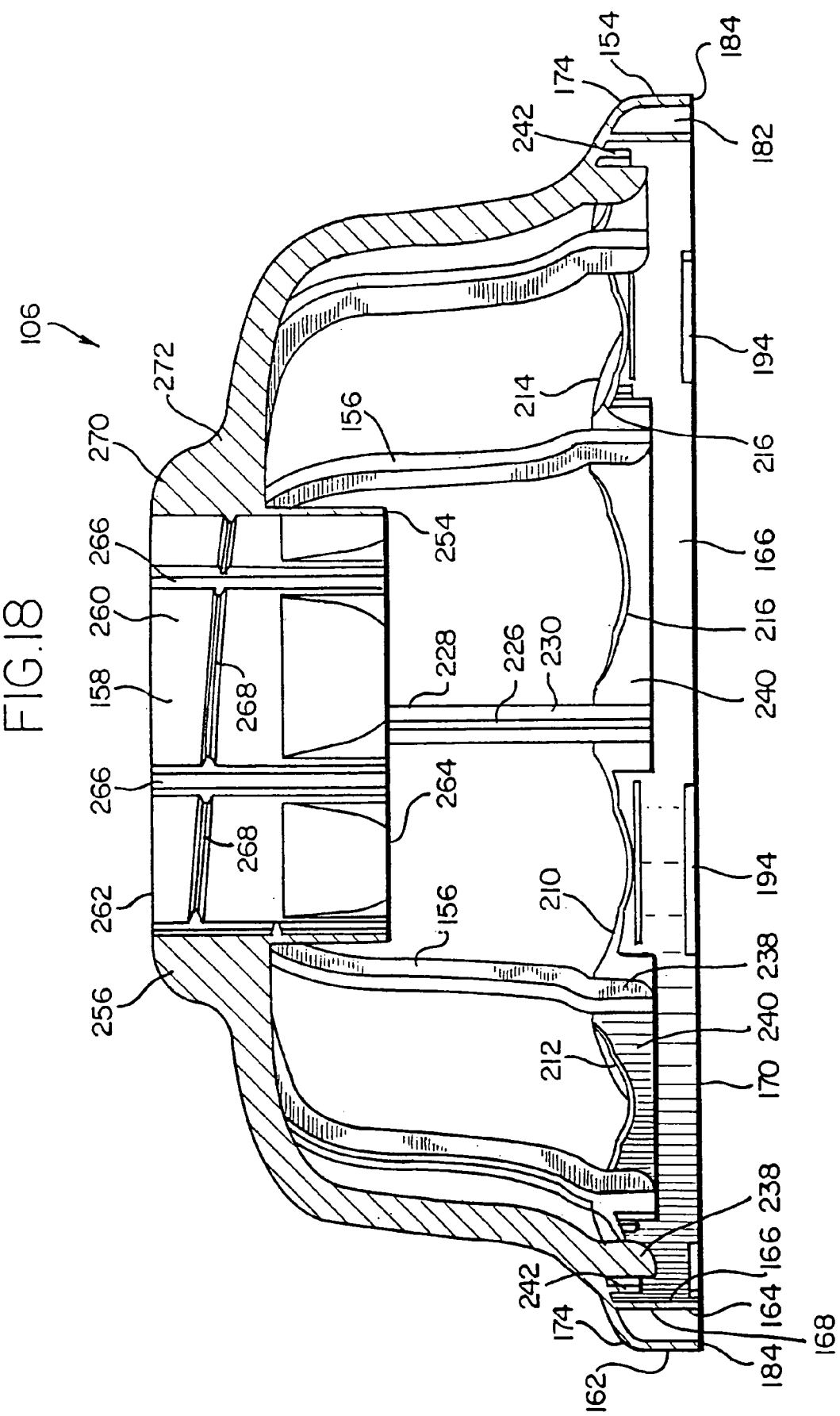
FIG. 18 is a cross-sectional side elevational view of the grill member of FIG. 16 taken along line 18—18.
Figure 19:
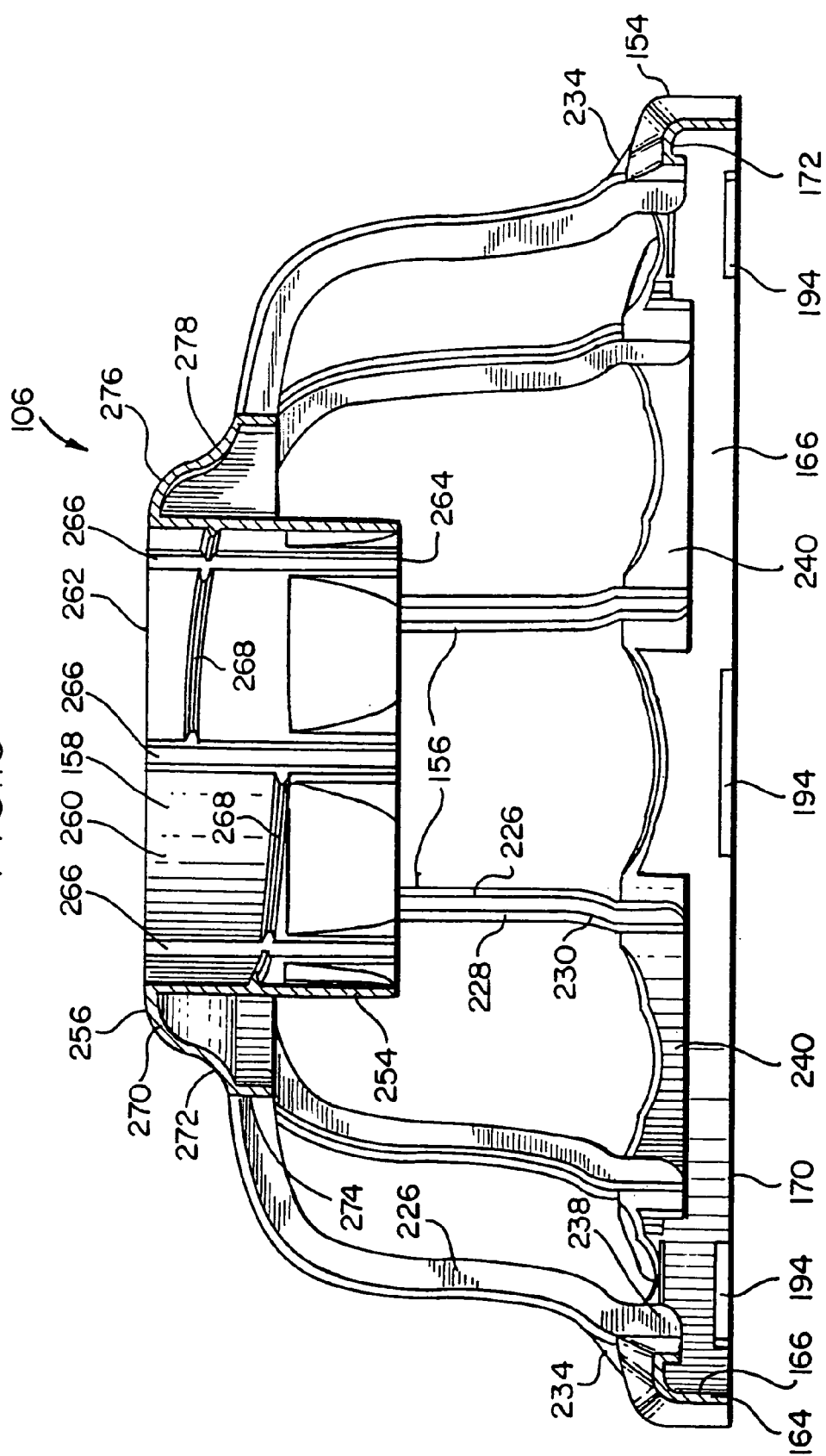
FIG. 19 is a cross-sectional side elevational view of the grill member of FIG. 16 taken along line 19—19.
Figure 20:
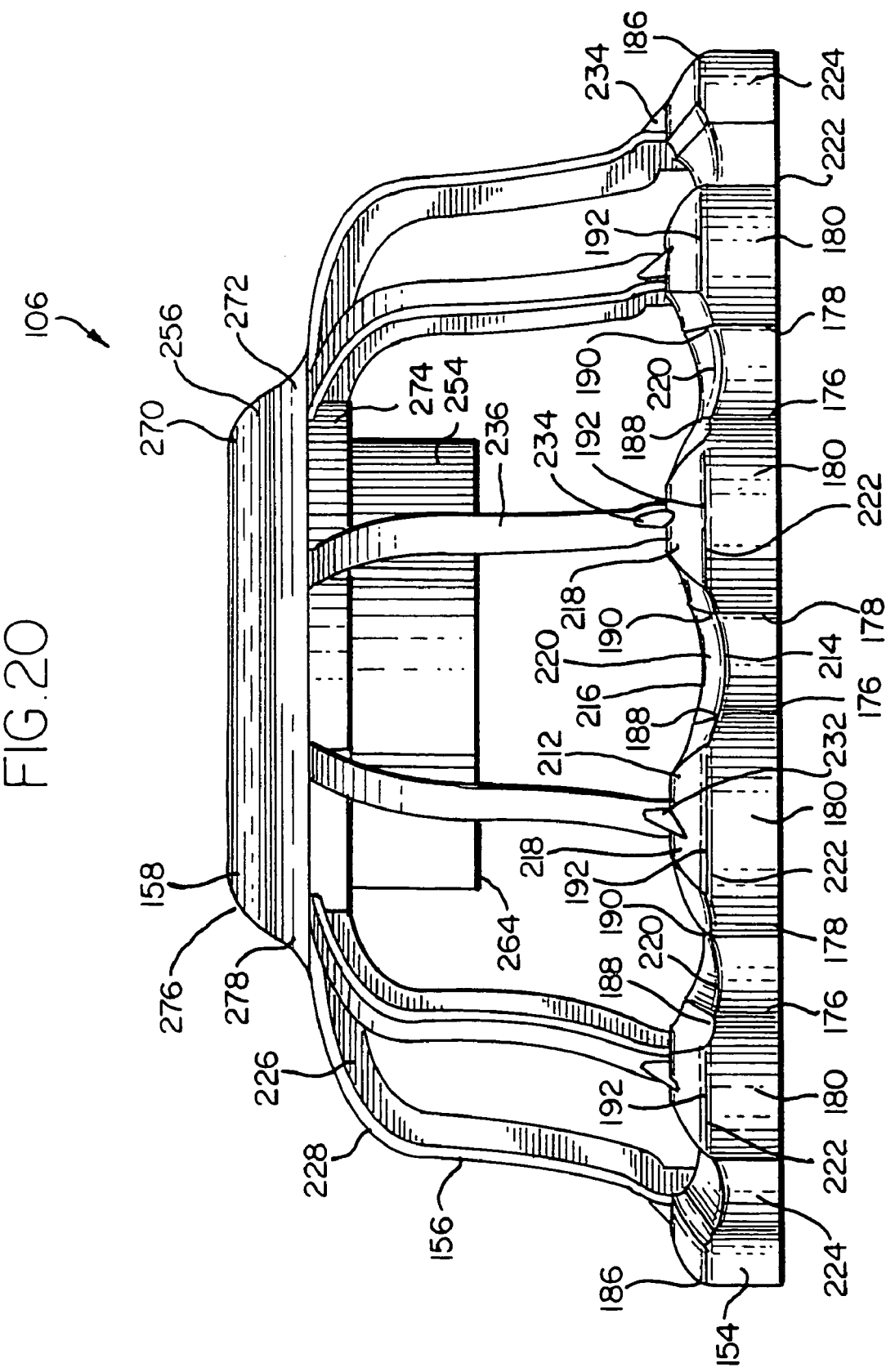
FIG. 20 is a side elevational view of the grill member of the first embodiment the feeder assembly of the invention.

Also, in a preferred embodiment, and as best illustrated in FIGS. 17–19, a lower edge 184 of the each projection 174 is positioned in a horizontal plane, along with the bottom surface 170 of the side rim portion 160, while an upper edge 186 of each projection 174 is formed of a first concave edge 188 at one end thereof, a second concave edge 190 at an opposite end thereof, and a convex edge 192 between the first and second concave edges 188, 190, as best illustrated in FIG. 20. On adjacent projections 174, an end of the first concave edge 188 of one of the adjacent projections 174 preferably, but not necessarily, meets an end of the second concave edge 190 of the other one of the adjacent projections 174. Thus, the upper edge 186 of the projections 174 of the side rim portion 160 is provided at varying vertical distances from the lower edge 184 of each projection 174. The first concave edge 188 is provided for at the upper edge 186 of the first concave portion 176, the second concave edge 190 is provided for at the upper edge 186 of the second concave portion 178, and the convex edge 192 is provided for at the upper edge 186 of the convex portion 180.

Figure 21:
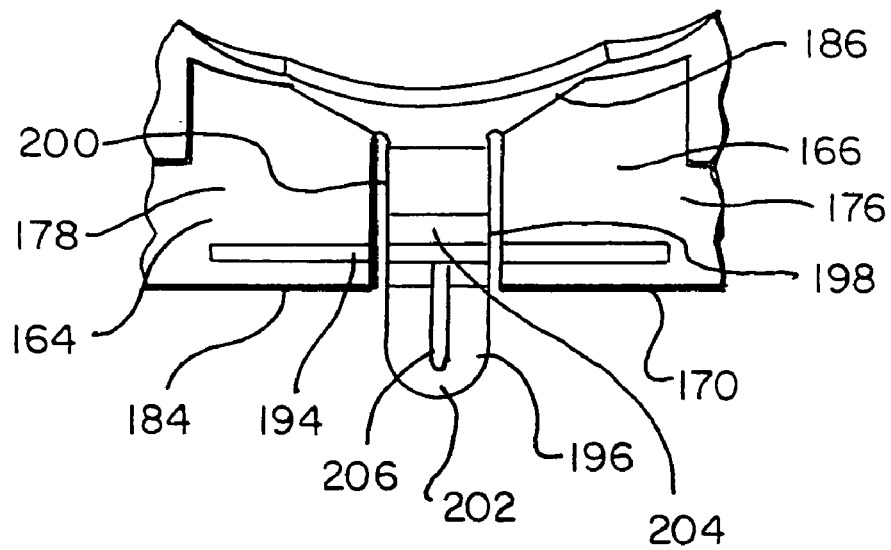
FIG. 21 is a cross-sectional side elevational view of a portion of the grill member of FIG. 16 taken along line 21—21.

The side rim portion 160 further preferably includes a plurality of spaced apart, elongated reinforcing members 194 along the inner surface 166 of the inner wall 164, as best illustrated in FIGS. 17, 19 and 21. The reinforcing members 194 are preferably positioned lengthwise along the inner surface 166 proximate to the connection on the outer wall 162 to the inner wall 164, namely at the connection of one of the first concave portions 176 to an adjacent second concave portion 178. The reinforcing members 194 are also preferably situated proximate to, or along, the bottom surface 170 of the side rim portion 160. In the preferred embodiment, the reinforcing members 194 number six (6) and are situated equidistantly from one another by sixty (60) degrees from their centers. Thus, the reinforcing members 194 are positioned on the inner surface 166 of the inner wall 164 proximate to the connection on the outer wall 162 of every other first and second concave portions 176, 178.

Figure 15:
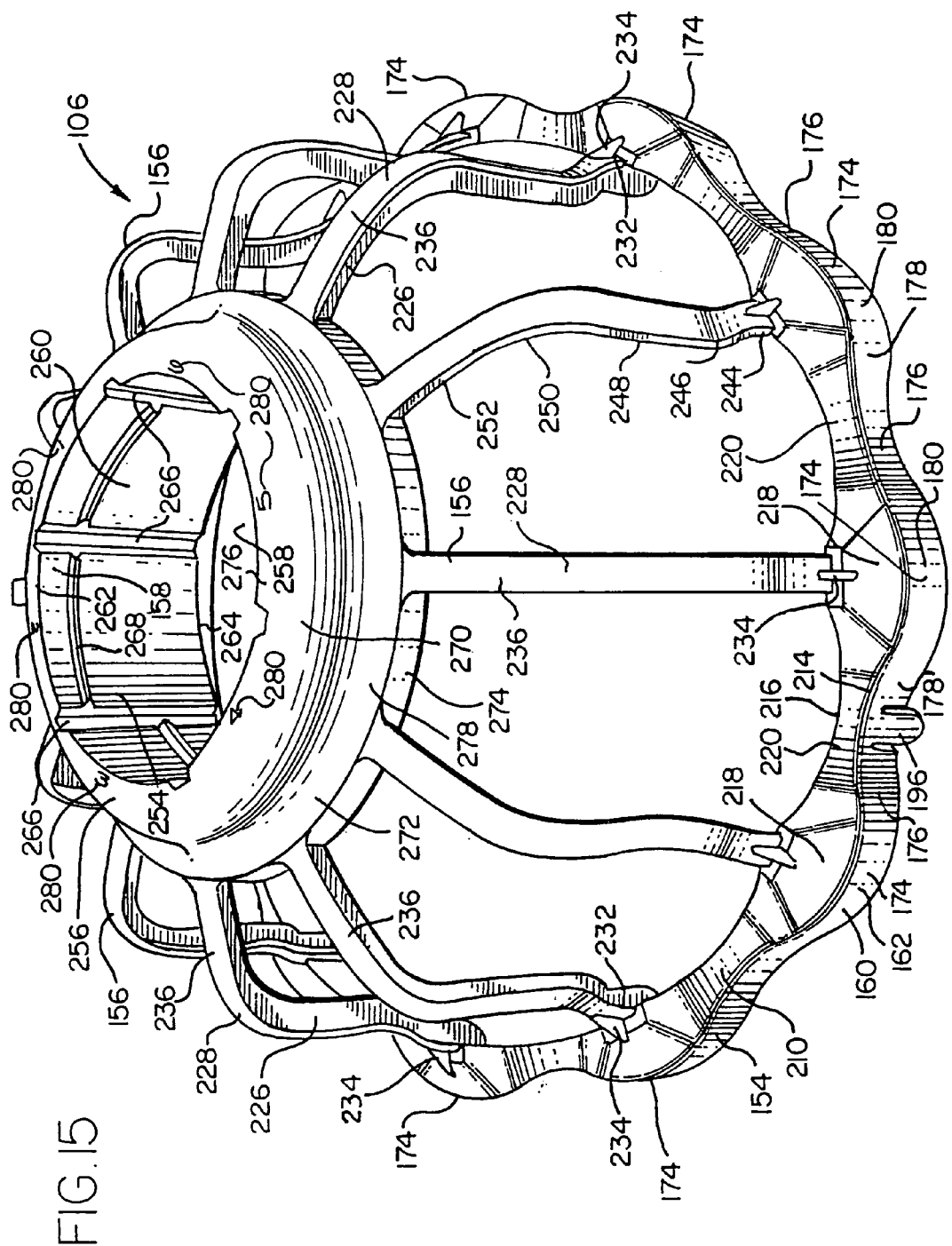
FIG. 15 is a perspective view of a grill member of the first embodiment of the feeder assembly of the invention.
Figure 16:
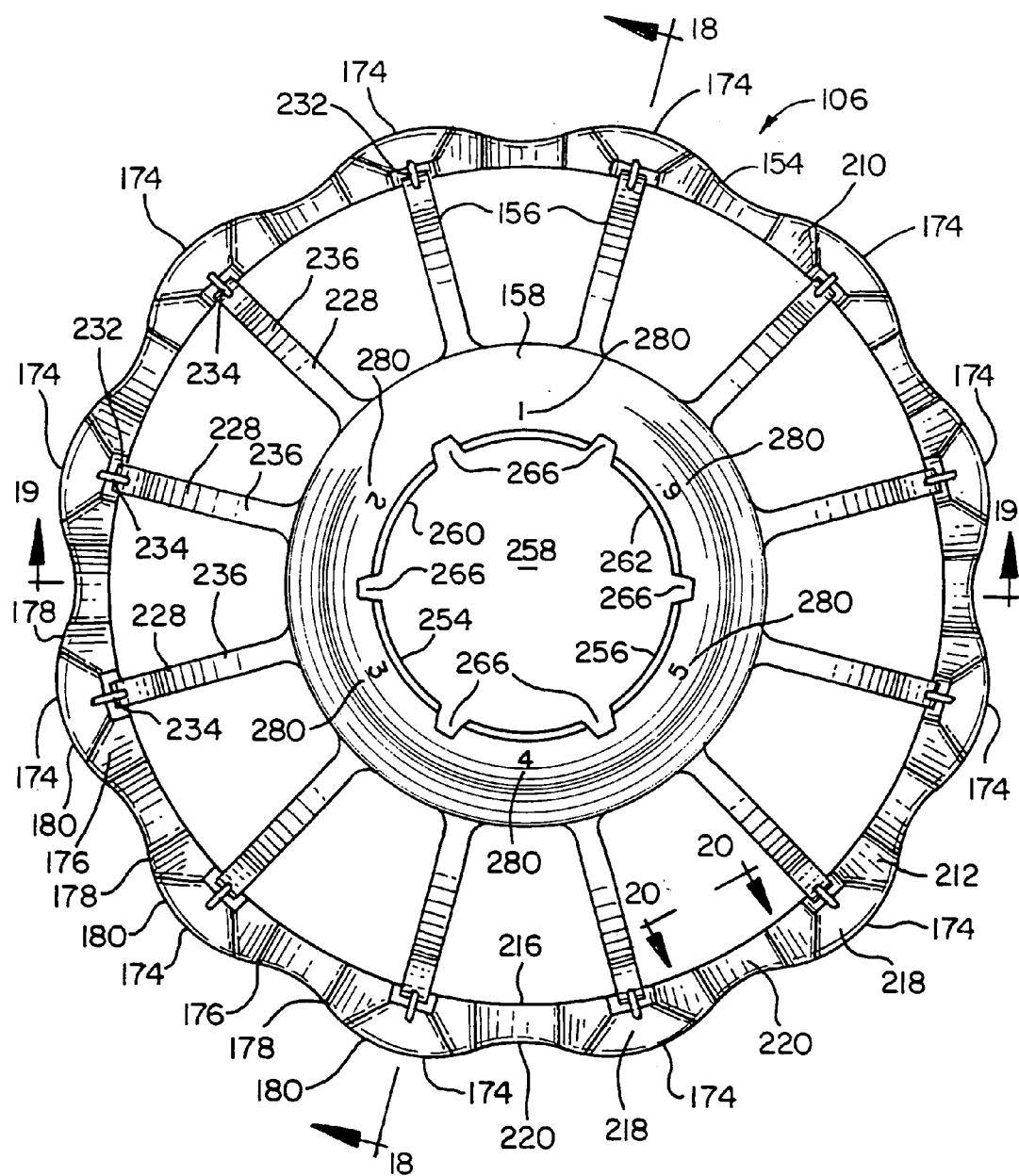
FIG. 16 is a top plan view of the grill member of the first embodiment of the feeder assembly of the invention.

As best illustrated in FIGS. 15 and 21, the side rim member 160 further preferably includes a tab member 196. The tab member 196 is positioned between one of the first concave portions 176 and one of the second concave portions 178, such that the first and second concave portions 176, 178 do not meet. The tab member 196 extends vertically downwardly from the upper edge 186 of the projections 174 to a position below the bottom surface 170 of the side rim member 160 and, thus, below the lower edge 184 of the projections 174. The tab member 196 is separated from the first concave portion 176 by a gap 198 and is separated from the second concave portion 178 by a gap 200. A bottom free end 202 of the tab member 196 is preferably rounded. The tab member 196 is preferably positioned such that it is proximate to one of the reinforcing members 194. The reinforcing member 194 that is situated proximate to the tab member 196 does not extend over the gaps 198, 200, but rather extends along the inner surface 166 of the inner wall 164 away from both of the gaps 198, 200 and extends along an inner surface 204 of the tab member 196. The tab member 196 may also have a reinforcing member 206 extending inwardly from the inner surface 204 thereof. The tab member 196 works in conjunction with the extensions 138 to lock the grill member 106 into place around the pan member 104 as will be discussed in more detail hereinbelow.

Figure 22:
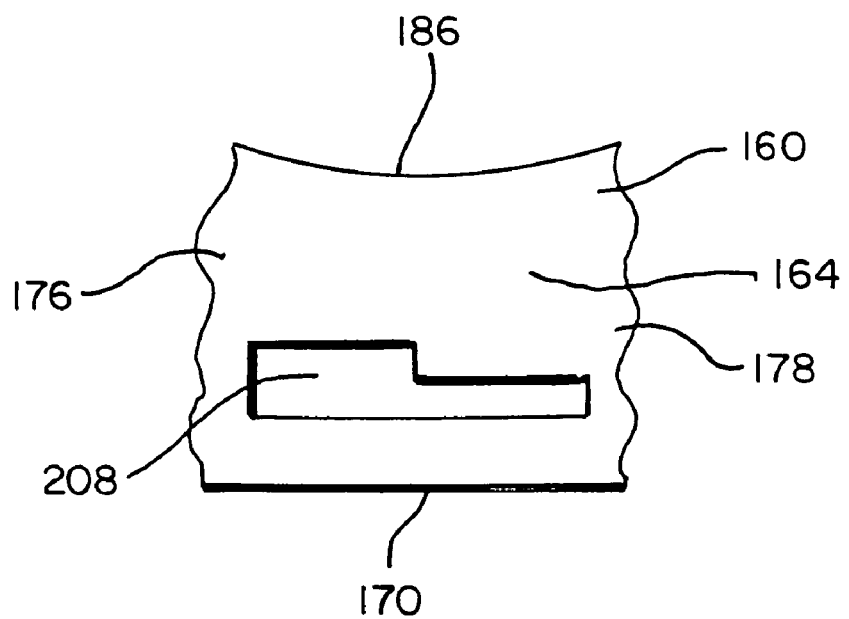
FIG. 22 is a side elevational view of a portion of the grill member of FIG. 16.

The side rim portion 160 further preferably includes a slot 208 therethrough, as shown in FIG. 22. The slot 208 is positioned through one of the first concave portions 176, one of the second concave portions 178, and through the inner wall 164. The slot 208 is generally L-shaped such that the slot 208 has a height which is higher at one end thereof than at an opposite end thereof. The slot 208 at the higher end is positioned equidistantly from the bottom surface 170 of the side rim portion 160 as is the slot 208 at the lower end, but the slot 208 at the higher end is positioned closer to the upper edge 186 of the projections 174 than is the slot 208 at the lower end. The higher end of the slot 208 is preferably positioned on the first concave portion 176 while the lower end of the slot 208 is preferably positioned on the second concave portion 178. The slot 208 is preferably positioned such that it is situated above one of the reinforcing members 194. The slot 208 works in conjunction with the hook member 144 to suspend the pan member 104 from the grill member 106 for cleaning the feeder assembly 100, as will be described in more detail hereinbelow.

The rim member 154 in a preferred embodiment also has the top rim portion 210. The top rim portion 210 has a top surface 212 which is defined between an outer edge 214 and an inner edge 216 of the top rim portion 210. When viewed in a side-elevational view, as in FIG. 20, the top surface 212 appears to be provided in a series of curved peak portions 218 and curved valley portions 220 extending circumferentially around the top rim portion 210 with the spoke members 156 being attached to the top surface 212 of the top rim portion 210 at the peak portions 218 proximate to the inner edge 216 of the top surface 212, such that the valley portions 220 are provided between the attachment of the spoke members 156 to the rim member 154. The peak portions 218 and valley portions 220 are formed because, between a pair of adjacent spoke members 156, the inner edge 216 of the top surface 212 curves circumferentially downwardly from one of the spoke members 156 to a point which is equidistant between the one spoke member 156 and the adjacent spoke member 156, and then curves circumferentially upwardly to the adjacent spoke member 156. Similarly, the peak portions 218 and the valley portions 220 are formed because, between a pair of adjacent spoke members 156, the outer edge 214 of the top surface 212 curves circumferentially downwardly proximate to one of the spoke members 156 to a point which is equidistant between the one spoke member 156 and the adjacent spoke member 156 and then curves circumferentially upwardly proximate to the adjacent spoke member 156. In the preferred embodiment of the invention, and preferably for use with smaller birds, the top surface 212 of the top rim portion 210 has twelve (12) peak portions 218 and twelve (12) valley portions 220, which are alternated around the circumference of the rim member 154 such that a thirty (30) degree angle is provided between the centers thereof. In another preferred embodiment, and preferably for use with larger birds, the top surface 212 of the top rim portion 210 has eight (8) peak portions 218 and eight (8) valley portions 220 (not shown), which are alternated around the circumference of the rim member 154 such that a forty-five (45) degree angle is provided between the centers thereof.

When viewed in cross-sectional side view, as best illustrated in FIGS. 18 and 19, the top surface 212 of the top rim portion 210 also curves downwardly and outwardly from the inner edge 216 to the outer edge 214.

The outer edge 214 of the top surface 212 is curved such that the outer edge 214 is curved inwardly and downwardly at the valley portions 220 of the top surface 212 and curved outwardly and upwardly at the peak portions 218 of the top surface 212.

The rim member 154 in a preferred embodiment also has a curved rim portion 222. As best illustrated in FIGS. 15 and 20, the curved rim portion 222 curves upwardly and inwardly from the upper edge 186 of the projections 174 to the outer edge 214 of the top rim portion 210 of the rim member 154. The curved rim portion 222 connects the side rim portion 160 to the top rim portion 210 and provides a smooth transition from an outer surface 224 of the outer wall 162 of the side rim portion 160 to a top surface 212 of the top rim portion 210. The curved rim portion 222 connects the convex upper edges 192 of the projections 174 to the outer edges 214 of the peak portions 218 of the top rim portion 210. The curved rim portion 222 also connects the first and second concave upper edges 188, 190 of the projections 174 to the outer edges 214 of the valley portions 220 of the top rim portion 210.

The purpose of this configuration of the rim member 154 allows for a front portion of a bird's body to conform thereagainst when the bird feeds from the feeder assembly 100 such that detrimental physical effects to the body of the bird are not caused, or are at least minimized, when the bird feeds from the feeder assembly, as will be discussed further herein under the heading "Bird Welfare Features Of Feeder Assembly 100". It should be noted that the configuration of the rim member 154 could be formed in a manner other than described hereinabove in order to achieve the objects of the invention, such that a front portion of a bird's body can conform thereagainst when the bird feeds from the feeder assembly 100 such that detrimental physical effects to the body of the bird are not caused, or are at least minimized, when the bird feeds from the feeder assembly 100.

Each spoke member 156, as explained above, is connected at one end thereof to the rim member 154 and at an opposite end thereof to the collar member 158. In a preferred embodiment, and preferably for use with smaller birds, the plurality of spoke members 156 number twelve (12) and are spaced equidistantly apart from one another with a thirty (30) degree angle between the centers of the spokes 156. In another preferred embodiment, and preferably for use with larger birds, the plurality of spoke members 156 number eight (8) and are spaced equidistantly apart from one another with a forty-five (45) degree angle between the centers of the spoke members 156. As each of the spoke members 156 are identical to one another, only a single spoke member 156 will be described herein.

As best illustrated in FIGS. 15 and 17–20, the spoke member 156 is preferably generally T-shaped in cross-section such that it has first and second legs 226, 228. The first leg 226 and the second leg 228 are perpendicular to one another. The first leg 226 extends along a middle of the second leg 228 along an inner surface 230 thereof such that the first leg 226 extends inwardly from the second leg 228.

A first end 232 of the spoke member 156 is connected to the rim member 154. More specifically, an end of the second leg 228 is preferably positioned on and connected to the peak portion 218 of the top rim portion 210, proximate to the inner edge 216 thereof. A reinforcing member 234 extends from an outer surface 236 of the second leg 228 toward the outer edge 214 of the peak portion 218 and connects thereto to provide strength to the spoke member 156.

An end portion 238 of the first leg 226 extends beyond the end of the second leg 228 against a reinforcing member 240 of the rim member 154. In a preferred embodiment, each reinforcing member 240 is connected to the inner edge 216 of the top rim portion 210 and extends downwardly from the inner edge 216 and is curved such that the entire reinforcing member 240 is equally distanced from the inner wall 164. Each reinforcing member 240 extends circumferentially to connect the first legs 226 of a pair of adjacent spoke members 156 together. Each reinforcing member 240 extends on either side of the pair of adjacent spoke members 156 and is connected between the first legs 226 of the pair of adjacent spoke members 156. Each reinforcing member 240 is not connected outside of the first legs 226 of the pair of adjacent spoke members 156. Thus, in the preferred embodiment with twelve (12) spoke members 156, the reinforcing members 240 number six (6) and are spaced equidistantly from one another at an angle of sixty (6) degrees from their centers. In the preferred embodiment with eight (8) spoke members 156, the reinforcing members 240 number four (4) and are spaced equidistantly from one another at an angle of ninety (90) degrees from their centers. The reinforcing members 240 are preferably positioned alternately with the reinforcing members 194, which are positioned along the inner surface 166 of the inner wall 164 of the side rim portion 160.

A reinforcing member 242 may be provided within the pocket 172. Each reinforcing member 242 extends downwardly from a bottom surface 244 of the top rim portion 210 and extends circumferentially between each reinforcing member 240 and the inner wall 164, but does not extend far enough down to impede the fourth portion 136 of the upstanding outer portion 116 of the pan member 104 from being inserted into the pocket 172 for connection of the pan member 104 to the grill member 106.

From the peak portions 218 of the top rim portion 210 of the rim member 154, each of the spoke members 156 preferably extends inwardly and upwardly. More specifically, and as best illustrated in FIG. 15, each spoke member 156 has a first, second, third, fourth and fifth portion 244, 246, 248, 250, 252. From the top rim portion 210, the first portion 244 curves inwardly and upwardly such that the outer surface 236 of the second leg 228 is convex. From the first portion 244, the second portion 246 curves inwardly and upwardly such that the outer surface 236 of the second leg 228 is concave. From the second portion 246, the third portion 248 extends inwardly and upwardly and is nearly planar with the vertical. From the third portion 248, the fourth portion 250 curves inwardly and upwardly such that the outer surface 236 of the second leg 228 is convex. From the fourth portion 250, the fifth portion 252 extends inwardly and upwardly and is nearly planar with the horizontal. The fifth portion 252 also connects to the collar member 158. This structure of the spoke members 156 prevents larger birds from climbing into the feeder assembly 100 while feeding therefrom and also allows for a front portion of a bird's body to conform thereagainst when the bird feeds from the feeder assembly 100 such that detrimental physical effects to the body of the bird are not caused, or are at least minimized, when the bird feeds from the feeder assembly 100, as will be discussed further herein under the heading "Bird Welfare Features Of The Feeder Assembly 100". It should be noted that the configuration of the spoke members 156 could be formed in a manner other than described hereinabove in order to achieve the objects of the invention such that larger birds would not be able to climb into the feeder assembly 100 and such that a front portion of a bird's body can conform thereagainst when the bird feeds from the feeder assembly 100 such that detrimental physical effects to the body of the bird are not caused, or are at least minimized, when the bird feeds from the feeder assembly 100, as will be discussed further herein.

The collar member 158 preferably includes a generally cylindrical portion 254 and an extension member 256 extending therefrom. The cylindrical portion 254 has an aperture 258 therethrough which defines an aperture wall 260. As best illustrated in FIGS. 15–20, the cylindrical portion 254 is preferably of a uniform inner diameter from a top end 262 thereof to a bottom end 264 thereof. The top end 262 of the cylindrical portion 254 extends above the fifth portions 252 of the spoke members 156 while the bottom end 264 of the cylindrical portion 254 extends down to approximately a position at which the third and fourth portions 248, 250 of the spoke members 156 connect.

The cylindrical portion 254 has a plurality of grooves 266 cut into the aperture wall 260. The grooves 266 extend from the top end 262 of the cylindrical portion 254 to the bottom end 264 of the cylindrical portion 254. In a preferred embodiment, the plurality of grooves 266 number six (6) and are spaced equidistantly from one another and, thus, are positioned sixty (60) degrees apart from one another. The purpose of the grooves 266 will be discussed with more detail herein.

The cylindrical portion 254 has a helical thread 268 winding inwardly around the aperture wall 260. The helical thread 268 begins at one of the grooves 266 proximate to the top end 262 of the cylindrical portion 254 and winds around the aperture wall 260 until it returns to the groove 266 at which it started. The helical thread 268 ends at a position which is approximately midway between the top end 262 and the bottom end 264 of the cylindrical portion 254. The helical thread 268 is cut away at the grooves 266 such that the helical thread 268 is only preferably provided along the aperture wall 260 where the grooves 266 are not provided. The purpose of the helical thread 268 will be discussed with more detail herein.

The extension member 256 curves downwardly and outwardly from the top end 262 of the cylindrical portion 254. The extension member 256 preferably has a first portion 270, a second portion 272 and a third portion 274. The first portion 270 of the extension member 256 curves downwardly and outwardly from the top end 262 of the cylindrical portion 254 such that a top surface 276 thereof is convex. The second portion 272 of the extension member 256 curves downwardly and outwardly from the first portion 270 of the extension member 256 such that a top surface 278 thereof is concave. The third portion 274 of the extension member 256 extends downwardly from the second portion 272 of the extension member 256 and is parallel to the cylindrical portion 254. The fifth portion 252 of each of the spoke members 156 connects to the extension member 256 with the first leg 226 being connected to the third portion 274 and the second leg 228 being connected to the extension member 256 at the connection of the second portion 272 and the third portion 274.

The top surface 276 of the first portion 270 and the top end 262 of the cylindrical portion 254 can also have a plurality of indicators 280 placed thereon. In a preferred embodiment, the indicators 280 number six (6) and are positioned equidistantly around the top surface 276 of the first portion 270 and the top end 262 of the cylindrical portion 254 such that they are spaced sixty (60) degrees apart. The indicators 280 are preferably alternated with the grooves 266 and spaced equidistantly therebetween such that each indicator 280 is positioned thirty (30) degrees apart from the two closest grooves 266. The indicators 280 are preferably numerals, i.e., 1, 2, 3, 4, 5 and 6. The purpose of the indicators 280 will be discussed in more detail hereinbelow.

Outer Drop Tube Member 108

Attention is now directed to the outer drop tube member 108, which is best illustrated in FIGS. 23–28.

The outer drop tube member 108 includes a member 282 having an aperture 284 therethrough such that the member 282 is hollow. The member 282 preferably has a first portion 286, a second portion 288, a third portion 290, a fourth portion 292, a fifth portion 294, and a sixth portion 296. The first portion 286 extends upwardly and inwardly from a bottom end 298 of the member 282 to a first end of the second portion 288 such that the member 282 has an inner diameter proximate to the bottom end 298 thereof which is larger than an inner diameter proximate to the first end of the second portion 288. The second portion 288 extends inwardly from the first end thereof to a first end of the third portion 290 such that the member 282 has an inner diameter proximate to the first end of the third portion 290 which is slightly smaller than the inner diameter proximate to the first end of the second portion 288. The third portion 290 extends upwardly and inwardly from the first end thereof to a first end of the fourth portion 292 such that the member 282 has an inner diameter proximate to the first end of the fourth portion 292 which is smaller than the inner diameter proximate to the first end of the third portion 290. The fourth portion 292 extends upwardly and inwardly from the first end thereof to a first end of the fifth portion 294 such that the member 282 has an inner diameter proximate to the first end of the fifth portion 294 which is smaller than the inner diameter proximate to the first end of the fourth portion 292. The fifth portion 294 extends inwardly from the first end thereof to a first end of the sixth portion 296 such that the member 282 has an inner diameter proximate to the first end of the sixth portion 296 which is slightly smaller than the inner diameter proximate to the first end of the fifth portion 294. The sixth portion 296 extends upwardly from the first end thereof to a top end 300 of the member 282, such that the member 282 has an inner diameter at the top end 300 thereof which is equivalent to the inner diameter proximate to the first end of the sixth portion 296.

The outer drop tube member 108 further preferably includes a plurality of wing members 302 extending therefrom. The wing members 302 are connected to an outer surface 304 of the member 282 along the first, second and third portions 286, 288, 290 thereof. The wing members 302 are curved outwardly and downwardly from the outer surface 304 of the member 282 such that a bottom end 306 of the wing members 302 is positioned below the bottom end 298 of the member 282, thus allowing the aperture 284 of the member 282 to be open at the bottom end 298 thereof. The bottom end 306 of the wing members 302 is preferably flat or horizontal. In a preferred embodiment, the plurality of wing members 302 number eight (8) and are positioned equidistantly apart from one another, such that each wing member 302 is positioned forty-five (45) degrees apart from one another. It should be noted that the outer drop tube member 108 could be provided without the wing members 302 if desired.

The outer drop tube member 108 further includes a plurality of windows or openings 308. Each window 308 is cut out from portions of the second, third and fourth portions 288, 290, 292 of the member 282. In a preferred embodiment, each window or opening 308 defines a first edge 310, a second edge 312, a third edge 314, a fourth edge 316, a fifth edge 318, a sixth edge 320, and a seventh edge 322, as best illustrated in FIGS. 23 and 48.

Figure 23:
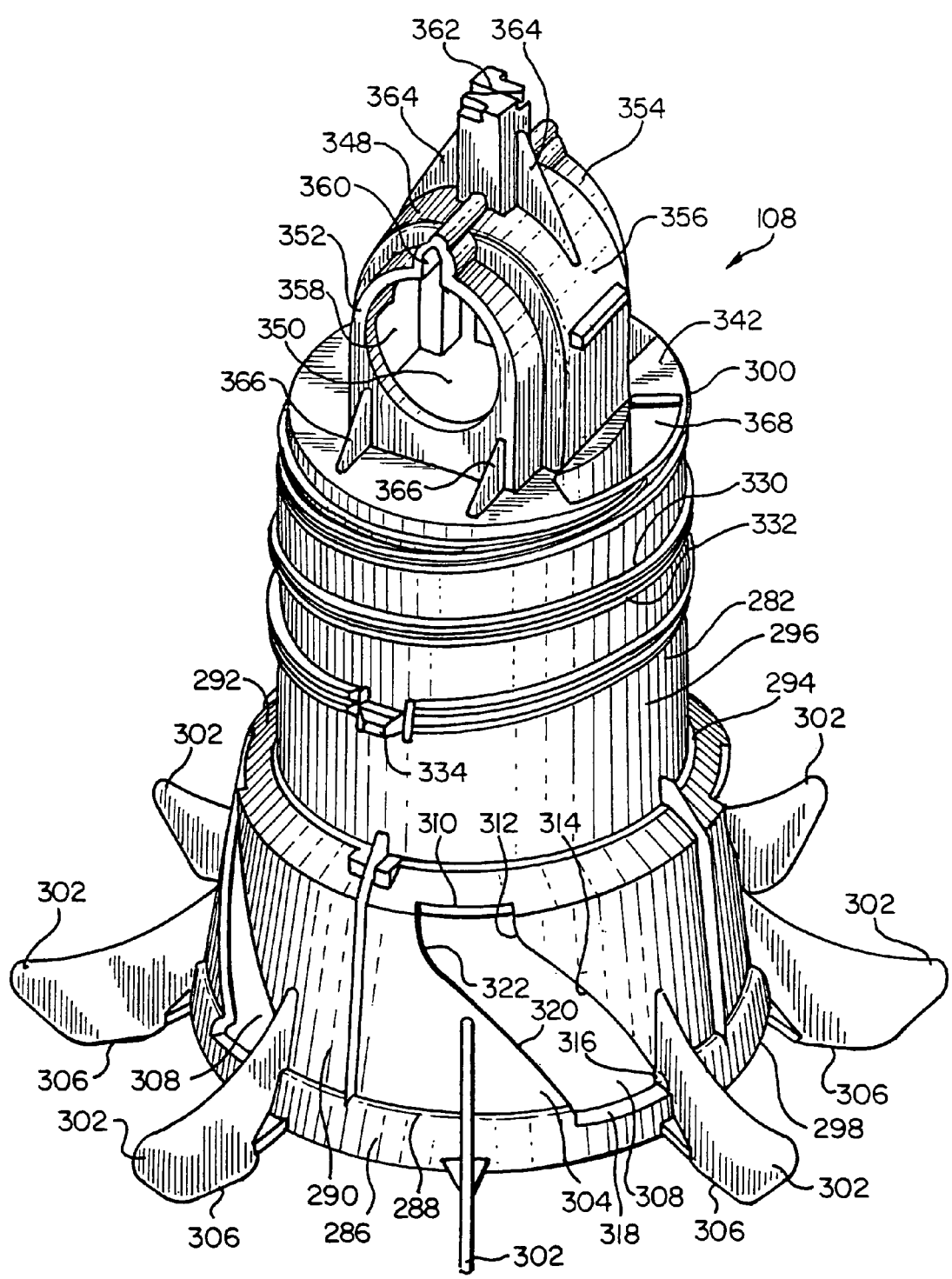
FIG. 23 is a perspective view of an outer drop tube member of the first embodiment of the feeder assembly of the invention.
Figure 27:
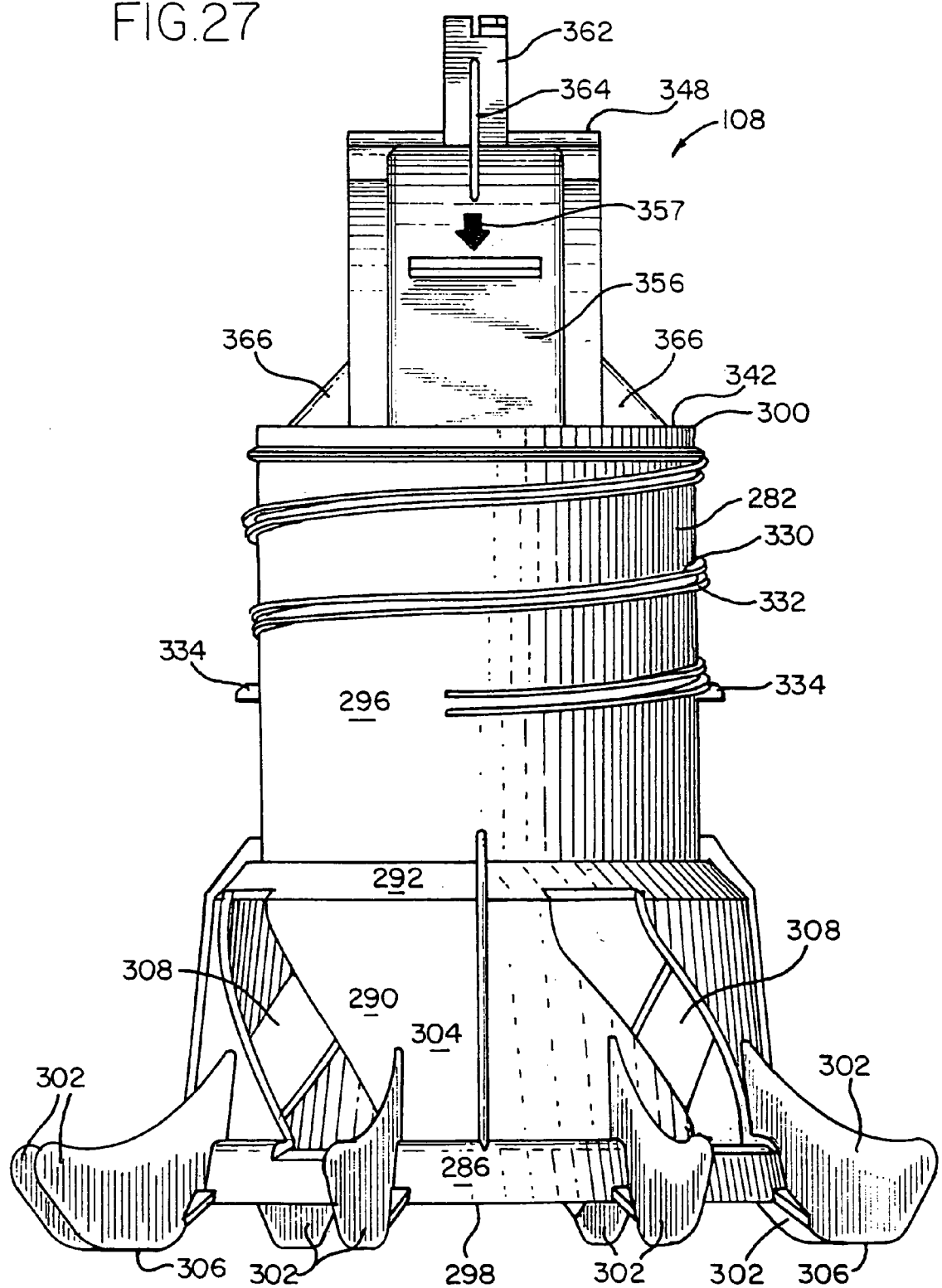
FIG. 27 is a side elevational view of the outer drop tube member of the first embodiment of the feeder assembly of the invention.
Figure 29:
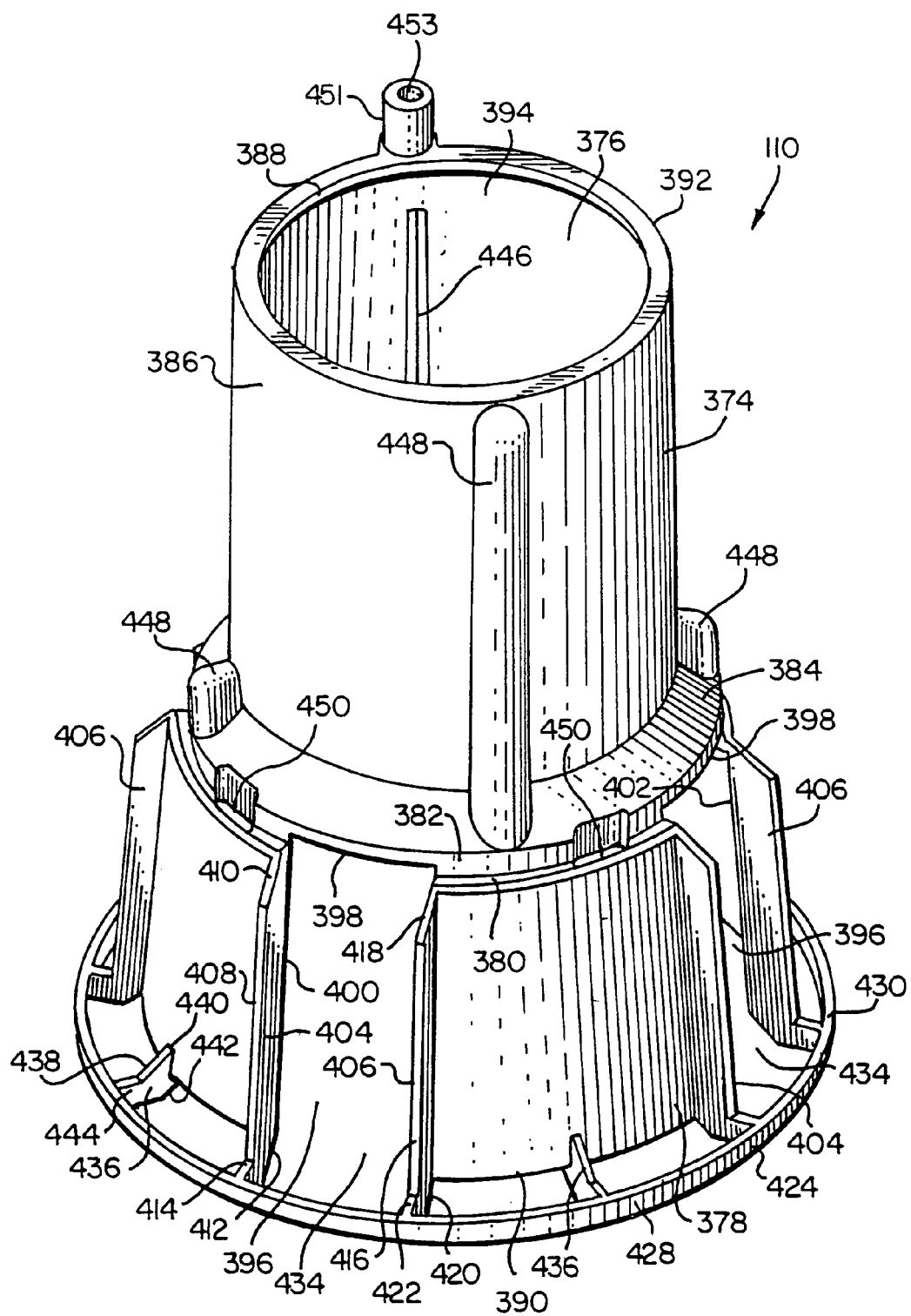
FIG. 29 is a perspective view of an inner drop tube member of the first embodiment of the feeder assembly of the invention.
Figure 34:
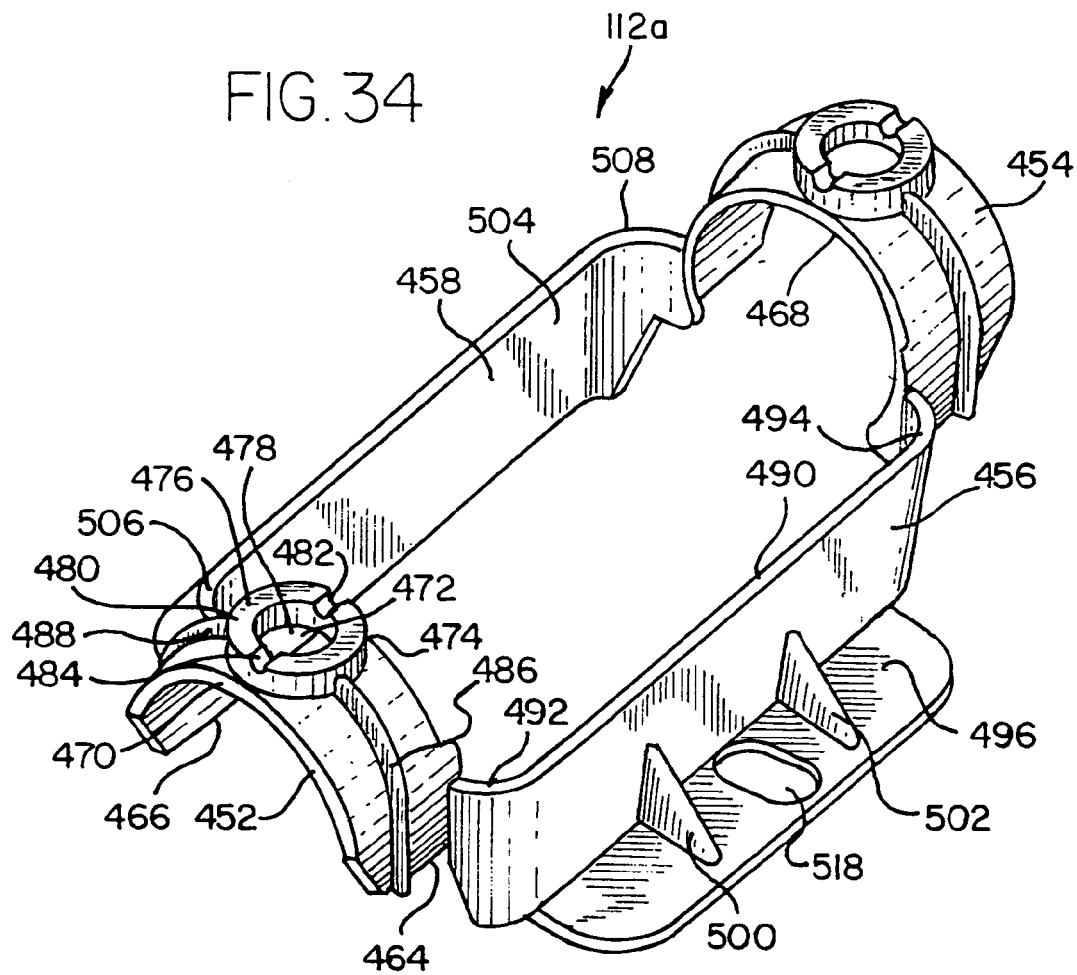
FIG. 34 is a perspective view of the first inner drop tube member actuator of the first embodiment of the feeder assembly of the invention.
Figure 35:
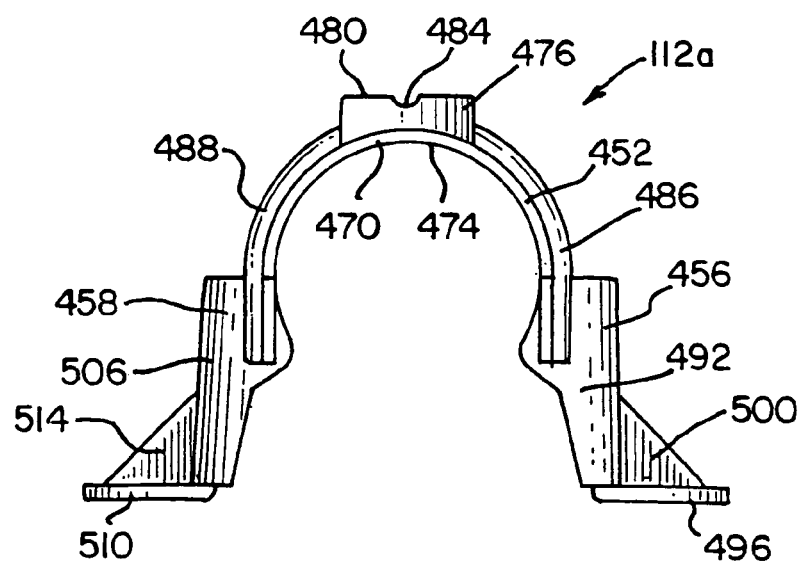
FIG. 35 is a front elevational view of the first inner drop tube member actuator of the first embodiment of the feeder assembly of the invention.
Figure 36:
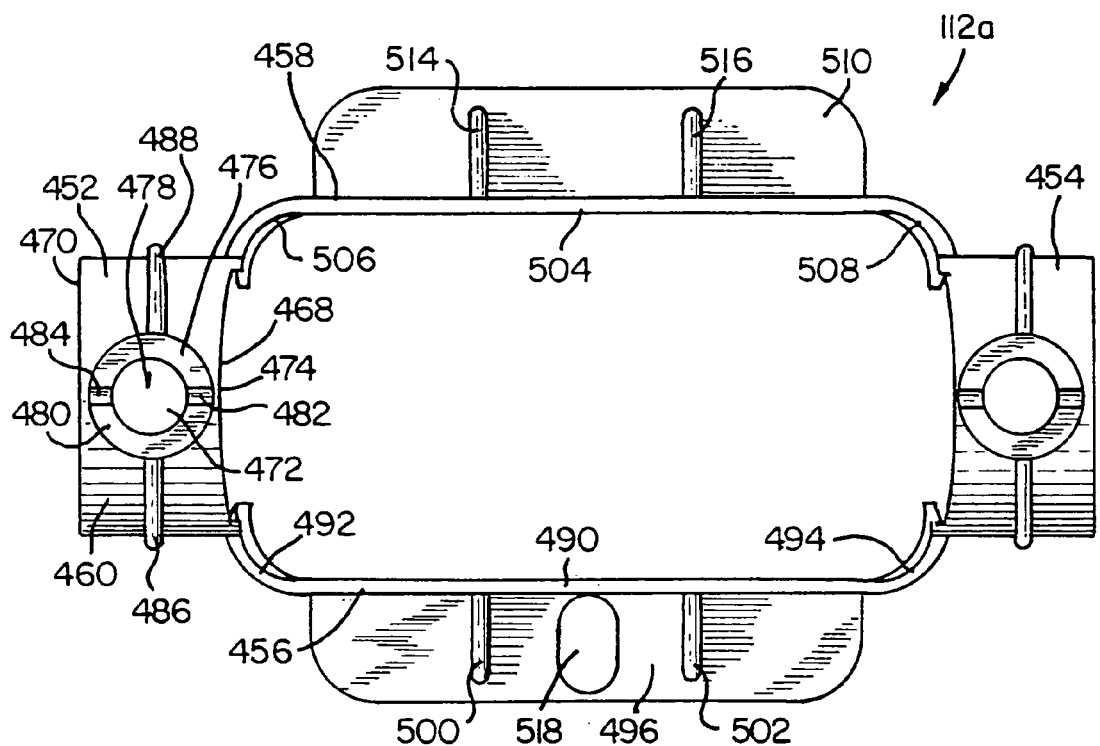
FIG. 36 is a top plan view of the first inner drop tube member actuator of the first embodiment of the feeder assembly of the invention.
Figure 37:
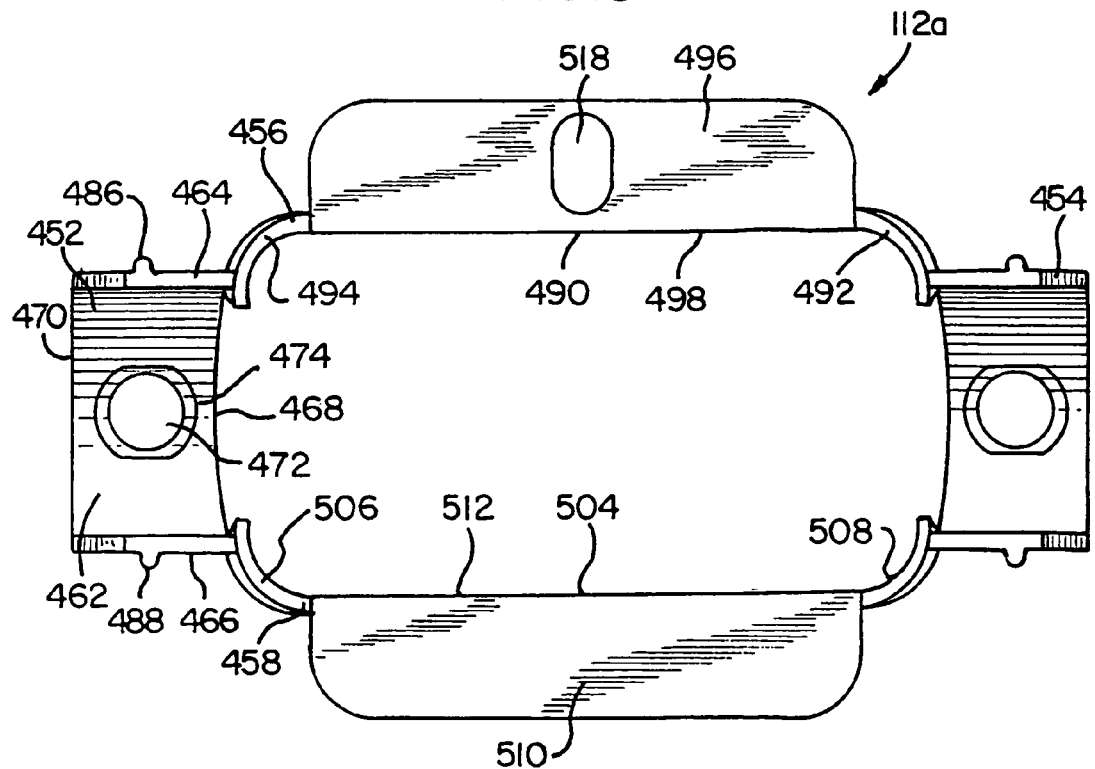
FIG. 37 is a bottom plan view of the first inner drop tube member actuator of the first embodiment of the feeder assembly of the invention.
Figure 38:
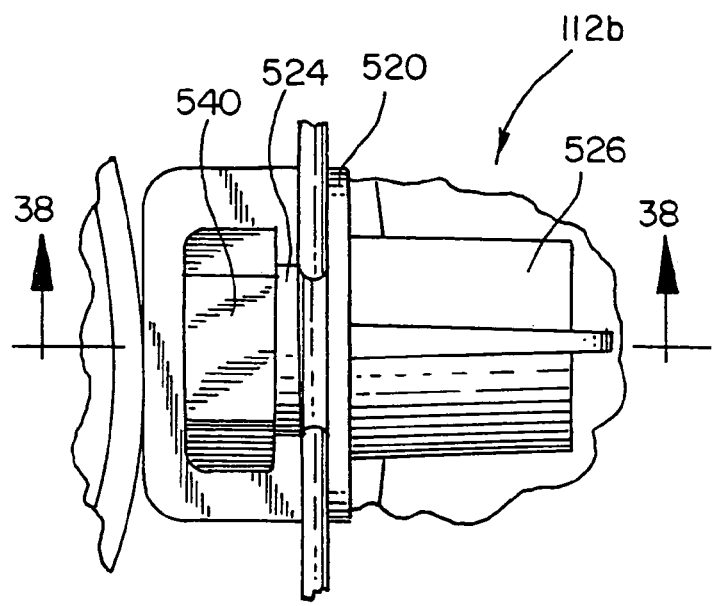
FIG. 38 is a top plan view of a portion of the first embodiment of the feeder assembly of the invention illustrating the second inner drop tube member actuator secured to the inner drop tube member.
Figure 39:
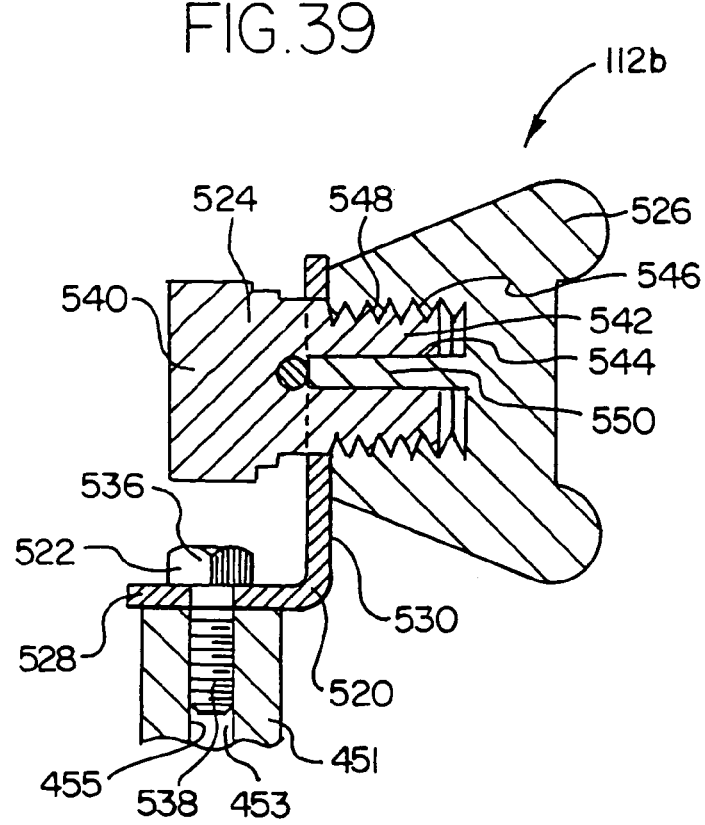
FIG. 39 is a cross-sectional side elevational view of the second inner drop tube member actuator of FIG. 38 taken along line 39—39.

As best illustrated in FIGS. 23 and 27, the first edge 310 extends horizontally along the fourth portion 292 of the member 282 proximate to the connection of the fourth portion 292 to the third portion 290. From a first end of the first edge 310, the second edge 312 extends downwardly and to the right to the third edge 314 in a concave manner. From a first end of the second edge 312, the third edge 314 extends angularly downwardly and to the right to the fourth edge 316. From a first end of the third edge 314, the fourth edge 316 extends downwardly and to the right to the fifth edge 318 in a convex manner. From a first end of the fourth edge 316, the fifth edge 318 extends horizontally and to the left to the sixth edge 320. The fifth edge 318 is parallel to the first edge 310 and is provided at, or proximate to, the connection of the first portion 286 to the second portion 288. From a first end of the fifth edge 318, the sixth edge 320 extends angularly upwardly and to the left to the seventh edge 322. The sixth edge 320 is preferably parallel to the third edge 314. From a first end of the sixth edge 320, the seventh edge 322 extends upwardly and to the left to the first edge 310 in a concave manner.

In the preferred embodiment, the plurality of windows 308 number four (4) and are positioned equidistantly from one another, such that like portions of the windows 308 are positioned ninety (90) degrees from one another. Each window 308 is positioned such that the fifth edge 318 is between two adjacent wing members 302 with the connection between the fourth and fifth edges 316, 318 being proximate to one of the adjacent wind members 302, and such that the first and sixth edges 310, 320 are positioned above the other one of the adjacent wing members 302. It should be noted that the configurations of the windows 308 could be formed in a manner other than as described to achieve the objects of the invention.

As best illustrated in FIGS. 25 and 26, the outer drop tube member 108 preferably includes portions 324 which extend upwardly and inwardly from the bottom end 298 of the member 282 along an inner surface 326 of the first portion 286 such that the portions 324 form a shoulder or ledge 328 below the fifth edge 318 of each window 308. In a preferred embodiment, the portions 324 number four (4) and are spaced equidistantly apart from one another, such that the portions 324 are spaced ninety (90) degrees apart from one another. The purpose of the portions 324 will be discussed further herein.

The outer drop tube member 108 further preferably includes a helical track which is preferably a pair of helical threads 330, 332 which wind around the outer surface 304 of the sixth portion 296 of the member 282. The helical threads 330, 332 begin winding proximate to the top end 300 of the member 282 to a position approximately lower than the midpoint between the top end 300 and the connection between the fifth and sixth portions 294, 296. The helical threads 330, 332 are spaced apart from one another a distance which is slightly larger than the size of the helical thread 268 of the collar member 158 of the grill member 106.

As best illustrated in FIGS. 23 and 26–28, the outer drop tube member 108 further preferably includes at least one retractable portion 334. Each retractable portion 334 is formed on the sixth portion 296 of the member 282 approximately at the midpoint between the top end 300 and the connection between the fifth and sixth portions 294, 296. The retractable portion 334 is formed by a pair of notches 336, 338 on either side thereof which extend from a top of the retractable portion 334 to a bottom of the retractable portion 334.

The retractable portion 334 also has a protrusion 340 extending outwardly therefrom. The protrusion 340 is capable of extending into the grooves 266 of the collar member 158 of the grill member 106 as will be discussed in more detail herein and, during rotation of the outer drop tube member 108 relative to the grill member 106, allows the retractable portion 334 to be flexed inwardly when the protrusion 340 is not extended within one of the grooves 266 of the collar member 154. In the preferred embodiment, the retractable portions 334 number two (2) and are positioned equidistantly from one another such that they are positioned one-hundred eighty (180) degrees from one another. The helical threads 330, 332 are cut away where they cross the retractable portion(s) 334.

The outer drop tube member 108 further preferably includes a top member 342 on the member 282. The top member 342 extends perpendicularly inwardly from the top end 300 of the sixth portion 296 of the member 282. The top member 342 covers a portion of the aperture 284 at the top end 300 of the member 282.

The outer drop tube member 108 further preferably includes an inner cylindrical portion 344, as best illustrated in FIGS. 25 and 26. The inner cylindrical portion 344 extends within the aperture 284 of the member 282 downwardly from the top member 342 of the member 282 to a position approximately equivalent to where the protrusion 340 is provided. The inner cylindrical portion 344 is of a uniform diameter and defines an aperture 346 therein.

The outer drop tube member 108 further preferably includes a conduit acceptor member 348. The conduit acceptor member 348 has an aperture 350 therethrough which is in communication with the aperture 346 of the inner cylindrical portion 344 and, thus, the aperture 284 of the member 282. The conduit acceptor member 348 extends upwardly from the top member 342 of the member 282, but does not cover the entire top member 342.

The conduit acceptor member 348 generally includes a first side member 352, a second side member 354 and an arced intermediate member 356. The first and second side members 352, 354 are identical and are distanced from one another a predetermined distance and have circular openings 358 therethrough. Tops of the first and second side members 352, 354 are also arced in conformance with the circular openings 358. The arced intermediate member 356 is generally an upside down U-shaped piece and generally extends from the top member 342 between the first and second side members 352, 354 along their respective edges back to the top member 342. The feed supply conduit 102 is capable of extending through the openings 358 of the first and second side members 352, 354 and of allowing feed to drop therefrom into the aperture 350 of the conduit acceptor member 348.

One side of the arced intermediate member 356 preferably has an indicator 357 provided thereon. The indicator 357 is preferably an arrow which is pointing down toward the top member 342 of the outer drop tube member 108. The purpose for the indicator 357 will be discussed further herein under the section heading "Adjustable Lower Feed Gate G-1".

The openings 358 further have notches 360 therein at the top thereof to accept a protrusion (not shown) of the feed supply conduit 102 to prevent the feed assembly 100 from being moved relative to the feed supply conduit 102.

It should be noted that the configuration of the conduit acceptor member 348 may be formed to fit over various types of feed supply conduits.

In a preferred embodiment, the conduit acceptor member 348 further includes at least one member 362 extending upwardly from the arced intermediate member 356 which is capable of accepting and retaining a roost wire. The member 362 preferably has reinforcing members 364 extending from the member 362 to the arced intermediate member 356.

A plurality of reinforcing members 366 which extend from both the first and second side members 352, 354 to the top member 342 of the member 282 are preferably provided. In a preferred embodiment, the reinforcing members 366 number four (4) with two (2) of the reinforcing members 366 extending from the first side member 352 to the top member 342 of the member 282 and two (2) of the reinforcing members 366 extending from the second side member 354 to the top member 342 of the member 282.

The top member 342 further preferably has at least one aperture 368 therethrough proximate to the conduit acceptor member 348. The aperture 368 defines both inner and outer edges 370, 372 which are curved and assists in the rotation of the inner drop tube member 110 relative to the outer drop tube member 108 in a manner and for a purpose which will be described in detail herein. It should be noted that in the preferred embodiment, only one (1) aperture 368 is provided in the top member 342, but that two (2) apertures 368 could also be provided if desired.

Inner Drop Tube Member 110

Attention is now directed to the inner drop tube member 110, as best illustrated in FIGS. 29–33. The inner drop tube member 110 is sized to fit within the aperture 284 of the member 282 of the outer drop tube member 108.

The inner drop tube member 110 preferably includes a member 374 having an aperture 376 therethrough such that the inner drop tube member 110 is hollow. The member 374 preferably has a first portion 378, a second portion 380, a third portion 382, a fourth portion 384, a fifth portion 386, and a sixth portion 388. The upstanding inner portion 114 of the pan member 104 is capable of protruding into the aperture 376 of the member 374 with the point 128 being within the fifth portion 386 of the member 374 for reasons discussed herein.

The first portion 378 of the member 374 extends angularly upwardly and slightly inwardly from a bottom end 390 of the member 374 to a first end of the second portion 380 such that the member 374 has an outer diameter proximate to the bottom end 390 thereof which is larger than an outer diameter thereof proximate to the first end of the second portion 380.

From the first portion 378, the second portion 380 extends inwardly from the first end thereof to a first end of the third portion 382 such that the member 374 has an outer diameter proximate to the first end of the third portion 382 which is smaller than the outer diameter thereof proximate to the first end of the second portion 380.

From the second portion 380, the third portion 382 extends upwardly from the first end thereof to a first end of the fourth portion 384 such that the member 374 has an outer diameter proximate to the first end of the fourth portion 384 which is substantially equivalent to the outer diameter thereof proximate to the first end of the third portion 382.

From the third portion 382, the fourth portion 384 extends angularly upwardly and inwardly from the first end thereof to a first end of the fifth portion 386 such that the member 374 has an outer diameter proximate to the first end of the fifth portion 386 which is smaller than the outer diameter thereof proximate to the first end of the fourth portion 384.

From the fourth portion 384, the fifth portion 386 extends upwardly from the first end thereof to a top end 392 of the member 374. The fifth portion 386 extends to a position which is slightly smaller than a height of the top member 342 when the inner drop tube member 110 is positioned within the outer drop tube member 108. The fifth portion 386 is parallel with the third portion 382.

The sixth portion 388 extends inwardly from the fifth portion 386 at the top end 392 of the member 374. A generally circular opening 394 is provided through the center of the sixth portion 288.

The inner drop tube member 110 further includes a plurality of openings 396. The openings 396 are cut out from portions of the first and second portions 378, 380 of the member 374. Each opening 396 is defined by a top edge 398, which is a bottom edge of the third portion 382 to which the second portion 380 would connect to the third portion 382. Each opening 396 is further defined by a first side edge 400 and a second side edge 402. The first side edge 400 extends downwardly from one end of the top edge 398 along the entire second portion 380 and along the entire first portion 378 to the bottom end 390 of the member 374. Similarly, the second side edge 402 extends downwardly from the other end of the top edge 398 along the entire second portion 380 and along the entire first portion 378 to the bottom end 390 of the member 374. Thus, each opening 396 is open at the bottom end 390 of the member 374, such that the openings 396 are not bounded by a bottom edge.

For each opening 396 provided in the inner drop tube member 110, the inner drop tube member 110 further includes first and second protrusions 404, 406 which extend outwardly from the first portion 378 of the member 374.

The first protrusion 404 extends outwardly from the first portion 378 of the member 374 along the entire length of the first side edge 400. The first protrusion 404 has an inner edge (not shown), an outer edge 408, a top edge 410, and a bottom edge 412. The inner edge of the first protrusion 404 is positioned along the entire length of the first portion 378 of the member 374 along the first side edge 400. The top edge 410 extends angularly downwardly and outwardly to the outer edge 408 from a top of the inner edge, which is provided at the connection of the first portion 378 to the second portion 380. The bottom edge 412 extends angularly downwardly and outwardly to the outer edge 408 from a bottom of the inner edge, which is provided at the bottom end 390 of the member 374. The outer edge 408, thus, extends from between the top and bottom edges 410, 412. Thus, the first protrusion 404 extends below the bottom end 390 of the member 374. The first protrusion 404 further includes a lip portion 414 which extends outwardly from the outer edge 408 of the first protrusion 404 proximate to the junction of the outer edge 408 and the bottom edge 412.

Similarly, the second protrusion 406 extends outwardly from the first portion 378 of the member 374 along the entire length of the second side edge 402. The second protrusion 406 has an inner edge (not shown), an outer edge 416, a top edge 418, and a bottom edge 420. The inner edge of the second protrusion 406 is positioned along the entire length of the first portion 378 of the member 374 along the second side edge 402. The top edge 418 extends angularly downwardly and outwardly to the outer edge 416 from a top of the inner edge, which is provided at the connection of the first portion 378 to the second portion 380. The bottom edge 420 extends angularly downwardly and outwardly to the outer edge 416 from a bottom of the inner edge, which is provided at the bottom end 390 of the member 374. The outer edge 416, thus, extends from between the top and bottom edges 418, 420. Thus, the second protrusion 406 extends below the bottom end 390 of the member 374. The second protrusion 406 further includes a lip portion 422 which extends outwardly from the outer edge 416 of the second protrusion 406 proximate to the junction of the outer edge 416 and the bottom edge 420.

The inner drop tube member 110 further includes a ring member 424. The ring member 424 has an inner surface 426, an outer surface 428, a top surface 430, and a bottom surface 432. The ring member 424 has an inner diameter which is sized such that the lip portions 414, 422 of each of the first and second protrusions 404, 406 provided on the member 374 are connected to the ring member 424 at the inner surface 426 thereof. Thus, the inner drop tube member 110 provides a plurality of windows 434 which are defined by the top edge 398, the first side edge 400, the first protrusion 404, the ring member 424, the second protrusion 406, and the second side edge 402. The outer surface 428 of the ring member 424 is thus sized to fit within the aperture 284 of the member 282 with the bottom surface 432 of the ring member 424 capable of resting on the shoulders or ledges 328 of the member 324.

The inner drop tube member 110 may further include a plurality of third protrusions 436 which extend outwardly from the first portion 378 of the member 374. Each third protrusion 436 is provided equidistantly between a first protrusion 404 along one of the windows 434 and a second protrusion 406 along an adjacent one of the windows 434. The third protrusion 436 has an inner edge (not shown), an outer edge 438, a top edge 440, and a bottom edge 442. The inner edge of the third protrusion 436 is positioned against the first portion 378 and extends from the bottom end 390 of the member 374 approximately one-third of the distance as does the first and second protrusions 404, 406. The top edge 440 extends angularly downwardly and outwardly to the outer edge 438 from a top of the inner edge. The bottom edge 442 extends angularly downwardly and outwardly to the outer edge 438 from a bottom of the inner edge, which is provided at the bottom end 390 of the member 374. The outer edge 438, thus, extends from between the top and bottom edges 440, 442. Thus, the third protrusion 436 extends below the bottom end 390 of the member 374. The third protrusion 436 further includes a lip portion 444 which extends outwardly from the outer edge 438 of the third protrusion 436 proximate to the junction of the outer edge 438 and the bottom edge 442. The lip member 444 is connected to the ring member 424 at the inner surface thereof. The third protrusion 436 provides added strength to the inner drop tube member 110, especially to the ring member 424.

The fourth and fifth portions 384, 386 of the inner drop tube member 110 further preferably include a plurality of cavities 446 which extend from within the third portion 382 toward the top end 392 of the member 374. The cavities 446 are covered by protrusions 448. Each cavity 446 is in communication with the aperture 376 of the member 374. In a preferred embodiment, the plurality of protrusions 448 number two (2) and are positioned equidistantly from one another such that they are positioned one-hundred eighty (180) degrees from one another. Preferably, the protrusions 448 extend the entire height of the fifth portion 386 from the fourth portion 384 to the top end 392 of the member 374. Each of the protrusions 448 are preferably not in vertical alignment with any of the windows 434. The protrusions 448 help to keep the inner drop tube member 110 centered within the outer drop tube member 108, and also creates a gap between the inner drop tube member 110 and the outer drop tube member 108 in order to prevent a buildup of feed or dust between the inner drop tube member 110 and the outer drop tube member 108 which would hinder rotation of the inner drop tube member 110 relative to the outer drop tube member 108. The cavities 446 are provided because of the formation of the protrusions 448.

The inner drop tube member 110 further preferably includes a plurality of slots 450 therethrough. Each slot 450 is generally vertical and extends through the second portion 380 of the member 374, and cuts through the third portion 382 and a portion of the fourth portion 384. In a preferred embodiment, the plurality of slots 450 number four (4) such that they are separated from one another by ninety (90) degrees. Each slot 450 is preferably situated between two (2) of the windows 434. The slots 450 allow feed or dust in the gap between the inner and outer drop tube members 110, 108 to fall through the inner drop tube member 110 and into the pan member 104.

The inner drop tube member 110 further includes an extension member 451 which extends upwardly from one of the protrusions 448 which extends to the top end 392 of the member 374. The extension member 451 is generally a circular cylinder and has an aperture 453 extending therethrough which defines an aperture wall 455. The aperture 453 is in communication with the cavity 446 of the one protrusion 448.

Inner Drop Tube Actuator 112

Attention is now directed to the inner drop tube actuator 112, which is best illustrated in FIGS. 1–5 and 34–42. Three different types of inner drop tube actuators 112a, 112b and 112c are described herein. Inner drop tube actuator 112a is illustrated in FIGS. 1 and 34–37; inner drop tube actuator 112b is illustrated in FIGS. 2–5 and 38–39; and inner drop tube actuator 112c is illustrated in FIGS. 40–42. It should be noted that the three inner drop tube actuators 112a, 112b and 112c are the preferred configurations of the inner drop tube actuator 112, with inner drop tube actuator 112c being the most preferred configuration of the inner drop tube actuator 112.

Attention is directed to inner drop tube actuator 112a and FIGS. 1 and 34–37. When the inner drop tube actuator 112a is moved linearly, the inner drop tube member 110 is forced to rotate within the outer drop tube member 108 for reasons which will be discussed further herein. It should further be noted that any means moved linearly to force the inner drop tube member 110 to rotate is to be considered analogous and/or equivalent to the inner drop tube actuator 112a.

Inner drop tube actuator 112a is formed to fit over and move along the feed supply conduit 102. The inner drop tube actuator 112a preferably includes a first end member 452, a second end member 454, and a pair of middle members 456, 458 connecting the first end member 452 to the second end member 454. As the first and second end members 452, 454 are identical to one another, the structure of the first and second end members 452, 454 will be described in connection with only the first end member 452 with the understanding that for every item identified in connection with the first end member 452, the same will apply to the second end member 454. Like reference numerals will be used to describe both the first and second end members 452, 454.

The first end member 452 has a top surface 460 and a bottom surface 462. The first and member 452 further has a first side edge 464, a second side edge 466, an inner edge 468, and an outer edge 470. The first end member 452 is generally an upside down U-shape such that a top portion of the inner and outer edges 468, 470 are convex when viewed in side-elevational view (see FIG. 35) such that the first end member 452 can be positioned around the feed supply conduit 102. The first end member 452 also includes a generally circular opening 472 therethrough at a middle or peak 474 thereof. A generally circular cylindrical member 476 having an aperture 478 therethrough extends upwardly from the middle 474. The aperture 478 of the circular cylindrical member 476 is in communication with the opening 472. A top edge 480 of the circular cylindrical member 476 preferably includes a pair of notches 482, 484 which are equidistant from one another with one facing toward the outer edge 470 and the other facing toward the inner edge 468.

The first end member 452 further includes a pair of reinforcing members 486, 488. The reinforcing member 486 extends from the first side edge 464 of the first end member 452 along the top surface 460 thereof, to the circular cylindrical member 476, equidistant from both of the notches 482, 484. The reinforcing member 488 extends from the second side edge 466 of the first end member 452, along the top surface 460 thereof, to the circular cylindrical member 476, equidistant from both of the notches 482, 484.

The first middle member 456 includes a middle portion 490 and first and second curved end portions 492, 494. The middle portion 490 is generally rectangular in configuration. The first curved end portion 492 connects to both the middle portion 490 at one end thereof and to a bottom portion of the first end member 452 along the inner edge 468 thereof proximate to the first side edge 464 thereof. The second curved end portion 494 connects to both the middle portion 490 at an opposite end thereof and to a bottom portion of the second end member 454 along the inner edge 468 thereof proximate to the first side edge 464 thereof. The curved end portions 492, 494 curve outwardly from the end members 452, 454.

The first middle member 456 further includes a portion 496 which extends outwardly from, and perpendicularly to, a bottom edge 498 of the middle portion 490 of the first middle member 456.

The first middle member 456 further includes a pair of spaced apart reinforcing members 500, 502 which are connected to both the portion 496 and the middle portion 490.

The second middle member 458 includes a middle portion 504 and first and second curved end portions 506, 508. The middle portion 504 is generally rectangular in configuration. The first curved end portion 506 connects to both the middle portion 504 at one end thereof and to a bottom portion of the first end member 452 along the inner edge 468 thereof proximate to the second side edge 466 thereof. The second curved end portion 508 connects to both the middle portion 504 at an opposite end thereof and to a bottom portion of the second end member 454 along the inner edge 468 thereof proximate to the second side edge 466 thereof. The curved end portions 506, 508 curve outwardly from the end members 452, 454.

The second middle member 458 further includes a portion 510 which extends outwardly from, and perpendicularly to, a bottom edge 512 of the middle portion 504 of the second middle member 458.

The second middle member 458 further includes a pair of spaced apart reinforcing members 514, 516 which are connected to both the portion 510 and the middle portion 504.

The middle members 456, 458 are spaced far enough apart from one another such that they do not become impeded by the conduit acceptor member 348 of the outer drop tube member 108 when the inner drop tube member 112a is moved, as will be described in more detail herein.

The portion 496 has a generally oval-shaped opening 518 therethrough for reasons which will be discussed herein. The extension member 451 of the inner drop tube member 110 is capable of extending through the oval-shaped opening 518. The reinforcing members 500, 502 are preferably positioned on either side of the oval-shaped opening 518.

It should be noted that the configuration of the inner drop tube actuator 112a maybe formed to fit over and move linearly over various types of feed supply conduits.

Attention is directed to inner drop tube actuator 112b and FIGS. 2–5 and 38–39. When the inner drop tube actuator 112b is moved arcuately, the inner drop tube member 110 is forced to rotate within the outer drop tube member 108 for reasons which will be discussed further herein. It should further be noted that any means moved arcuately to force the inner drop tube member 110 to rotate is to be considered analogous and/or equivalent to the inner drop tube actuator 112b.

The inner drop tube actuator 112b includes an L-bracket 520, a first fastening member 522, a second fastening member 524, and a nut member 526.

The L-bracket 520 has a first member 528 and a second member 530 which are connected to one another and are perpendicular to one another. The first member 528 has an aperture (not shown) therethrough. The aperture has a diameter which is equivalent to, or approximately equivalent to, a diameter of the aperture 453 of the extension 451 of the inner drop tube member 110. The second member 530 has an aperture (not shown) therethrough.

The first fastening member 522 is preferably a screw having a head portion 536 and a threaded shank portion 538 extending therefrom. The head portion 536 is larger than the diameters of the aperture 453 of the extension 451 of the inner drop tube member 110 and the aperture 532 of the L-shaped bracket 520. The threaded shank portion 538 is sized to fit within the aperture 453 and the aperture of the first member 528 of the L-bracket 520 such that the threaded shank portion 538 engages the aperture wall 455 of the extension 451.

The second fastening member 524 is preferably a screw having a head portion 540 and a threaded shank portion 542 extending therefrom. The head portion 540 has a diameter which is larger than a diameter of the aperture through the second member 530 of the L-bracket 520. The threaded shank portion 542 is sized to fit through the aperture 534 of the second member 530 of the L-bracket 520. The threaded shank portion 542 has a slot 544 provided therethrough which extends from an end thereof toward the head portion 540.

The nut member 526 is preferably a wing nut which has an aperture 546 therein defining an aperture wall 548. The aperture wall 548 is preferably threaded. The aperture 546 is sized such that the threaded shank portion 542 of the second fastening member 524 can be inserted therein and engage with the aperture wall 548. The aperture 546 is preferably capped at one end thereof such that an extension member 550 extends from the end toward the opening of the aperture 546 between the aperture wall 548.

Attention is directed to inner drop tube actuator 112c and FIGS. 40–42. When the inner drop tube actuator 112c is moved arcuately, the inner drop tube member 110 is forced to rotate within the outer drop tube member 108 for reasons which will be discussed further herein. It should further be noted that any means moved arcuately to force the inner drop tube member 110 to rotate is to be considered analogous and/or equivalent to the inner drop tube actuator 112c.

The inner drop tube actuator 112c includes a first fastening member 552 and a nut member 554.

The first fastening member 552 includes a base portion 556, a threaded shank portion 558, and a snap-in extension 560. The base portion 556 preferably has a first face 562 and a second face 564. The second face 564 is provided perpendicular to the first face 562.

The threaded shank portion 558 extends outwardly from the first face 562 of the base portion 556. The threaded shank portion 558 has a slot 566 provided therethrough which extends from an end thereof toward the first face 562 of the base portion 556.

The snap-in extension 560 extends outwardly from the second face 564 of the base portion 556 such that the snap-in extension 560 is perpendicular to the threaded shank portion 558. At an end of the snap-in extension 560 opposite of the second face 564 of the base portion 556, the snap-in extension 560 has a pair of flexible prong members 568, 570 which are separated from one another by a crevice 572. Each of the prong members 568, 570 has a protrusion 574, 576 extending perpendicularly outwardly therefrom proximate to the end of the snap-in extension 560 opposite the second face 564 of the base portion 556, such that shoulders 578, 580 are provided on each of the prong members 568, 570.

The nut member 554 is preferably a wing nut which has an aperture 582 therein defining an aperture wall 584. The aperture wall 584 is preferably threaded. The aperture 582 is sized such that the threaded shank portion 558 of the first fastening member 552 can be inserted therein and engage with the aperture wall 584. The aperture 582 is preferably capped at one end thereof such that an extension member 586 extends from the end toward the opening of the aperture 582 between the aperture wall 584.

The structure and parts of the feeder assembly 100 as described hereinabove have numerous advantages over feeder assemblies of the prior art which will be discussed in connection with the operation of the feeder assembly 100 hereinbelow.

Operation of the Feeder Assembly 100

Assembly of the Feeder Assembly 100

In order to utilize the feeder assembly 100, the parts of the feeder assembly 100 must first be assembled to that as best illustrated in FIGS. 1–5 and 40.

The inner drop tube member 110 is positioned within the aperture 284 of the member 282 of the outer drop tube member 108 with the bottom surface 432 of the ring member 424 of the inner drop tube member 110 being positioned on the ledges 328 of the outer drop tube member 108. The fifth portion 386 of the inner drop tube member 110 is positioned around the inner cylindrical portion 344 of the outer drop tube member 108.

The conduit acceptor member 348 of the outer drop tube member 108 is positioned around the feed supply conduit 102 with an opening (not shown) in the feed supply conduit 102 being in communication with the apertures 284, 346, of the outer drop tube member 108.

When the inner drop tube actuator 112a is utilized (see FIG. 1), it is positioned around the feed supply conduit 102 with the first and second end members 452, 454 being positioned on the feed supply conduit 102 on either side of the conduit acceptor member 348 and with the first and second middle members 456, 458 being positioned on either side of the conduit acceptor member 348. The extension member 451 extends through the aperture 368 of the outer drop tube member 108 and through the oval-shaped opening 518 of the inner drop tube actuator 112a.

When the inner drop tube actuator 112b is utilized (see FIGS. 2–5), the first member 528 of the L-bracket 520 is positioned on top of the extension member 451 such that the aperture 532 of the L-bracket 520 is in communication with the aperture 453 of the extension member 451. The threaded shank portion 538 of the first fastening member 522 is then inserted through the aperture 532 of the L-bracket 520 and into the aperture 453 of the extension member 451 such that the threaded shank portion 538 engages the aperture wall 455 of the extension member 451. The threaded shank portion 538 is inserted into the aperture 453 of the extension member 451 until the head portion 536 of the first fastening member 522 abuts against the first member 528 of the L-bracket 520. Thus, the L-bracket 520 is secured to the inner drop tube member 110. The threaded shank portion 542 of the second fastening member 524 is then inserted through the aperture 534 of the second member 530 of the L-bracket 520 until the head portion 540 abuts against the second member 530 of the L-bracket 520. The nut member 526 is then threadedly attached to the second fastening member 524 with the extension member 550 of the nut member 526 being positioned within the slot 544 of the second fastening member 524.

When the inner drop tube actuator 112c is utilized (see FIG. 40), the aperture 453 of the extension member 451 is provided with a wider diameter portion such that a shoulder 588 is provided on the wall 455 of the aperture 453. The prong members 568, 570 of the inner drop tube actuator 112c are flexed inwardly and inserted into the aperture 453 of the extension member 451. The protrusions 574, 576 of the prong members 568, 570 are configured to fit within the wider diameter portion of the aperture 453 of the extension member 451 such that the prong members 568, 570 are unflexed and are secured within the aperture 453 of the extension member 451 with the shoulders 578, 580 of the prong members 568, 570 being abutted against the shoulder 588 of the extension member 451. The nut member 554 is then threadedly attached to the threaded shank portion 558 of the first fastening member 552 with the extension member 586 of the nut member 554 being positioned within the slot 566 of the threaded shank portion 558.

The grill member 106 is positioned around, and connected to, the outer drop tube member 108. The helical thread 268 of the grill member 106 is positioned between the helical threads 330, 332 of the outer drop tube member 108 such that the grill member 106 can be rotatably moved relative to the outer drop tube member 108. The protrusions 340 on the outer drop tube member 108 are temporarily locked into position within the grooves 266 of the grill member 106.

The grill member 106 is connected to the pan member 104. The upstanding outer portion 116 of the pan member 104 is positioned within the pocket 172 of the grill member 106 and is locked to the pan member 104 by the tab member 196 of the grill member 106 being positioned within the recess of one of the extensions 138 of the pan member 104. As there are a plurality of extensions 138 around the circumference of the pan member 104, the tab member 196 can be positioned within the recess of any one of the extensions 138 on the pan member 104, thus allowing for the easy connection of the grill member 106 to the pan member 104 as the grill member 106 and the pan member 104 need not be rotated relative to one another by more than sixty (60) degrees, in the preferred embodiment, in order to connect the grill member 106 to the pan member 104.

The upstanding inner portion 114 of the pan member 104 extends up into the aperture 376 of the inner drop tube member 110 and the aperture 284 of the outer drop tube member 108.

The wing members 302 of the outer drop tube member 108 are preferably positioned above the base portion 118 of the pan member 104 such that the apertures 376, 284 of the inner and outer drop tube members 110, 108, respectively, are in communication with the pan member 104 to define a first or lower gate G-1 which is preferably always provided for in the feeder assembly 100.

Reduction of Birds Raking Feed Within the Feed Assembly 100

The positioning of the wing members 302 which extend over the pan member 104 helps to reduce the amount of feed presented in the pan member 104 which the birds are capable of raking as the raking of feed can potentially cause the feed to become contaminated. Thus, because the birds cannot rake feed presented in the pan member 104 as freely as they could in some pan members of the prior art, the birds cannot rake the feed out of the pan member 104 onto the feeding surface of the poultry house where the feed will come into contact with waste and dirt, thus contaminating the feed.

Thus, the positioning of the wing members 302 within or on the pan member 104 provides a number of advantages and benefits to the overall growth and health of the birds, and to the poultry grower's costs and expenses involved in growing the birds.

Adjustable Upper and Lower Feed Gates

In accordance with the invention, the feeder assembly 100 can be used to present feed to birds of any size, whether they be young, small, immature birds, or older, larger, more mature birds. When birds are young and small, the birds typically require a generally high feed level in the pan member 104 so that the birds can find the feed and gain access to the feed. As the birds grow older and larger, the birds are able to find and gain access to the feed from interior portions of the pan member 104 and can obtain feed from raised pan members 104 if necessary. Thus, it is very desirable to be able to configure the feed level within the pan member 104 to any number of different heights, regardless of whether the feeder assemblies 100 are positioned on the feeding surface or are raised off of the feeding surface.

Adjustable Lower Feed Gate G-1

The height of the lower feed gate G-1 can be adjusted, as desired by the poultry grower. The indicators 280 on the grill member 106, when in alignment with the arrow indicator 357 from the outer drop tube member 108, identify the height of the lower feed gate G-1. When the arrow indicator 357 is in alignment with the indicator 280 numbered "1", the poultry grower knows that the smallest height of the lower feed gate G-1 is being provided, and that the feeder 100 is positively locked in this position because the protrusions 340 are positioned within the grooves 266 of the grill member 106 which are provided at a 90 degree angle from the indicator 280 numbered "1". Conversely, when the arrow indicator 357 is in alignment with the indicator 280 numbered "6", the poultry grower knows that the highest height of the lower feed gate G-1 is being provided, and that the feeder 100 is positively locked in this position because the protrusions 340 are positioned within the grooves 266 of the grill member 106 which are provided at a 90 degree angle from the indicator 280 numbered "6". The arrow indicator 357 and the indicators 280 allow for the easy sight adjustment of the height of the lower feed gate G-1 by the poultry grower, as well as also ensure to the poultry grower that the feeder 100 is positively locked in such a position.

When the lower feed gate G-1 is at the smallest height, with the arrow indicator 357 being in alignment with the indicator 280 numbered "1", the wing members 302 are positioned slightly above the base portion 118 of the pan member 104. When the wing members 302 are positioned slightly above the base portion 118 of the pan member 104, the helical thread 268 on the grill member 106 is meshed between the helical threads 330, 332 on the outer drop tube member 108 and the protrusions 340 on the outer drop tube member 108 are positioned within, and at a bottom of, the grooves 266 of the grill member 106 which are provided at a 90 degree angle from the indicator 280 numbered "1". It should be noted that if the wing members 302 were not provided on the outer drop tube member 108, and if the helical threads 280, 330, 332 were configured properly, the lower feed gate G-1 could be closed as the bottom end 298 of the member 282 could be positioned on the base portion 118 of the pan member 104.

In order for the poultry grower to increase the height of the lower feed gate G-1 to provide more feed within the pan member 104 and to provide a higher feed level within the pan member 104, the poultry grower rotates the grill member 106 relative to the outer drop tube member 108, which is rotationally stable, such that the helical thread 268 of the grill member 106 rotates downwardly within and between the helical threads 330, 332 of the outer drop tube member 108, thus rotating the grill member 106 downwardly relative to the outer drop tube member 108. At the same time, the protrusions 340 on the outer drop tube member 108 are capable of being flexed inwardly and out of the grooves 266 of the grill member 106, as it is provided for on a retractable portion 334 of the outer drop tube member 108. As the grill member 106 is rotated downwardly relative to the outer drop tube member 108, the protrusions 340 will again protract into other grooves 266 of the grill member 106 to help retain the outer drop tube member 108 in the desired position based on the desired height of the lower feed gate G-1.

Thus, the poultry grower can easily adjust the height of the lower feed gate G-1 to provide for different levels and amounts of feed to be presented and retained by the pan member 104 by merely rotating the grill member 106 relative to the outer drop tube member 108, with more feed being presented when the lower feed gate G-1 is at a height defined by the arrow indicator 357 being in alignment with the indicator 280 numbered "6", as illustrated in FIG. 43, than at a height defined by the arrow indicator 357 being in alignment with the indicator 280 numbered "1", as illustrated in FIGS. 45 and 47.

The adjustment of the lower feed gate G-1 is performed without the lowering of the feeder assembly 100 to the feeding surface or the raising of the feeder assembly 100 off of the feeding surface.

It should be noted that the adjustment of the height of the lower feed gate G-1 is performed by the poultry grower without the poultry grower having to reach his/her hand into an inner portion of the feeder assembly as is required with prior art feeder assemblies. Rather, the poultry grower need only manipulate an exterior portion of the grill member 106 in order to change the size of the lower feed gate G-1. Thus, adjustment is facilitated and possible injuries to the poultry grower are eliminated as the poultry grower does not need to reach within the feeder assembly.

Adjustable Upper Feed Gate G-2

With the feeder assembly 100, the poultry grower has the option of presenting the feed in the pan member 104 to the birds anywhere from a high feed level to a low feed level.

The low feed level is presented to the birds in the pan member 104 when the windows 434 of the inner drop tube member 110 are not in alignment with the windows 308 of the outer drop tube member 108. Thus, when the windows 308, 434 are not in alignment with one another, the windows 308 are sealed off by the first, second and third portions 378, 380, 382 of the inner drop tube member 110, forcing the feed to flow only through the lower feed gate G-1.

In order to present a higher feed level to the birds in the pan member 104, a second or upper feed gate G-2 is provided in the feeder assembly 100 by aligning the windows 434 of the inner drop tube member 110 with the windows 308 of the outer drop tube member 108. The upper feed gate G-2 is preferably a variable or adjustable feed gate as the feed level presented by the upper feed gate G-2 can be transitioned from a high level of feed to a low level of feed, with the low level of feed still being higher than the feed level provided by the lower feed gate G-1. The upper feed gate G-2, however, could be provided such that it is not a variable feed gate by changing the configuration of either of the windows 308, 434.

Preferably, for the highest feed level to be presented in the pan member 104, the inner drop tube member 110 is rotated within and relative to the outer drop tube member 108 such that the windows 434 of the inner drop tube member 110 are positioned into alignment with an upper portion of the windows 308 of the outer drop tube member 108, proximate to the first, second, third, sixth and seventh edges 310, 312, 314, 320, 322 such that feed flows through the upper feed gate G-2 and into the pan member 104, as illustrated in FIGS. 43 and 44. The highest feed level will typically be utilized for very young and small birds. The operation of how the inner drop tube member 110 is rotated within and relative to the outer drop tube member 108 will be discussed further herein under the heading "Rotation Of Inner Drop Tube Member 110".

In order to lower the feed level from the high feed level, but still provide a feed level that is higher than the feed level provided by the lower feed gate G-1, the inner drop tube member 110 is again rotated within and relative to the outer drop tube member 108 such that the windows 434 of the inner drop tube member 110 are positioned into alignment with a lower portion of the windows 308 of the outer drop tube member 108, proximate to the third, fourth, fifth and sixth edges 314, 316, 318, 320 such that feed flows through the upper feed gate G-2 and into the pan member 104, as illustrated in FIGS. 45 and 46.

By lowering the feed level even further, the inner drop tube member 110 is again preferably rotated within and relative to the outer drop tube member 108 such that the windows 308 of the outer drop tube member 108 are not in alignment with the windows 434 of the inner drop tube member 110, thus forcing the feed to flow through the lower feed gate G-1 and into the pan member 104, as illustrated in FIGS. 47 and 48. This level would typically be utilized as the birds grow older and larger. Thus, the upper feed gate G-2 is preferably closed from the top down, although the rotation of the inner drop tube member 110 relative to the outer drop tube member 108 could be caused to close the upper feed gate G-2 from the bottom up.

No matter what position the upper feed gate G-2 is positioned in, i.e., allowing feed to flow therethrough or not allowing feed to flow therethrough, feed will always flow through the lower feed gate G-1 in the preferred embodiment. Of course, as the inner drop tube member 110 can be selectively adjusted to precisely position the amount and location of feed in the pan member 104 in a plurality of different positions, other than those heretofore discussed and which are merely representative positions for discussion and illustration purposes, relative to the outer drop tube member 108, the upper feed gate G-2 can thus, likewise, have a plurality of different positions such that the upper feed gate G-2 is, in essence, a variable feed gate such that the poultry grower can provide a smooth transition of feed from a high feed level to a low feed level. Of course, more positions of the inner drop tube member 110 relative to the outer drop tube member 108 can also be provided by changing the shape or configuration of the windows 308, 434 to provide different feed levels in the pan member 104.

It should be noted that the configuration of the windows 308 of the outer drop tube member 108 could be provided for on the inner drop tube member 110, place of the windows 434 thereof, while the windows 434 of the inner drop tube member 110 could be provided for on the outer drop tube member 108, in place of the windows 308 thereof, if desired, as the same function would be performed and the same result achieved as the described preferred embodiment.

Thus, the adjustable upper and lower feed gates G-2, G-1 provide numerous advantages and benefits over feeder assemblies of the prior art. For instance, the windows 308 of the outer drop tube member 108 allow poultry growers to utilize a smooth transition from a high feed level, where feed flows through the variable upper feed gate G-2 and the lower feed gate G-1, to a low feed level, where feed flows only through the lower feed gate G-1. Prior art feeder assemblies having upper feed gates did not have practical means to allow for the poultry grower to make a smooth transition from a high feed level to a low feed level in accordance with the size and age of the birds. Contrarily, prior art feed assemblies, as a practical matter, only allowed for either a high feed level or a low feed level by vertically moving parts of the feeder assemblies to either open or close the upper feed gate.

The upper feed gate G-2 can also be utilized regardless of whether the feeder assembly 100 is raised off of, or lowered to, the feeding surface. Contrarily, prior art feeder assemblies typically activated the upper feed gate by removing the feeder assembly from the feeding surface. This feature of the feeder assembly 100 allows for a number of different management styles to be utilized by the poultry growers depending on their preferences. For instance, in some parts of the world, poultry growers typically prefer to raise feeder assemblies off of the feeding surface prior to the closing of the upper feed gates. In contrast, in the United States of America, poultry growers typically prefer to close the upper feed gates prior to the raising of the feeder assemblies off of the feeding surface. In any event, the poultry grower has numerous possibilities and configurations of how to present the feed to the birds, regardless of the size or age of the birds, with the upper feed gate G-2 being variable and adjustable, the lower feed gate G-1 being adjustable, and the feeder assembly 100 capable of being raised off of the feeding surface, all of which function independently of the other.

The poultry grower could also open the upper feed gate G-2 to any desired position, when it would normally be closed, in order to stimulate the eating of the feed by older birds, as it would give them a short term high feed level.

Also, in the preferred embodiment, by providing the feeder assembly 100 with a lower gate G-1 which is always open, feed is always allowed to flow through the feed supply conduit 102, into the apertures 346, 350 of the outer drop tube member 108, into the aperture 376 of the inner drop tube member 110, and through the lower feed gate G-1 to the pan member 104. Prior art feeder assemblies that utilized both upper and lower feed gates typically only allowed the feed to flow through one of the gates.

Cone of Pan Member 104

The upstanding cone or inner portion 104 of the pan member 104 extends higher from the base portion 118 of the pan member 104 than do cones of many prior art pan members. The cone 114 of the pan member 104 preferably extends to a height that is higher than the height of the windows 308, 434 of the outer and inner drop tube members 108, 110 in order to promote a high level of feed out of the upper feed gates G-2 as the feed will cascade downwardly and outwardly toward the upper feed gates G-2 after it comes into contact with the cone 114 of the pan member 104, as best illustrated in FIGS. 43, 45 and 47.

Rotation of Inner Drop Tube Member 110

As explained hereinabove, three different types of inner drop tube actuators 112a, 112b, 112c can be used to rotate the inner drop tube member 110.

With regard to inner drop tube actuator 112a, and as explained hereinabove, the extension member 451 of the inner drop tube member 110 extends through the aperture 368 of the outer drop tube member 108 and through the oval-shaped opening 518 of the inner drop tube actuator 112a. The inner drop tube actuator 112a is also capable of being linearly moved along the length of the feed supply conduit 102, but linear movement of the inner drop tube actuator 112 along the feed supply conduit 102 is limited by the conduit acceptor member 348 of the outer drop tube member 108, as best illustrated in FIG. 1.

In order to actuate the rotation of the inner drop tube member 110 to adjust or vary the position of the upper feed gate G-2, as described hereinabove, the poultry grower moves the inner drop tube actuator 112a linearly along the length of the feed supply conduit 102. Linear movement of the inner drop tube actuator 112a forces movement of the extension member 451 of the inner drop tube member 110 within the aperture 368 of the outer drop tube member 108. As the aperture 368 of the outer drop tube member 108 is arcuate, the extension member 451 rotates around the aperture 368 of the outer drop tube member 108, thus, forcing the remainder of the inner drop tube member 110 to rotate. The rotation of the inner drop tube member 110 provides for the adjustment or varying of the position of the upper feed gate G-2 by forcing the windows 434 of the inner drop tube member 110 to be in or out of alignment with the windows 308 of the outer drop tube member 108.

The actuation of the inner drop tube member 110 to control the positioning of the windows 434 relative to the windows 308 of the outer drop tube member 108 can be done in a number of manners. In a first manner, a poultry grower can string cables from the circular cylindrical members 476 of the first and second end members 452, 454 of the inner drop tube actuator 112a. The cables can then be moved to different positions to force the inner drop tube actuator 112a to be linearly moved to different positions to force the inner drop tube actuator 112a to be linearly moved along the feed supply conduit 102, thus rotating the inner drop tube member 110. Such an operation would be preferably used mainly in connection with the movement of a single feeder assembly 100. In a second manner a lever can be connected to the inner drop tube actuator 112a to actuate the inner drop tube member 110. Such an operation would be preferably used mainly in connection with the movement of either a partial or total system of feeder assemblies 100. In a third manner, the inner drop tube actuator 112a can be connected to an electronics module that would be preprogrammed to linearly move the inner drop tube actuator 112a along the feed supply conduit 102 in a desired manner. Such an operation would be preferably used mainly in connection with the movement of an entire system of feeder assemblies 100.

As explained hereinabove, any means which can translate the linear movement thereof into the rotation movement of the inner drop tube member 110 is to be considered analogous and/or equivalent to the inner drop tube actuator 112a, including elimination of an actuator member and using one's hand instead.

With regard to the inner drop tube actuator 112b, and as explained hereinabove, the first fastening member 522 secures the L-bracket 520 to the extension member 451 of the inner drop tube member 110. Thus, in order to actuate the rotation of the inner drop tube member 110 to adjust or vary the position of the upper feed gate G-2, as described hereinabove, the poultry grower moves the inner drop tube actuator 112b.

The actuation of the inner drop tube member 110 to control the positioning of the windows 434 relative to the windows 308 of the outer drop tube member 108 is preferably done by the poultry grower stringing cables through the slots 544 of the second fastening member 524, inserting the threaded shank portion 542 of the second fastening member 524 through the aperture 534 of the second member 530 of the L-bracket 520, and then securing the nut member 526 over the threaded shank portion 542 of the second fastening member 524. By securing the nut member 526 over the threaded shank portion 542 of the second fastening member 524, the extension member 550 contacts the cable strung through the slot 544 and secures it within the slot 544. The cables can then be moved to different positions to force the inner drop tube actuator 112b to be moved to different positions, thus rotating the inner drop tube member 110. Of course, it is to be understood that other similar constructions of the inner drop tube actuator 112b could also be utilized to rotate the inner drop tube member 110.

With regard to inner drop tube actuator 112c, and as explained hereinbelow, the prong members 568, 570 secure the fastening member 552 to the extension member 451 of the inner drop tube member 110. Thus, in order to actuate the rotation of the inner drop tube member 110 to adjust or vary the position of the upper feed gate G-2, as described hereinabove, the poultry grower moves the inner drop tube actuator 112c.

The actuation of the inner drop tube member 110 to control the positioning of the windows 434 relative to the windows 308 of the outer drop tube member 108 is preferably done by the poultry grower stringing cables through the slots 566 of the threaded shank portions 558 of the fastening members 552, and then securing the nut member 554 over the threaded shank portion 558. By securing the nut member 554 over the threaded shank portion 558, the extension member 586 contacts the cable strung through the slot 566 and secures it within the slot 566. The cables can then be moved to different positions to force the inner drop tube actuator 112c to be moved to different positions, thus rotating the inner drop tube member 110. Of course, it is to be understood that other similar constructions of the inner drop tube actuator 112c could also be utilized to rotate the inner drop tube member 110.

Bird Welfare Features of the Feeder Assembly 100

The structure of the feeder assembly 100 also provides for the overall welfare of the birds as they are feeding from the feeder assembly 100 by reducing detrimental physical effects to the birds caused by the birds feeding from the feeder assembly 100 and, thus, provides for a reduction of bird condemnation.

In the growing of birds, poultry growers typically try to grow birds which have large, healthy breasts as birds with large, healthy breasts will be the most commercially valuable to the poultry grower. As the birds are grown to have large breasts, the birds generally become front-heavy such that when the birds are eating from feeder assemblies, the birds tend to rest the front sides of their bodies, namely their breasts, on or against the pan or grill members, depending on the configuration of the feeder assemblies, to reduce the amount of weight that the birds must support while they eat. It should be noted that some birds are not raised for the purpose of large breasts because of the cut-up market, but it is still invaluable to have birds with healthy bodies.

Problems, however, can occur when the birds rest the front sides of their bodies on or against the pan or grill members. In particular, when the front sides of the birds rub against the pan or grill members, the front sides of the birds may become detrimentally physically effected, for instance, bruised. The detrimental physical effects to the birds' front sides can potentially cause health problems for the birds and can potentially cause the birds to eat less than the poultry grower would desire as the birds would become uncomfortable resting their front sides on or against the pan or grill members. The detrimental physical effects on the birds' front sides can also cause bird condemnation because after the removal of the birds' feathers, visual inspection of the birds' front sides can detect the detrimental physical effects thereon and, for instance, the effect on the color of the meat which is known to be a healthy color, thus possibly reducing the quality of grade given to the birds. Obviously, the lower quality of grade that is given to the birds, the less commercially valuable the birds become to the poultry grower. The feeder assembly 100 helps to prevent the foregoing by the configuration of the grill member 106 on both the rim member 154 and the plurality of spoke members 156.

As best illustrated in FIG. 49, the side rim portion 160, the curved rim portion 222 and the top rim portion 210 of the rim member 154 help to prevent the detrimental physical effects of the birds' front sides by allowing the breasts of the birds to conform thereto. The side rim portion 160 has the plurality of projections 174 with the first concave portion 176 of one of the projections 174 connecting to the second concave portion 178 of an adjacent projection 174 to allow the birds' front sides to conform thereagainst when the birds eat feed from the pan member 104. The top rim portion 210 has the peak and valley portions 218, 220 to allow the birds' front sides to conform to the valley portions 220 when the birds eat feed from the pan member 104. The curved rim portion 222 allows for a smooth transition from the side rim portion 160 to the top rim portion 210 to allow the birds' front sides to conform thereon. In other words, the front sides of birds will more easily conform on or against the grill member 106 of the present invention than those of the prior art because the prior art feeder assemblies generally do not have smooth transitions and do not provide areas to which the birds' front sides to conform. Contrarily, prior art feeder assemblies typically provide for the exact opposite, having areas which would project into the front sides of the birds as they rest against the feeder assemblies and, therefore, do not allow the birds' front sides to conform thereto, thus possibly causing detrimental physical effects to the birds' front sides which can lead to health problems for the birds and can potentially cause the birds to eat less than the poultry grower would desire as the birds would become uncomfortable resting their front sides on or against the pan or grill members.

As best illustrated in FIG. 49, the spoke members 156 help to further prevent the detrimental physical effects on the birds' front sides by being set back on the top rim portion 210 of the rim member 154 from the side rim portion 160 of the rim member 154, proximate to the inner edge 216 of the top rim portion 210. As the spoke members 156 are set back, the birds' front sides can more easily rest on the top rim portion 210 of the rim member 154. The convexity of the first portion 244 of the spoke members 156 and the concavity of the second portion 246 of the spoke members 156 further allow for the birds' front sides to easily conform thereto.

Thus, the configuration of the grill member 106 helps assist in the overall health and comfort of the birds, as the grill member 106 is designed to be comfortable to the birds which leads to the birds staying longer at the feeder assembly 100 and, consequently, eating more feed.

Shallow/Deep Pan Depth

It is an advantage that the feeder assembly 100 has both the capabilities of a shallow pan depth for young birds to have access to the feed in the pan member 104, and a deep pan depth for older birds to feed from the pan member 104.

The shallow and deep pan depths are provided by the rim member 154 of the grill member 106 when the feeder assembly 100 is positioned on the feeding surface. As best illustrated in FIGS. 1–5, the valley portions 220 of the top rim portion 210 of the rim member 154 provide for the shallow pan depth, which is typically about two and a half (2.5) inches from the base portion 118 of the pan member 104. Young birds can see over the valley portions 220 of the top rim portion 210 to see the feed and be attracted thereto. The young birds can also climb into the pan member 104 at the valley portions 220 of the top rim portion 210 of the rim member 154 such that the young birds so that they can eat the feed provided within the pan member 104. It has been found that a pan depth of two and a half (2.5) inches is the optimal pan depth for feeding young birds. As best illustrated in FIGS. 1–5 and 49, the peak portions 218 of the top rim portion 210 of the rim member 154 provides for the deep pan depth, which is typically about three (3) inches from the base portion 118 of the pan member 104. It has been found that a pan depth of three (3) inches is the optimal pan depth for feeding larger birds because this depth helps to prevent the larger birds from raking the feed presented in the pan member 104, or building high feed levels within the pan member 104, such that the amount of wasted or contaminated feed is minimized. It has been found that ¾" is the optimal fed level for larger birds. Thus, the peak portions 218 of the top rim portion 210 force provide such a benefit when the feeder assembly 100 is utilized to feed larger birds.

Thus, the feeder assembly 100 provides for the functionality of both a shallow pan depth feeder assembly necessary for younger birds and for a deep pan depth feeder assembly which is desirable for older birds such that the poultry grower need not have two sets of feeder assemblies, one with a shallow pan depth and one with a deep pan depth. The shallow/deep pan depths also require no work of any kind by the poultry grower or vertical movement of the feeder assembly 100 to be effected. The pan depths are naturally provided by use of the feeder assembly 100, with only the size of the bird defining which pan depth the birds utilize.

Prevention of Material Buildup in the Feeder Assembly 100

The inner drop tube member 110 preferably includes the apertures 450 to allow dust, feed or other material to flow therethrough to prevent the buildup of excess material in the feeder assembly 100 which could potentially cause problems to the feeder assembly 100.

Wide Eating Area

The base portion 118 of the pan member 104 is wider than those generally provided in prior art feeder assemblies. The wider base portion 118 of the pan member 104 provides smaller birds with more room to eat, i.e., access to the feed presented in the pan member 104. The wider base portion 118 of the pan member 104 also provides a visually larger feed area to the birds which encourages the birds to eat the feed from the pan member 104.

Cleaning of the Feeder Assembly 100

The feeder assembly 100 can be easily cleaned by the poultry grower. Prior to the cleaning of the feeder assembly 100, the poultry grower can rotate the pan member 104 and the grill member 106 relative to one another such that the tab member 196 of the grill member 106 is not positioned within the recess of one of the extensions 138 of the pan member 104. The hook member 144 on the pan member 104 is then positioned within the slot 208 of the grill member 106 to suspend the pan member 104 from the grill member 106. Thus, once the pan member 104 is suspended from the grill member 106, the poultry grower can commence cleaning of the feeder assembly 100 as the suspending of the pan member 104 from the grill member 106 allows the poultry grower to easily access all parts of the feeder assembly 100.

The inner drop tube member 110 can also, for instance, be removed from within the outer drop tube member 108 by pushing in the ring member 424 of the inner drop tube member 110 such that the ring member 424 no longer rests on the ledges 328 of the portions 324 of the member 282 of the outer drop tube member 108, allowing the inner drop tube member 110 to be removed from the outer drop tube member 108. The inner drop tube member 110 can later be reinserted within the outer drop tube member 108 as the ring member 424 will flex inwardly until the inner drop tube member 110 can rest on the ledges 328. Thus, the ledges 328 of the portions 324 are capable of holding the inner drop tube member 110 within the outer drop tube member 108.

Structure of the feeder assembly 600

Attention is invited to the second embodiment of the feeder assembly 600 which is shown in FIGS. 50–57. The feeder assembly 600 differs from the feeder assembly 100 in that the feeder assembly 600 is not provided with an inner drop tube member, an inner drop tube actuator, or windows on the outer drop tube member. The illustrated feeder assembly 600 desirably is adapted to be used in connection with a poultry feeder system that includes a feed supply conduit 102. Desirably, the feeder system includes a plurality of feeder assemblies 600, which can be vertically adjusted to either rest on the ground or be suspended above the ground by raising or lowering the feed supply conduit 102 or by other suitable means. The feeder assemblies 600 are preferably utilized to feed all different types of birds, including chickens, turkeys and ducks, from a time when the birds are very young until the birds are fully grown. It should be noted that other types of animals could also be fed with the feeder assemblies 600 of the invention.

It should be noted that the elements of the reference numerals of the feeder assembly 600 are similar to like elements of the reference numerals of the feeder assembly 100, with elements having reference numerals in the six hundreds being similar to the elements having reference numerals in the one hundreds, elements having reference numerals in the seven hundreds being similar to the elements having reference numerals in the two hundreds, and elements having reference numerals in the eight hundreds being similar to the elements having reference numerals in the three hundreds.

The illustrated feeder assembly 600 generally includes a pan member 104, a grill member 106, and a drop tube member 608.

The pan member 104 of the second embodiment is identical to the pan member 104 provided for in the first embodiment and, therefore, the details and advantages of the pan member 104 of the second embodiment will not be discussed herein. Likewise, the grill member 106 of the second embodiment is identical to the grill member 106 provided for in the first embodiment and, therefore, the details and advantages of the grill member 106 of the second embodiment will not be discussed herein. Thus, only the differences in structure and function between the first and second embodiments will be discussed herein.

Drop Tube Member 608

Attention is now directed to the drop tube member 608, which is best illustrated in FIGS. 51–56.

The drop tube member 608 includes a member 782 having an aperture 784 therethrough such that the member 782 is hollow. The member 782 preferably has a first portion 786, a second portion 788, a third portion 790, a fourth portion 792, a fifth portion 794, and a sixth portion 796. The first portion 786 extends upwardly and inwardly from a bottom end 798 of the member 782 to a first end of the second portion 788 such that the member 782 has an inner diameter proximate to the bottom end 798 thereof which is larger than an inner diameter proximate to the first end of the second portion 788. The second portion 788 extends inwardly from the first end thereof to a first end of the third portion 790 such that the member 782 has an inner diameter proximate to the first end of the second portion 788. The third portion 790 extends upwardly and inwardly from the first end thereof to a first end of the fourth portion 792 which is smaller than the inner diameter proximate to the first end of the third portion 790. The fourth portion 792 extends upwardly and inwardly from the first end thereof to a first end of the fifth portion 794 such that the member 782 has an inner diameter proximate to the first end of the fifth portion 794 which is smaller than the inner diameter proximate to the first end of the fourth portion 792. The fifth portion 794 extends inwardly from the first end thereof to a first end of the sixth portion 796 such that the member 782 has an inner diameter proximate to the first end of the sixth portion 796 which is slightly smaller than the inner diameter proximate to the first end of the fifth portion 794. The sixth portion 796 extends upwardly from the first end thereof to a top end 800 of the member 782, such that the member 782 has an inner diameter at the top end 800 thereof which is equivalent to the inner diameter proximate to the first end of the sixth portion 796.

The drop tube member 608 further preferably includes a plurality of wing members 802 extending therefrom. The wing members 802 are connected to an outer surface 804 of the member 782 along the first, second and third portions 786, 788, 790 thereof. The wing members 802 are curved outwardly and downwardly from the outer surface 804 of the member 782 such that a bottom end 806 of the wing members 802 is positioned below the bottom end 798 of the member 782, thus allowing the aperture 784 of the member 782 to be open at the bottom end 798 thereof. The bottom end 806 of the wing members 802 is preferably flat or horizontal. In a preferred embodiment, the plurality of wing members 802 number eight (8) and are positioned equidistantly apart from one another, such that each wing member 802 is positioned forty-five (45) degrees apart from one another. It should be noted that the drop tube member 608 could be provided without the wing members 802 if desired.

The drop tube member 608 further preferably includes a helical track which is preferably a pair of helical threads 830, 832 which wind around the outer surface 804 of the sixth portion 796 of the member 782. The helical threads 830, 832 begin winding proximate to the top end 800 of the member 782 to a position approximately lower than the midpoint between the top end 800 and the connection between the fifth and sixth portions 794, 796. The helical threads 830, 832 are spaced apart from one another a distance which is slightly larger than the size of the helical thread 768 of the collar member 158 of the grill member 106.

As best illustrated in FIGS. 51–52 and 54–56, the drop tube member 608 further preferably includes at least one retractable portion 834. Each retractable portion 834 is formed on the sixth portion 796 of the member 782 approximately at the midpoint between the top end 800 and the connection between the fifth and sixth portions 794, 796. The retractable portion 834 is formed by a pair of notches 836, 838 on either side thereof which extend from a top of the retractable portion 834 to a bottom of the retractable portion 834.

The retractable portion 834 also has a protrusion 840 extending outwardly therefrom. The protrusion 840 is capable of extending into the grooves 266 of the collar member 158 of the grill member 106 as will be discussed in more detail herein and, during rotation of the drop tube member 608 relative to the grill member 106, allows the retractable portion 834 to be flexed inwardly when the protrusion 840 is not extended within one of the grooves 266 of the collar member 158. In the preferred embodiment, the retractable portions 834 number two (2) and are positioned equidistantly from one another such that they are positioned one-hundred eighty (180) degrees from one another. The helical threads 830, 832 are cut away where they cross the retractable portion(s) 834.

The drop tube member 608 further preferably includes a top member 842 on the member 782. The top member 842 extends perpendicularly inwardly from the top end 800 of the sixth portion 796 of the member 782. The top member 842 covers a portion of the aperture 784 at the top end 800 of the member 782.

The drop tube member 608 further preferably includes an inner cylindrical portion 844, as best illustrated in FIGS. 53 and 54. The inner cylindrical portion 844 extends within the aperture 784 of the member 782 downwardly from the top member 842 of the member 782 to a position approximately equivalent to where the protrusion 840 is provided. The inner cylindrical portion 844 is of a uniform diameter and defines an aperture 846 therein.

The drop tube member 608 further preferably includes a conduit acceptor member 848. The conduit acceptor member 848 has an aperture 850 therethrough which is in communication with the aperture 846 of the inner cylindrical portion 844 and, thus, the aperture 784 of the member 782. The conduit acceptor member 848 extends upwardly from the top member 842 of the member 782, but does not cover the entire top member 842.

The conduit acceptor member 848 generally includes a first side member 852, a second side member 854 and an arced intermediate member 856. The first and second side members 852, 854 are identical and are distanced from one another a predetermined distance and have circular openings 858 therethrough. Tops of the first and second side members 852, 854 are also arced in conformance with the circular openings 858. The arced intermediate member 856 is generally an upside down U-shaped piece and generally extends from the top member 842 between the first and second side members 852, 854 along their respective edges back to the top member 842. The feed supply conduit 102 is capable of extending through the openings 858 of the first and second side members 852, 854 and of allowing feed to drop therefrom into the aperture 850 of the conduit acceptor member 848.

One side of the arced intermediate member 856 preferably has an indicator 857 provided thereon. The indicator 857 is preferably an arrow which is pointing down toward the top member 842 of the outer drop tube member 608. The purpose for the indicator 857 will be discussed further herein under the section heading "Adjustable Feed Gate G-1".

The openings 858 further have notches 860 therein at the top thereof to accept a protrusion (not shown) of the feed supply conduit 102 to prevent the feed assembly 600 from being moved relative to the feed supply conduit 102.

It should be noted that the configuration of the conduit acceptor member 848 may be formed to fit over various types of feed supply conduits.

In a preferred embodiment, the conduit acceptor member 848 further includes at least one member 862 extending upwardly from the arced intermediate member 856 which is capable of accepting and retaining a roost wire. The member 862 preferably has reinforcing members 864 extending from the member 862 to the arced intermediate member 856.

A plurality of reinforcing members 866 which extend from both the first and second side members 852, 854 to the top member 842 of the member 782 are preferably provided. In a preferred embodiment, the reinforcing members 866 number four (4) with two (2) of the reinforcing members 866 extending from the first side member 852 to the top member 842 of the member 782 and two (2) of the reinforcing members 866 extending from the second side member 854 to the top member 842 of the member 782.

Operation of the Feeder Assembly 600

Assembly of the Feeder Assembly 600

Figure 50:
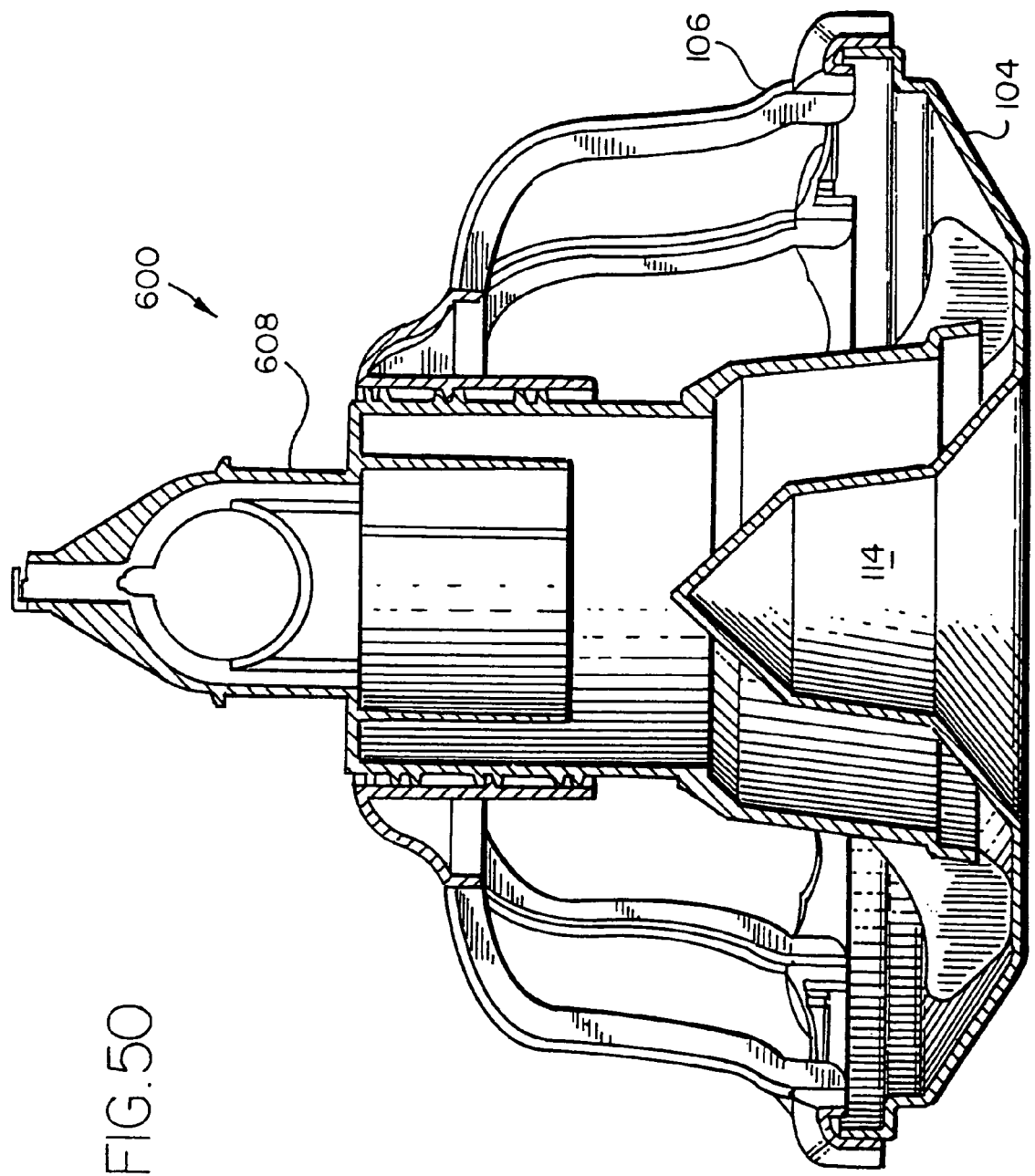
FIG. 50 is a cross-sectional side elevational view of a second embodiment of the feeder assembly of the invention.
Figure 51:
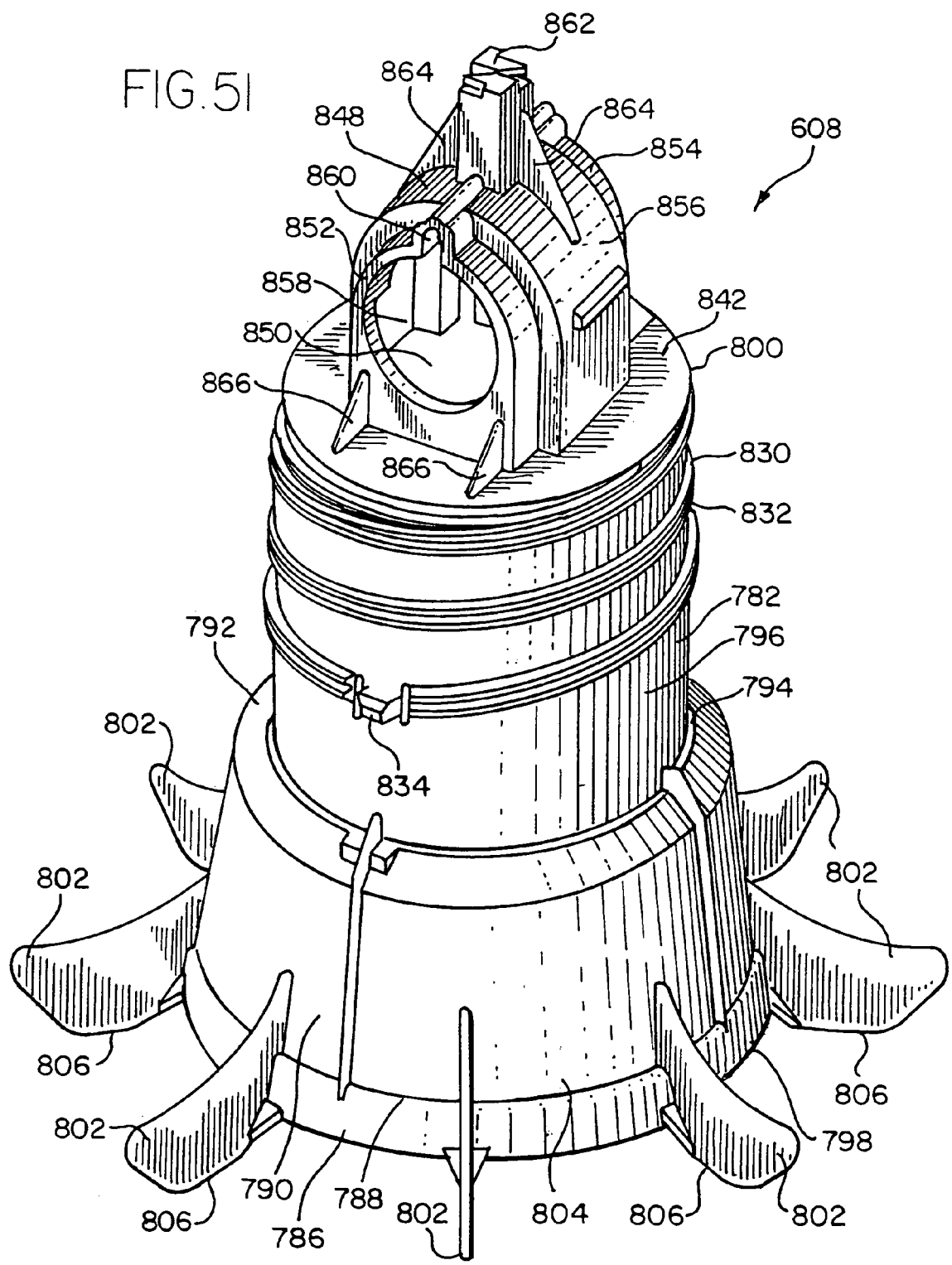
FIG. 51 is a perspective view of a drop tube member of the second embodiment of the feeder assembly of the invention.
Figure 52:
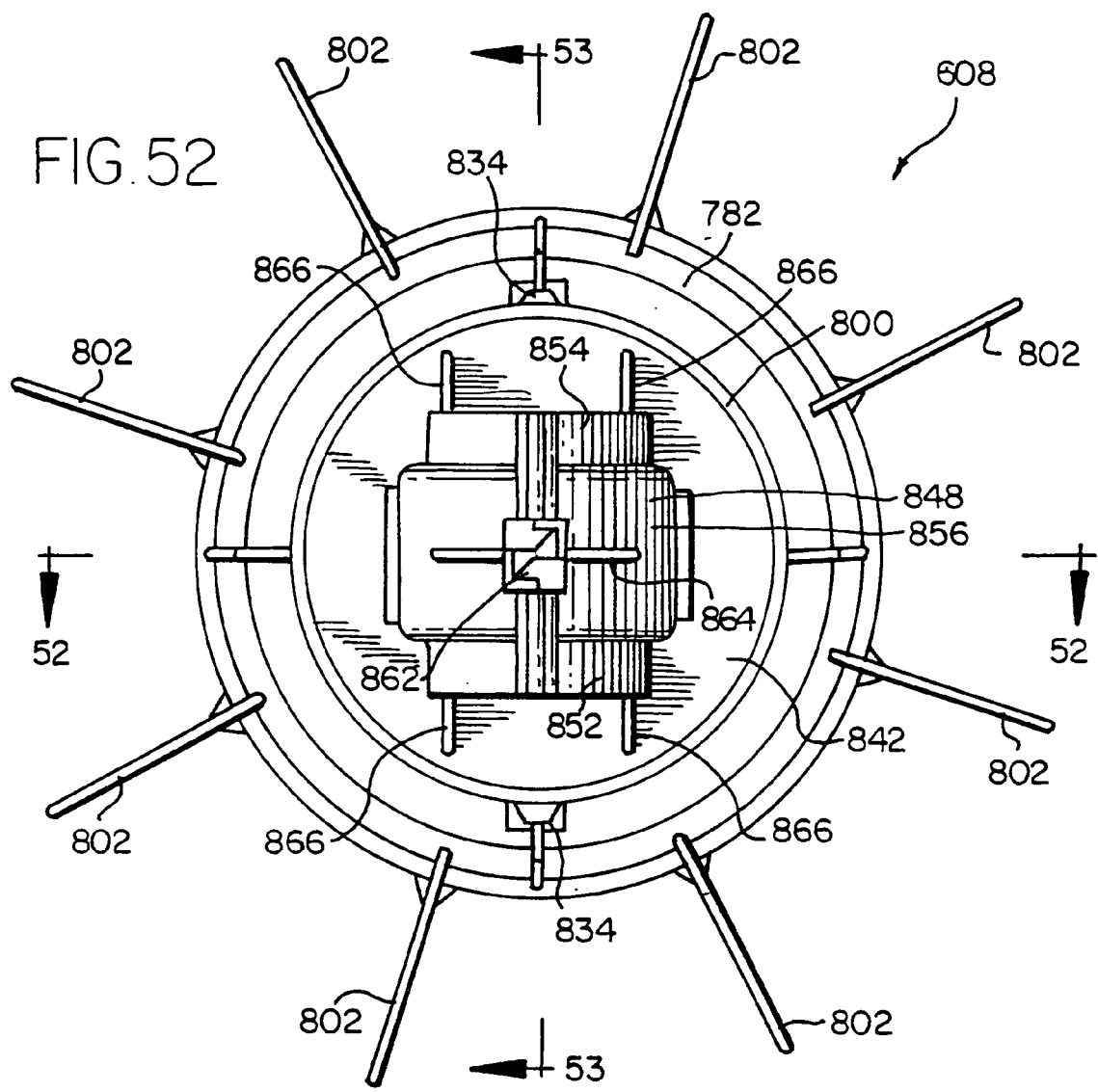
FIG. 52 is a top plan view of the drop tube member of the second embodiment of the feeder assembly of the invention.
Figure 56:
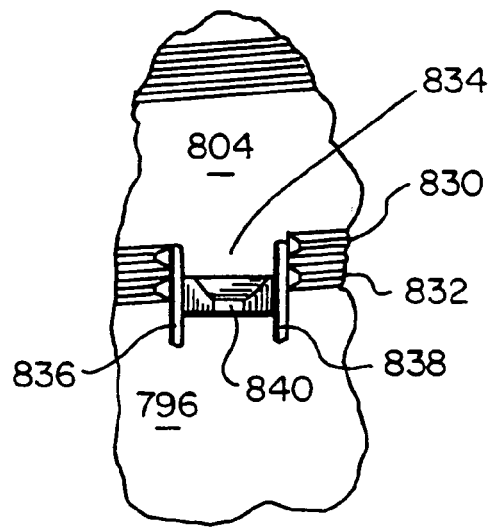
FIG. 56 is a side elevational view of a portion of the drop tube member of the second embodiment of the feeder assembly of the invention.
Figure 55:
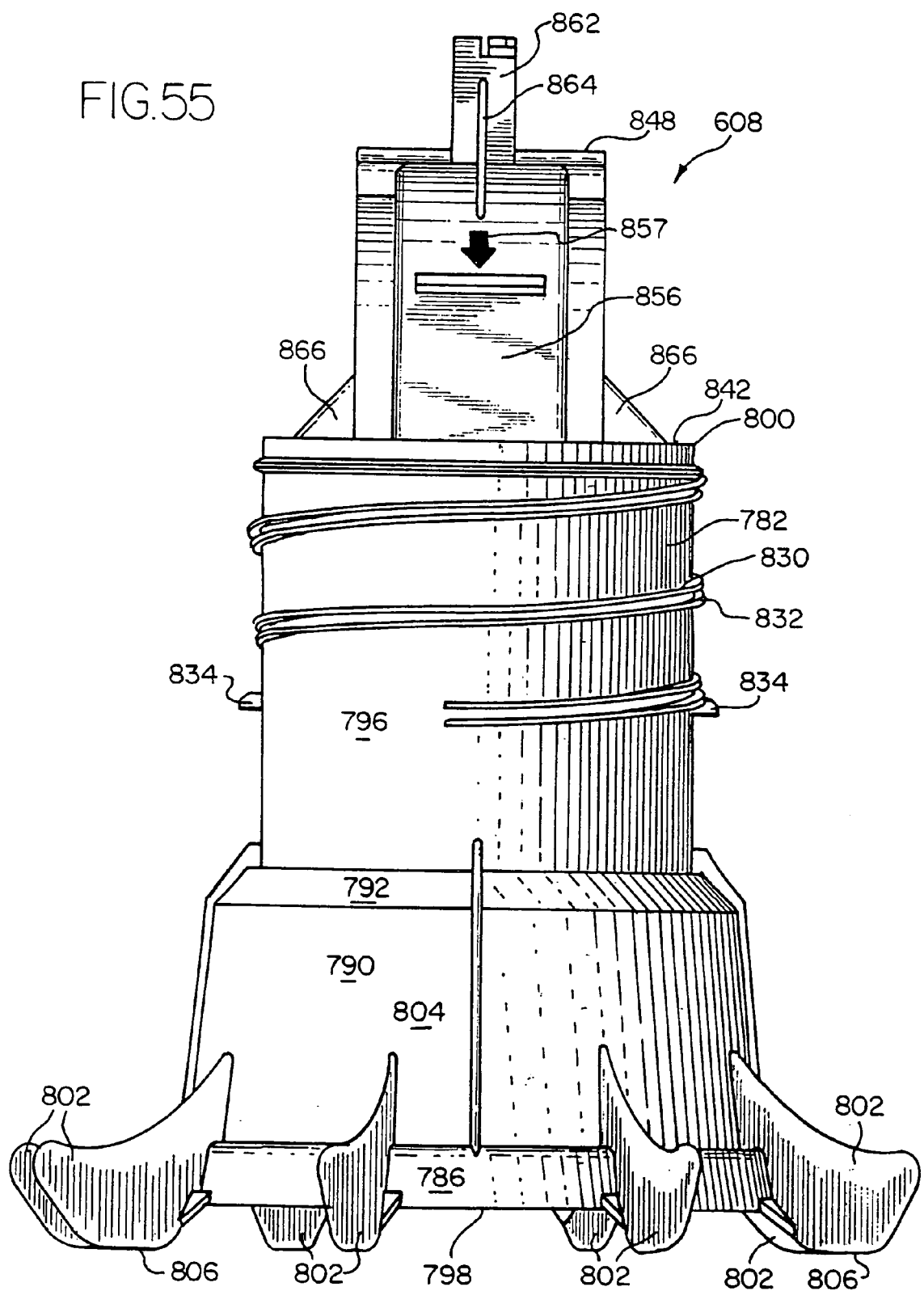
FIG. 55 is a side elevational view of the drop tube member of the second embodiment of the feeder assembly of the invention.

In order to utilize the feeder assembly 600, the parts of the feeder assembly 600 must be assembled to that as best illustrated in FIG. 50.

The conduit acceptor member 848 of the drop tube member 608 is positioned around the feed supply conduit 102 with an opening in the feed supply conduit 102 being in communication with the apertures 782, 846, 850 of the drop tube member 608.

The grill member 106 is positioned around and connected to the drop tube member 608. The helical thread 268 of the grill member 106 is positioned between the helical threads 830, 832 of the drop tube member 608 such that the grill member 106 can be rotatably moved relative to the drop tube member 608. The protrusions 840 on the drop tube member 608 are temporarily locked into position with the grooves 266 of the grill member 106.

The grill member 106 is connected to the pan member 104. The upstanding outer portion 116 of the pan member 104 is positioned within the pocket 162 of the grill member 106 and is locked to the pan member 104 by the tab member 196 of the grill member 106 being positioned within the recess 140 of one of the extensions 138 of the pan member 104. As there are a plurality of extensions 138 around the circumference of the pan member 104, the tab member 196 can be positioned within the recess 140 of any one of the extensions 138 on the pan member 104, thus allowing for the easy connection of the grill member 106 to the pan member 104 as the grill member 106 and the pan member 104 need not be rotated relative to one another by more than sixty (60) degrees, in the preferred embodiment, in order to connect the grill member 106 to the pan member 104.

The upstanding inner portion 114 of the pan member 104 extends up into the aperture 784 of the drop tube member 608.

The wing members 802 of the drop tube member 608 are positioned above the base portion 118 of the pan member 104 such that the aperture 784 of the drop tube member 608 is in communication with the pan member 104 to define a gate G-1.

Reduction of Birds Raking Feed Within the Feed Assembly 600

The positioning of the wing members 802 which extend over the pan member 104 helps to reduce the amount of feed presented in the pan member 104 which the birds are capable of raking as the raking of feed can potentially cause the feed to become contaminated. Thus, because the birds cannot rake feed presented in the pan member 104 as freely as they could in some pan members of the prior art, the birds cannot rake the feed out of the pan member 104 onto the feeding surface of the poultry house where the feed will come into contact with waste and dirt, thus contaminating the feed.

Thus, the positioning of the wing members 802 within or on the pan member 104 provides a number of advantages and benefits to the overall growth and health of the birds, and to the poultry grower's costs and expenses involved in growing the birds.

Adjustable Feed Gate G-1

The height of the feed gate G-1 can be adjusted, as desired by the poultry grower. The indicators 280 on the grill member 106, when in alignment with the arrow indicator 857 from the outer drop tube member 608, identify the height of the feed gate G-1. When the arrow indicator 857 is in alignment with the indicator 280 numbered "1", the poultry grower knows that the smallest height of the feed gate G-1 is being provided, and that the feeder 600 is positively locked in this position because the protrusions 840 are positioned within the grooves 266 of the grill member 106 which are provided at a 90 degree angle from the indicator 280 numbered "1". Conversely, when the arrow indicator 857 is in alignment with the indicator 280 numbered "6", the poultry grower knows that the highest height of the feed gate G-1 is being provided, and that the feeder 600 is positively locked in this position because the protrusions 840 are positioned within the grooves 266 of the grill member 106 which are provided at a 90 degree angle from the indicator 280 numbered "6". The arrow indicator 857 and the indicators 280 allow for the easy sight adjustment of the height of the feed gate G-1 by the poultry grower, as well as also ensure to the poultry grower that the feeder 600 is positively locked in such a position.

When the feed gate G-1 is at the smallest height, with the arrow indicator 857 being in alignment with the indicator 280 numbered "1", the wing members 802 are positioned slightly above the base portion 118 of the pan member 104. When the wing members 802 are positioned slightly above the base portion 118 of the pan member 104, the helical thread 268 on the grill member 106 is meshed between the helical threads 830, 832 on the drop tube member 608 and the protrusions 840 on the drop tube member 608 are positioned within, and at a bottom of, the grooves 266 of the grill member 106 which are provided at a 90 degree angle from the indicator 280 numbered "1". It should be noted that if the wing members 802 were not provided on the drop tube member 608, and if the helical threads 268, 830, 832 were configured properly, the feed gate G-1 could be closed as the bottom end 798 of the member 782 could be positioned on the base portion 118 of the pan member 104.

In order for the poultry grower to increase the height of the feed gate G-1 to provide more feed within the pan member 104 and to provide a higher feed level within the pan member 104, the poultry grower rotates the grill member 106 relative to the drop tube member 608, which is rotatably stable, such that the helical thread 268 of the grill member 106 rotates downwardly within and between the helical threads 830, 832 of the drop tube member 608, thus rotating the grill member 106 downwardly relative to the drop tube member 608. At the same time, the protrusions 840 on the drop tube member 608 are capable of being flexed inwardly and out of the grooves 266 of the grill member 106, as they are provided for on retractable portions 834 of the drop tube member 608. As the grill member 106 is rotated downwardly relative to the drop tube member 608, the protrusions 834 will again protract into other grooves 266 of the grill member 106 in the desired position based on the desired height of the feed gate G-1.

Figure 57:
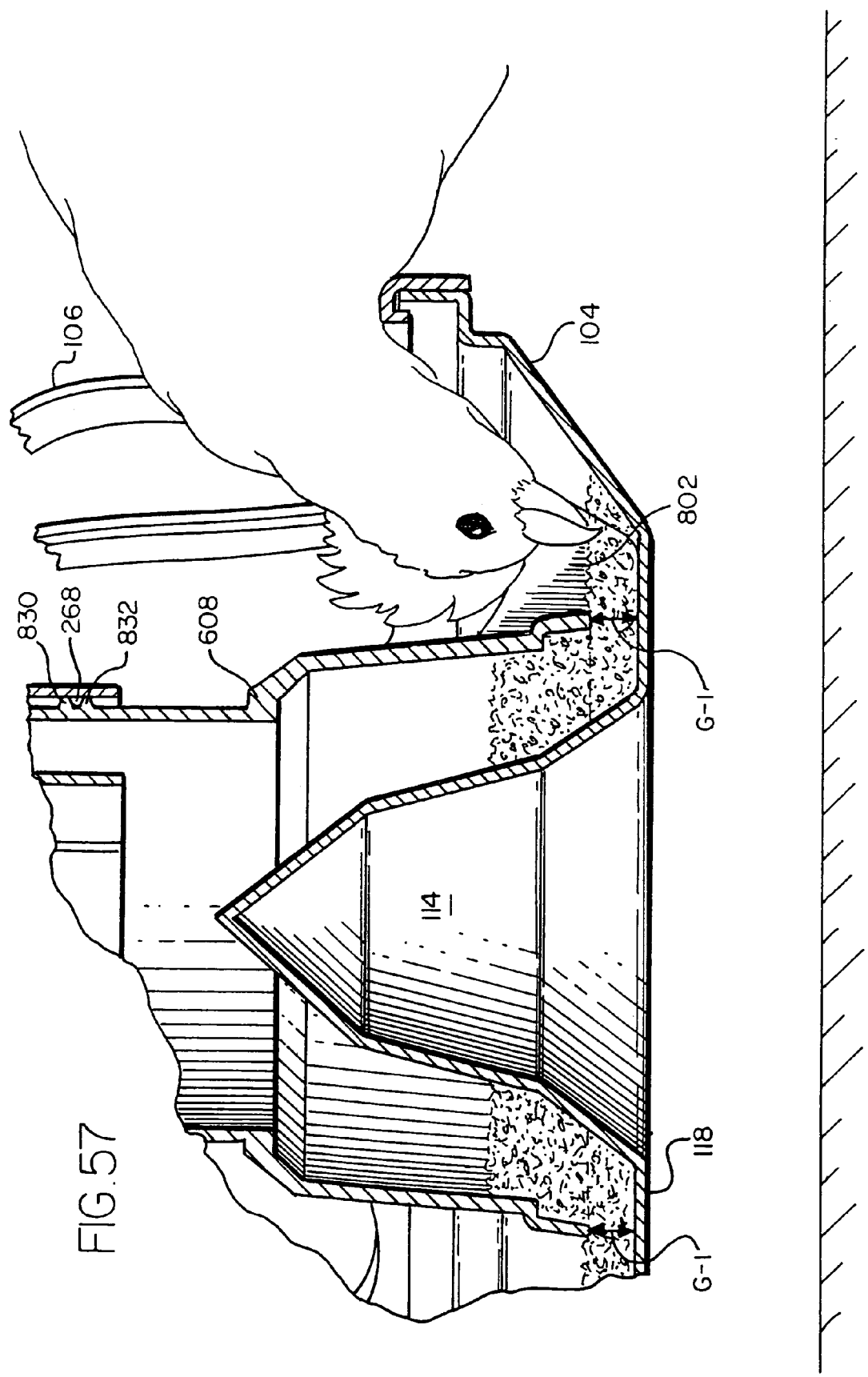
FIG. 57 is a partial cross-sectional side elevational view of the second embodiment of the feeder assembly of the invention with a bird feeding therefrom and feed flowing through a lower feed gate.

Thus, the poultry grower can easily adjust the height of the feed gate G-1 to provide for different levels and amounts of feed to be presented and retained by the pan member 104 by merely rotating the grill member 106 relative to the drop tube member 608, with more feed being presented when the feed gate G-1 is at a height defined by the arrow indicator 857 being in alignment with the indicator 280 numbered "6", than at a height defined by the arrow indicator 857 being in alignment with the indicator 280 numbered "1", as best illustrated in FIG. 57.

The adjustment of the feed gate G-1 is performed without the lowering of the feeder assembly 600 to the feeding surface or the raising of the feeder assembly 600 off of the feeding surface.

It should be noted that the adjustment of the height of the feed gate G-1 is performed by the poultry grower without the poultry grower having to reach his/her hand into an inner portion of the feeder assembly as is required with prior art feeder assemblies. Rather, the poultry grower need only manipulate an exterior portion of the grill member 106 in order to change the size of the feed gate G-1. Thus, adjustment is facilitated and possible injuries to the poultry grower are eliminated as the poultry grower does not need to reach within the feeder assembly.

Structure of the Feeder Assembly 900

Attention is invited to the third embodiment of the feeder assembly 900 which is illustrated in FIGS. 58–60. The illustrated feeder assembly 900 desirably is adapted to be used in connection with a poultry feeder system that includes a feed supply conduit 102, and which does not utilize a grill member, such as the type disclosed in U.S. Pat. No. 4,834,026. Desirably, the poultry feeder system includes a plurality of feeder assemblies 900, which can be vertically adjusted to either rest on the ground or be suspended above the ground by raising or lower the feed supply conduit 102 or by other suitable means. The feeder assemblies 900 are preferably utilized to feed all different types of birds including chickens, turkeys and ducks, from a time when the birds are very young until the birds are fully grown. It should be noted that other types of animals could also be fed with the feeder assemblies 900 of the invention.

It should be noted that the elements of the reference numerals of the feeder assembly 900 are similar to like elements of the reference numerals of the feeder assembly 100, with elements having reference numerals in the nine hundreds being similar to the elements having reference numerals in the one hundreds and elements having reference numerals in the ten hundreds being similar to the elements having reference numerals in the two hundreds.

The illustrated feeder assembly 900 generally includes a pan member 904 and a drop tube assembly 907. The drop tube assembly 907 of the feeder assembly 900 will not be discussed, however, as it is not considered to be germane to the invention of the third embodiment of the invention as a drop tube assembly of the type disclosed herein with regard to the first and second embodiments, or a drop tube assembly of the type disclosed in prior art patents, could be utilized and still achieve the objects of the invention. The pan member 904 of the third embodiment is configured to have parts similar to both the pan member 104 and the grill member 106, as the feeder assembly 900 does not have a grill member.

Attention is now directed to the pan member 904. The pan member 904 has at least an upstanding outer portion 916 and a base portion 918 which are integrally formed. An outer surface 920 of the pan member 904 at the base portion 918 is capable of resting on a feeding surface of a poultry house, such as a floor or the ground.

The upstanding outer portion 916 preferably has a rim member 954 thereon at a top thereof. The rim member 954, in a preferred embodiment, is generally circular, although the configuration of the rim member 954 could be formed in a manner other than circular in order to achieve the objects of the invention. A side rim portion 960 of the rim member 954 has an outer surface 968, and is commensurate with an outer surface 920 of the upstanding outer portion 916.

The outer surface 968 of the side rim portion 960 is formed from a plurality of projections 974. In a preferred embodiment, and preferably for use with smaller birds, the plurality of projections 974 number twelve (12) and are spaced equidistantly apart from one another with a thirty (30) degree angle between the centers of the projections 974. In another preferred embodiment, and preferably for use with larger birds, the plurality of projections 974 number eight (not shown) and are spaced equidistantly apart from one another with a forty-five (45) degree angle between the centers of the projections 974.

In a preferred embodiment, and as best illustrated in FIGS. 58 and 59, each projection 974 has a first concave portion 976 at one end thereof, a second concave portion 978 at an opposite end thereof, and a convex portion 980 between the first and second concave portions 976, 978. On adjacent projections 974, an end of the first concave portion 976 of one of the adjacent projections 974 preferably, but not necessarily, meets an end of the second concave portion 978 of the other one of the adjacent projections 974. Thus, the outer surface 968 of the side rim portion 960 is provided at varying radial distances from a center of the feeder assembly 900.

Also, in a preferred embodiment, an upper edge 986 of each projection 974 is formed of a first concave edge 988 at one end thereof, a second concave edge 990 at an opposite end thereof, and a convex edge 992 between the first and second concave edges 988, 990, as best illustrated in FIGS. 58 and 59. On adjacent projections 974, an end of the first concave edge 988 of one of the adjacent projections 974 preferably, but not necessarily, meets an end of the second concave edge 990 of the other one of the adjacent projections 974. Thus, the upper edge 986 of the projections 974 of the side rim portion 960 is provided at varying vertical distances from the base portion 918 of the pan member 904. The first concave edge 988 is provided for at the upper edge 986 of the first concave portion 976, the second concave edge 990 is provided for at the upper edge 986 of the second concave portion 978, and the convex edge 992 is provided for at the upper edge 986 of the convex portion 980.

The rim member 954 in a preferred embodiment also has a top rim portion 1010. The top rim portion 1010 has a top surface 1012 which is defined between an outer edge 1014 and an inner edge 1016 of the top rim portion 1010. When viewed in a side-elevational view, as in FIG. 58, the top surface 1012 appears to be provided in a series of curved peak portions 1018 and curved valley portions 1020 extending circumferentially around the top rim portion 1010. The peak portions 1018 and the valley portions 1020 are formed because the inner edge 1016 of the top surface 1012 curves circumferentially downwardly from one of the peak portions 1018 to a point which is equidistant between the one peak portion 1018 and the adjacent peak portion 1018, and then curves circumferentially upwardly to the adjacent peak portion 1018. Similarly, the peak portions 1018 and the valley portions 1020 are formed because an outer edge 1014 of the top surface 1012 curves circumferentially downwardly proximate to one of the peak portions 1018 to a point which is equidistant between the one peak portion 1018 and the adjacent peak portion 1018, and then curves circumferentially upwardly proximate to the adjacent peak portion 1018. In the preferred embodiment of the invention, and preferably for use with smaller birds, the top surface 1012 of the top rim portion 1010 has twelve (12) peak portions 1018 and twelve (12) valley portions 1020, which are alternated around the circumference of the rim member 954 such that a thirty (30) degree angle is provided between the centers thereof. In another preferred embodiment, and preferably for use with larger birds, the top surface 1012 of the top rim portion 1010 has eight (8) peak portions 1018 and eight (8) valley portions 1020 (not shown), which are alternated around the circumference of the rim member 954 such that a forty-five (45) degree angle is provided between the centers thereof.

When viewed in side-elevational view, as best illustrated in FIG. 58, the top surface 1012 of the top rim portion 1010 also curves downwardly and outwardly from the inner edge 1016 to the outer edge 1014.

The outer edge 1014 of the top surface 1012 is curved such that the outer edge 1014 is curved inwardly and downwardly at the valley portions 1020 of the top surface 1012 and curved outwardly and upwardly at the peak portions 1018 of the top surface 1012.

The rim member 954 in a preferred embodiment also has a curved rim portion 1022. As best illustrated in FIGS. 58 and 59, the curved rim portion 1022 connects the side rim portion 960 to the top rim portion 1010 and provides a smooth transition from the outer surface 968 of the side rim portion 960 to a top surface 1012 of the top rim portion 1010. The curved rim portion 1022 connects the convex edges 992 of the projections 974 to the outer edges 1014 of the peak portions 1018 of the top rim portion 1010. The curved rim portion 1022 also connects the concave edges 988, 990 of the projections 974 to the outer edges 1014 of the valley portions 1020 of the top rim portion 1010.

The purpose of this configuration of the rim member 954 allows for a front portion of a bird's body to conform thereagainst when the bird feeds from the feeder assembly 900 such that detrimental physical effects to the body of the bird are not caused, or are at least minimized, when the bird feeds from the feeder assembly, as will be discussed further herein under the heading "Bird Welfare Features Of The Feeder Assembly 900". It should be noted that the configuration of the rim member 954 and the pan member 904 could be formed in a manner other than described hereinabove in order to achieve the objects of the invention, such that a front portion of a bird's body can conform thereagainst when the bird feeds from the feeder assembly 900 such that detrimental physical effects to the body of the bird are not caused, or are at least minimized, when the bird feeds from the feeder assembly 900.

Bird Welfare Features of the Feeder Assembly 900

The structure of the feeder assembly 900 provides for the overall welfare of the birds as they are feeding from the feeder assembly 900 by reducing detrimental physical effects to the birds caused by the birds feeding from the feeder assembly 900 and, thus, provides for a reduction of bird condemnation.

In the growing of birds, poultry growers typically try to grow birds which have large, healthy breasts as birds with large, healthy breasts will be the most commercially valuable to the poultry grower. As the birds are grown to have large breasts, the birds generally become front-heavy such that when the birds are eating from feeder assemblies, the birds tend to rest the front sides of their bodies, namely their breasts, on or against the pan or grill members, depending on the configuration of the feeder assemblies, to reduce the amount of weight that the birds must support while they eat. It should be noted that some birds are not raised for the purpose of large breasts because of the cut-up market, but it is still invaluable to have birds with healthy bodies.

Problems, however, can occur when the birds rest the front sides of their bodies on or against the pan or grill members. In particular, when the front sides of the birds rub against the pan or grill members, the front sides of the birds may become detrimentally physically effected, for instance, bruised. The detrimental physical effects to the birds' front sides can potentially cause health problems for the birds and can potentially cause the birds to eat less than the poultry grower would desire as the birds would become uncomfortable resting their front sides on or against the pan or grill members. The detrimental physical effects on the birds' front sides can also cause bird condemnation because after the removal of the birds' feathers, visual inspection of the birds' front sides can detect the detrimental physical effects thereon and, for instance, the effect on the color of the meat which is known to be a healthy color, thus possibly reducing the quality of grade given to the birds. Obviously, the lower quality of grade that is given to the birds, the less commercially valuable the birds become to the poultry grower. The feeder assembly 900 helps to prevent the foregoing by the configuration of the rim member 954 of the pan member 904.

As best illustrated in FIG. 60, the side rim portion 960, the curved rim portion 1022 and the top rim portion 1010 of the rim member 954 help to prevent, or at least minimize, the detrimental physical effects of the birds' front sides by allowing the breasts of the birds to conform thereto. The side rim portion 960 has the plurality of projections 974 with the first concave portion 976 of one of the projections 974 connecting to the second concave portion 978 of an adjacent projection 974 to allow the birds' front sides to conform thereagainst when the birds eat feed from the pan member 904. The top rim portion 1010 has the peak and valley portions 1018, 1020 to allow the birds' front sides to conform to the valley portions 1020 when the birds eat feed from the pan member 904. The curved rim portion 1022 allows for a smooth transition from the side rim portion 954 to the top rim portion 1010 to allow the birds' front sides to conform thereon. In other words, the front sides of birds will more easily conform on or against the pan member 904 of the present invention than those of the prior art because the prior art feeder assemblies generally do not have smooth transitions and do not provide areas to which the birds' front sides conform. Contrarily, prior art feeder assemblies typically provide for the exact opposite, having areas which would project into the front sides of the birds as they rest against the feeder assemblies and, therefore, do not allow the birds' front sides to conform thereto, thus possibly causing detrimental physical effects to the birds's front sides which can lead to health problems for the birds and can potentially cause the birds to eat less than the poultry grower would desire as the birds would become uncomfortable resting their front sides on or against the pan or grill members.

Thus, the configuration of the pan member 904 helps assist in the overall health and comfort of the birds, as the pan member 904 is designed to be comfortable to the birds which leads to the birds staying longer at the feeder assembly 900 and, consequently, eating more feed.

Shallow/Deep Pan Depth

It is an advantage that the feeder assembly 900 has both the capabilities of a shallow pan depth for young birds to have access to the feed in the pan member 904, and a deep pan depth for older birds to feed from the pan member 904.

The shallow and deep pan depths are provided by the rim member 954 of the pan member 904 when the feeder assembly 900 is positioned on the feeding surface. As best illustrated in FIGS. 58 and 60, the valley portions 1020 of the top rim portion 1010 of the rim member 954 provide for the shallow pan depth, which is typically about two and a half (2.5) inches from the base portion 918 of the pan member 904. Young birds can see over the valley portions 1020 of the top rim portion 1010 to see the feed and be attracted thereto. The young birds can also climb into the pan member 904 at the valley portions 1020 of the top rim portion 1010 of the rim member 954 such that the young birds so that they can eat the feed provided within the pan member 904. It has been found that a pan depth of two and a half (2.5) inches is the optimal pan depth for feeding young birds. As best illustrated in FIGS. 58 and 60, the peak portions 1018 of the top rim portion 1010 of the rim member 954 provides for the deep pan depth, which is typically about three (3) inches from the base portion 918 of the pan member 904. It has been found that a pan depth of three (3) inches is the optimal pan depth for feeding larger birds because this depth helps to prevent the larger birds from raking the feed presented in the pan member 904, or building high feed levels within the pan member 904, such that the amount of wasted or contaminated feed is minimized. It has been found that ¾" is the optimal feed level for larger birds. Thus, the peak portions 1018 of the top rim portion 1010 force provide such a benefit when the feeder assembly 900 is utilized to feed larger birds.

Thus, the feeder assembly 900 provides for the functionality of both a shallow pan depth feeder assembly necessary for younger birds and for a deep pan depth feeder assembly which is desirable for older birds such that the poultry grower need not have two sets of feeder assemblies, one with a shallow pan depth and one with a deep pan depth. The shallow/deep pan depths also require no work of any kind by the poultry grower or vertical movement of the feeder assembly 900 to be effected. The pan depths are naturally provided by use of the feeder assembly 900, with only the size of the bird defining which pan depth the birds utilize.

While preferred embodiments of the present invention are shown and described, it is envisioned that those skilled in the art may devise various modifications of the present invention without departing from the spirit and scope of the appended claims.

The invention claimed is:

1. A grill member for use in a feeder assembly for presenting feed to birds, said grill member comprising:
  a generally curved rim member having an outward side surface which varies in radial distance relative to a center of said grill member, said rim member further includes a top surface which varies in vertical height relative to a generally planar lower edge of said grill member without adjustment of said grill member.

2. A grill member as defined in claim 1, wherein said outward side surface of said rim member is formed of a plurality of projecting and recessed portions.

3. A grill member as defined in claim 2, wherein said projecting portions are convex and wherein said recessed portions are concave.

4. A grill member as defined in claim 2, wherein said plurality of projecting and recessed portions are provided in an alternating configuration about said outward side surface.

5. A grill member as defined in claim 1, wherein said outward side surface of said rim member is formed of a plurality of projecting portions.

6. A grill member as defined in claim 5, wherein each projecting portion is formed of, in series, a first concave portion, a convex portion, and a second concave portion.

7. A grill member as defined in claim 1, wherein said rim member further includes a curved surface, said curved surface connecting said outward side surface and said top surface together and providing a smooth transition from said outward side surface to said top surface.

8. A grill member as defined in claim 1, wherein said grill member further includes a plurality of spoke members extending upwardly and inwardly from said top surface of said rim member.

9. A grill member as defined in claim 1, wherein said top surface of said rim member is formed of a plurality of alternating peak and valley portions.

10. A grill member as defined in claim 1, further including a plurality of spoke member which are set back on said top surface of said rim member in relation to said outer side surface of said rim member.

11. A grill member as defined in claim 10, further including a collar member capable of accepting a drop tube assembly, said plurality of spoke members connecting said rim member to said collar member.

12. A grill member as defined in claim 10, wherein each said spoke member is configured proximate to said top surface of said rim member to have, in series, a first portion which is convex and a second portion which is concave.

13. A grill member as defined in claim 1, wherein said generally curved rim member is circular in configuration.

14. A grill member for use in a feeder assembly, the feeder assembly including said grill member, a pan member and a rotationally stable drop tube member having a brood gate provided therethrough, said grill member connected to said rotationally stable drop tube member, the drop tube member having a distal end such that a feed gate is provided between the distal end and the pan member, the drop tube member configured to provide feed to the pan member through the feed gate and the brood gate, said grill member comprising means for rotating said grill member relative to said rotationally stable drop tube member in order to change both a position of the brood gate relative to the pan member and a height of the feed gate by changing a distance between the distal end of the drop tube member relative to the pan member in order to control the flow of feed into the pan member through the brood gate and the feed gate.

15. A grill member as defined in claim 14, wherein said position of the brood gate which is changed relative to the pan member is a vertical position of the brood gate.

16. A grill member for use in a feeder assembly, the feeder assembly including said grill member, a pan member having a base portion, and a rotationally stable drop tube member having a brood gale provided therethrough, said grill member connected to said rotationally stable drop tube member, the drop tube member having a distal end such that a feed gate is provided between the distal end and the base portion of the pan member, the drop tube member further having a helical track provided on an outer wall thereof, the drop tube member configured to provide feed to the pan member through the feed gate and the brood gate, said grill member comprising:
  a rim member associated with the pan member;
  a collar member configured to accept the drop tube member;
  means for rotating said collar member relative to the drop tube member in order to change both a position of the brood gate relative to the base portion of the pan member and a height of the feed gate by changing a distance between the distal end of the drop tube member relative to the base portion of the pan member in order to control the flow of feed into the pan member through the brood gate and the feed gate; and a plurality of spoke members for connecting said rim member to said collar member.

17. A grill member as defined in claim 16, wherein said rotating means includes a helical thread provided on an inner wall of said collar member, said helical thread of said collar member being operatively associated with said helical track of the drop tube member such that rotation of said collar member relative to the drop tube member in a first direction increases the height of the feed gate, and such that rotation of said collar member relative to the drop tube member in a second direction decreases the height of the feed gate.

18. A grill member as defined in claim 16, wherein said rim member has a top surface which varies in vertical height relative to the base portion of the pan member without adjustment of the feeder assembly.

19. A grill member as defined in claim 16, wherein each of said spoke members is set back on a top surface of said rim member in relation to an outer side surface of said rim member.

20. A grill member as defined in claim 16, wherein said position of the brood gate which is changed relative to the base portion of the pan member is a vertical position of the brood gate.

21. A grill member as defined in claim 16, wherein said rim member has an outward side surface which varies in radial distance relative to a center of said grill member.

* * * * *